APPARATUS FOR THE PHOTOELECTROSTATIC REPRODUCTION OF IMAGES

Filed April 24, 1962

28 Sheets-Sheet 1

TYPICAL CURVE FOR THE DISSIPATION OF AN ELECTROSTATIC CHARGE ON A PHOTOELECTROSTATIC SHEET

INVENTORS
WALTER V. SHEARER
WILLIAM R. BECK, JR.
BY ARNOLD M. WHEELOCK, SR.
Cleveland B. Hollabaugh
ATTORNEY INVENTORS
WALTER V. SHEARER
WILLIAM R. BECK, JR.
BY ARNOLD M. WHEELOCK, SR.
ATTORNEY

APPARATUS FOR THE PHOTOELECTROSTATIC REPRODUCTION OF IMAGES

Filed April 24, 1962 28 Sheets-Sheet 3

INVENTORS
WALTER V. SHEARER
WILLIAM R. BECK, JR.
BY ARNOLD M. WHEELOCK, SR.
Cleveland B. Hollabaugh
ATTORNEY INVENTORS
WALTER V. SHEARER
WILLIAM R. BECK, JR.
BY ARNOLD M. WHEELOCK, SR.
Cleveland B. Hollabaugh
ATTORNEY

CONTROL PANEL A

INVENTORS
WALTER V. SHEARER
WILLIAM R. BECK, JR.
BY ARNOLD M. WHEELOCK, SR.
Cleveland B. Hollabaugh
ATTORNEY

APPARATUS FOR THE PHOTOELECTROSTATIC REPRODUCTION OF IMAGES

Filed April 24, 1962

FIGURE 6 CONTROL PANEL B

INVENTORS
WALTER V. SHEARER
WILLIAM R. BECK, JR.
BY ARNOLD M. WHEELOCK, SR.
Cleveland B. Hollabaugh
ATTORNEY INVENTORS
WALTER V. SHEARER
WILLIAM R. BECK, JR.
BY ARNOLD M. WHEELOCK, SR.
Cleveland B. Hollabaugh
ATTORNEY

APPARATUS FOR THE PHOTOELECTROSTATIC REPRODUCTION OF IMAGES

Filed April 24, 1962 28 Sheets-Sheet 8

INVENTORS
WALTER V. SHEARER
WILLIAM R. BECK, JR.
BY ARNOLD M. WHEELOCK, SR.
Cleveland B. Hollabaugh
ATTORNEY April 27, 1965 W. V. SHEARER ETAL 3,180,239

APPARATUS FOR THE PHOTOELECTROSTATIC REPRODUCTION OF IMAGES

Filed April 24, 1962 28 Sheets-Sheet 9

INVENTORS
WALTER V. SHEARER
WILLIAM R. BECK, JR.
BY ARNOLD M. WHEELOCK, SR.

Cleveland B. Hollabaugh

ATTORNEY

APPARATUS FOR THE PHOTOELECTROSTATIC REPRODUCTION OF IMAGES

Filed April 24, 1962

INVENTORS
WALTER V. SHEARER
WILLIAM R. BECK, JR.
BY ARNOLD M. WHEELOCK, SR.
Cleveland B. Hollabaugh
ATTORNEY April 27, 1965 W. V. SHEARER ETAL 3,180,239

APPARATUS FOR THE PHOTOELECTROSTATIC REPRODUCTION OF IMAGES

Filed April 24, 1962 28 Sheets-Sheet 11

INVENTORS
WALTER V. SHEARER
WILLIAM R. BECK, JR.
BY ARNOLD M. WHEELOCK, SR.

Cleveland B. Hollabaugh

ATTORNEY

APPARATUS FOR THE PHOTOELECTROSTATIC REPRODUCTION OF IMAGES

Filed April 24, 1962

INVENTORS
WALTER V. SHEARER
WILLIAM R. BECK, JR.
BY ARNOLD M. WHEELOCK, SR.
Cleveland B. Holdbrough
ATTORNEY

APPARATUS FOR THE PHOTOELECTROSTATIC REPRODUCTION OF IMAGES

INVENTORS
WALTER V. SHEARER
WILLIAM R. BECK, JR.
BY ARNOLD M. WHEELOCK, SR.
Cleveland B. Hollabaugh
ATTORNEY April 27, 1965 W. V. SHEARER ETAL 3,180,239

APPARATUS FOR THE PHOTOELECTROSTATIC REPRODUCTION OF IMAGES

Filed April 24, 1962 28 Sheets-Sheet 14

INVENTORS
WALTER V. SHEARER
WILLIAM R. BECK, JR.
BY ARNOLD M. WHEELOCK, SR.

ATTORNEY

APPARATUS FOR THE PHOTOELECTROSTATIC REPRODUCTION OF IMAGES

Filed April 24, 1962

INVENTORS
WALTER V. SHEARER
WILLIAM R. BECK, JR.
BY ARNOLD M. WHEELOCK, SR.
Cleveland B. Hollabaugh
ATTORNEY INVENTORS
WALTER V. SHEARER
WILLIAM R. BECK, JR.
BY ARNOLD M. WHEELOCK, SR.
Cleveland B. Hollabaugh Jr.
ATTORNEY INVENTORS
WALTER V. SHEARER
WILLIAM R. BECK, JR.
BY ARNOLD M. WHEELOCK, SR.
Cleveland B. Hollabaugh
ATTORNEY April 27, 1965 W. V. SHEARER ETAL 3,180,239

APPARATUS FOR THE PHOTOELECTROSTATIC REPRODUCTION OF IMAGES

Filed April 24, 1962

28 Sheets-Sheet 18

INVENTORS
WALTER V. SHEARER
WILLIAM R. BECK, JR.
BY ARNOLD M. WHEELOCK, SR.

Cleveland B. Hollabaugh

ATTORNEY

INVENTORS
WALTER V. SHEARER
WILLIAM R. BECK, JR.
BY ARNOLD M. WHEELOCK, SR.
Cleveland B. Hollabaugh, Jr.
ATTORNEY INVENTORS
WALTER V. SHEARER
WILLIAM R. BECK, JR.
ARNOLD M. WHEELOCK, SR.
BY Cleveland B. Hollabaugh
ATTORNEY INVENTORS
WALTER V. SHEARER
WILLIAM R. BECK, JR.
BY ARNOLD M. WHEELOCK, SR.
Cleveland B. Hollabaugh
ATTORNEY INVENTORS
WALTER V. SHEARER
WILLIAM R. BECK, JR.
BY ARNOLD M. WHEELOCK, SR.
Cleveland B. Hollabaugh
ATTORNEY INVENTORS
WALTER V. SHEARER
WILLIAM R. BECK, JR.
BY ARNOLD M. WHEELOCK, SR.
Cleveland B. Hollabaugh
ATTORNEY INVENTORS
WALTER V. SHEARER
WILLIAM R. BECK, JR.
BY ARNOLD M. WHEELOCK, SR.
Cleveland B. Hollabaugh
ATTORNEY

INVENTORS
WALTER V. SHEARER
WILLIAM R. BECK, JR.
BY ARNOLD M. WHEELOCK, SR.

Cleveland B. Hollabaugh
ATTORNEY

INVENTORS
WALTER V. SHEARER
WILLIAM R. BECK, JR.
BY ARNOLD M. WHEELOCK, SR.
Cleveland B. Hollabaugh Jr.
ATTORNEY INVENTORS
WALTER V. SHEARER
WILLIAM R. BECK, JR.
BY ARNOLD M. WHEELOCK, SR.
Cleveland B. Hollabaugh Jr.
ATTORNEY INVENTORS
WALTER V. SHEARER
WILLIAM R. BECK, JR.
BY ARNOLD M. WHEELOCK, SR.
Cleveland B. Hollabaugh
ATTORNEY 3,180,239

APPARATUS FOR THE PHOTOELECTROSTATIC REPRODUCTION OF IMAGES

Walter V. Shearer, West Springfield, Mass., William R. Beck, Jr., Itasca, Ill., and Arnold M. Wheelock, Sr., Southwick, Mass., assignors to The Plastic Coating Corporation Filed Apr. 24, 1962, Ser. No. 189,758
12 Claims. (Cl. 95—1.7)

This invention relates to apparatus for the photoelectrostatic reproduction of images and, more particularly, to apparatus which automatically reproduces images by a photoelectrostatic process.

In photoelectrostatic reproduction, an image is reproduced directly on a coating or film of an insulating matrix which has dispersed therein a photoconductive pigment carried by a sheet of paper or other electrically-conductive backing. In this process, the photoelectrostatic coating is given an electrostatic charge while protected from light, and then exposed to an optical image of the subject matter to be reproduced. The electrostatic charge on the coating is wholly or partially dissipated in the areas struck by light, while being retained wholly or partially in the areas which are protected from light.

The extent to which the electrostatic charge is dissipated is determined both by the intensity of the light striking the surface, and the duration of the exposure to light. The extent of dissipation of the electrostatic charge is determined by the character of the subject matter being reproduced, and by the manner in which the exposure is carried out. The variation of the extent of dissipation of the electrostatic charge with the intensity of the light striking the surface, results in an electrostatic charge which varies in potential to form a latent image. This latent electrostatic image is then developed by bringing into contact with the charged surface a powdered, resinous toner to which it remains attached by the forces of the electrostatically-charged areas of the surface. The resulting powder image is then made permanent by fusing the resinous toner.

FIGURE 1 presents a typical curve for the dissipation of a negative electrostatic charge on a photoelectrostatic coating of zinc oxide dispersed in a resinous binder. Referring to that figure, it will be seen that the charge slowly dissipates, in the dark. Upon exposure to light, the charge dissipates quite rapidly to a low voltage and then at a definitely slower rate. Any residual charge left by the slow dissipation at low voltage, tends to cause the background areas of the copy to have a dirty appearance.

The powdered, resin toner is a finely-divided, amorphous material which, for convenience, will be referred to herein as a "finely-divided solid." For the direct production of copies, this toner must carry a pigment to produce a readily visible image. Pigment in the toner is convenient in the production of off-set masters which are to be converted to off-set printing plates for use on a duplicating machine or for lithographic printing, but is not essential to the performance of the plate.

The photoelectrostatic sheets which, so far, have been developed using, for example, zinc oxide as a photoconductive pigment, are adapted to receive a negative electrostatic charge. The negative electrostatic image may be toned with either a positively-charged toner to produce a positive reproduction of the original copy, or with a negatively-charged toner to produce a negative reproduction of the original copy. The apparatus in accordance with this invention can, by minor changes, be adapted to utilize photoelectrostatic copy sheets which receive either a positive or a negative charge, and to utilize a toner which produces either positive or negative copies with either type of photoelectrostatic copy sheet.

It is an object of this invention to provide apparatus for the photoelectrostatic reproduction of images on flexible, photoelectrostatic sheets which automatically and rapidly carries out the successive steps of picking up a sheet from a supply thereof in a magazine, electrostatically charging the photoelectrostatic coating on the sheet, exposing the charged surface to an optical image of copy to be reproduced which is placed on its transparent copyboard by its operator, toning the resulting electrostatic image with a powdered, resinous toner, fusing the powder toner image, and delivering the finished reproduction to a convenient location.

It is a further object to provide apparatus for the automatic reproduction of images which is compact and which has its essential controls, its transparent copyboard on which the originals to be reproduced are placed by its operator, and its reproduction delivery stations at locations of maximum convenience to its operator, while remaining in one location.

Another object is to provide apparatus which automatically carries out the essential steps of photoelectrostatic reproduction in rapid sequence, but which provides convenient means to permit its operator to interrupt the sequence of steps after the powder image is formed but before it is fused, for the purpose of inspecting and, if desired, manually modifying the image and then returning the copy to the apparatus for the fusing and delivery steps.

Another object is to provide apparatus which automatically carries out the essential steps of photoelectrostatic reproduction in which the toning and fusing steps are carried out at locations remote from the optical system of the apparatus, thereby minimizing the accumulation of toner dust in the optical system and any undesirable effect of heat on the optical system.

Another object is to provide apparatus adapted to carry out the essential steps of photoelectrostatic reproduction with an optical system which is readily adjustable to change the ratio of the size of the reproduction to that of the original.

Another object is to provide apparatus which has an optical system which is precise and free of vibration, even when there is vibration in other parts of the apparatus arising from mechanical motion therein, and which provides for the precise positioning of the original copy, thereby rendering the apparatus well adapted for the production of off-set masters on which the copy is precisely positioned and requires no adjustment on a duplicating machine.

Another object is to provide apparatus which automatically carries out the essential steps of photoelectrostatic reproduction with an optical system which is readily accessible for cleaning, and in which essential units can be readily removed for servicing or replacement.

Another object is to provide apparatus which carries out the essential steps of photoelectrostatic reproduction in which the two expendible supplies, i.e. the photoelectrostatic copy sheets and the resinous toner, can be readily and conveniently replenished.

Another object is to provide apparatus which automatically carries out the essential steps of photoelectrostatic reproduction which automatically ceases operation when its supply of photoelectrostatic copy sheets is exhausted, and which produces an audible signal which informs the operator that this is the cause of the stoppage of the operation.

Another object is to provide apparatus which automatically carries out the essential steps of photoelectrostatic reproduction in the required sequence, which cannot perform the steps in an improper sequence and which, after an interruption of its operation will, when its operation is continued, perform the next step in its correct sequence.

Another object is to provide apparatus which minimizes the tendency of residual electrostatic charges to cause dirty marginal areas on the copy which it produces.

Another object is to provide apparatus which has a plurality of safety features which minimize the possibility of damage to the apparatus, resulting from a malfunctioning of the apparatus.

Other objects of this invention and its various advantageous features will become apparent from the detailed description which follows.

The apparatus in accordance with this invention comprises in combination, a horizontal, transparent, copy-receiving surface which will be referred to hereinafter as the "copyboard," an optical system which transmits the image of an original copy positioned face-downwardly on the said copy-receiving surface to a vertical image plane at a level below the said copyboard; a plurality of light sources which illuminate the said copyboard from beneath without obstructing the light path from the copyboard to the said vertical image plane; a corona discharge unit adapted to provide a corona discharge in an upwardly direction; a source of high-potential voltage for the said corona discharge unit; a vacuum platen adapted to pick up and retain a photoelectrostatic copy sheet; a source of vacuum connected to the said vacuum platen by a conduit; a magazine adapted to hold a stack of photoelectrostatic copy sheets and to deliver individual copy sheets to said vacuum platen; a first transport means, hereinafter referred to as the "transport mechanism," adapted to move the said vacuum platen from a position above the said magazine along a horizontal path which passes above the corona discharge unit, while the lower surface of the said platen is in a horizontal plane, and then into a vertical plane which places the surface of a sheet carried thereby in the vertical image plane of the optical system, to return the said platen to a laterally-displaced position above the said magazine and, finally, to its original position above the said magazine; a magnetic toning unit; a fusing unit; a delivery station adjacent the said copyboard; a second transport means, hereinafter referred to as the "conveyor system," which has an upwardly-curved path of travel which is generally at right angles to the horizontal path of travel of the transport mechanism, and carries a means for taking a sheet from the vacuum platen while it is in its displaced position and carrying the sheet to bring its surface into contact with the said toning means, then beneath the said fusing unit and, finally, delivering the sheet to the said delivery station; and an electrical system which operates the said magazine, the transport mechanism, the corona discharge unit, the light sources which illuminate the copyboard, the second transport means, the magnetic toning unit and the fusing unit. The electrical system of this apparatus times and controls the sequence of operations of the magazine, the transport mechanism, the corona discharge unit, the light sources which illuminate the copyboard, the shutter of the lens and the conveyor system. The magnetic toning unit operates when the conveyor system is in operation. At all other times, it is off. Its operation is controlled by the electrical system.

In addition to these essential elements, the apparatus may include, at a location between the toning unit and the fusing unit, a means for removing a toned photoelectrostatic sheet from the second transport system to permit its removal from the apparatus for inspection and, if desired, manual modification of its toned, but unfused, image.

In the following, the component parts of this apparatus will be discussed in detail and various alternative embodiments thereof described. As noted hereinbefore, the apparatus in accordance with this invention can be readily adapted to produce copies on photoelectrostatic sheets which accept a negative electrostatic charge, or on sheets which accept a positive electrostatic charge. Similarly, it can be adapted for the application of either a positively-charged toner or a negatively-charged toner to either of these types of photoelectrostatic sheets. The apparatus which is specifically described in the following, is specifically adapted for the use of photoelectrostatic sheets which accept a negative electrostatic charge and form a negative electrostatic image. The adaptation of the apparatus for the use of a photoelectrostatic sheet which accepts a positive electrostatic charge is accomplished by a change of the potential of the D.C. current supplied to the corona discharge unit from a negative to a positive potential.

Further, the apparatus specifically described hereinafter is specifically adapted for the application of a positively-charged toner to a negative electrostatic image, with the use of a negative bias voltage. The polarity of this bias voltage can be readily changed, if desired, for the application of a negatively-charged toner to a positive electrostatic image although, as fully explained elsewhere, the desirability of such a change depends upon the result which is desired.

THE OPTICAL SYSTEM

The optical system of this apparatus which transmits an image of the original copy placed face-downwardly on the transparent copyboard, consists of a mirror beneath the copyboard which is positioned at a forty-five degree angle to the horizontal plane of the copyboard, and a lens system beneath the copyboard and above the mirror which is provided with an electrically-controlled shutter and is adapted to receive an image of the entire area of the copyboard and transmit it to the mirror which, in turn, reflects it to the vertical image plane into which the vacuum platen and its associated transport system positions a photoelectrostatic sheet bearing an electrostatic charge.

A plurality of light sources are located at a level below the plane in which the copyboard is situated and outside the optical path between the copyboard and the lens system. These light sources are in locations which illuminate the entire area of the copyboard in a non-uniform manner, to provide progressively more intense illumination from the center of the copyboard to its outer edges and corners. This illumination is adjusted so that the reflected light from a white surface covering the entire area of the copyboard transmitted by the optical system, provides uniform illumination over the entire area of the optical image plane of the apparatus. These lights are illuminated by an electrical current of relatively low voltage at all times during the operation of the apparatus, and are automatically brought to full voltage and full illumination by the electrical control system of the apparatus after the vacuum platen has placed the surface of a photoelectrostatic sheet in the optical image plane of the system.

The electrical system operates the shutter of the lens in synchronism with its operation of the lights. The shutter is opened after the lights have an opportunity to come to full illumination after the application of their full voltage, and closed before the full voltage is stepped back to the lower level.

Both the copyboard and the lens system of this apparatus are desirably, but not necessarily, adjustable along a vertical axis to permit changes in the ratio of the size of the image transmitted to the vertical image plane of the apparatus, with respect to the size of the original copy. The adjustability of the copyboard and the lens system may be such that the photoelectrostatic copy may be made the same size or larger, the same size or smaller, or the same size or either larger or smaller than the original copy. When this feature is included in the apparatus, the light sources which illuminate the copyboard are attached to the copyboard in a fixed relationship thereto, so that they move with the copyboard when its position is changed.

This optical system is designed in such a manner that an image of an original on the copyboard can be accurately focused in the optical image plane and accurately positioned within that horizontal plane, so that it is accurately located with respect to the edge of a photoelectrostatic sheet brought into the image plane by the vacuum platen of the apparatus. This optical system is desirably designed to illuminate areas around the projected optical image of the original copy which are broad enough to fully illuminate the marginal, non-image areas of the photoelectrostatic sheet being exposed to fully discharge a residual electrostatic charge carried by the marginal areas.

This optical system has several advantageous features. The copyboard is designed to permit the operator of the apparatus to rapidly and accurately position the original copy on the copyboard with respect to the margins of the reproduced copy. Further, the optical system is precise and free of vibration, even when the apparatus is carrying out its automatic operations with the required mechanical movements in other parts of the apparatus. These features adapt the apparatus for the production of crisp copy which has an accurately-registered image area. For these reasons, the apparatus is particularly well adapted for the production of off-set masters to be formed into lithographic printing plates, since the printing plates require essentially no adjustment on an off-set lithographic press or an off-set duplicating machine to produce accurately-centered copy.

The light sources of this optical system consist of two banks of lights, each of which can be readily removed as a unit for the replacement of a bulb, and replaced in the unit in its exact original position. This feature avoids the necessity to readjust the light sources each time one of its bulbs burn out.

This optical system is isolated from the process section of the apparatus, minimizing the accumulation of dust from that section of the apparatus, and is readily accessible for cleaning when required. These features enable the operator to keep the system clean with a minimal effort, and contributes to the crispness of the reproduced copy.

MAGAZINE FOR COPY SHEET SUPPLY

The magazine in which a supply of photoelectrostatic copy sheets is maintained during the operation of the apparatus consists of a horizontal plate provided with brackets to keep the edges of a stack of the sheets in vertical alignment which is, in effect, an open-top tray, and a mechanism which is adapted to raise the plate to bring the top sheet of the stack into contact with the vacuum platen of the apparatus, when the platen is in its initial position, and then lower the plate to its own initial position. The bracket on this horizontal tray adjacent the end of the conveyor system of the apparatus, is made of an electrically-insulating material to avoid the possibility of a short-circuit when a photoelectrostatic sheet is removed from the vacuum platen by the conveyor system. The sheets are placed in this magazine with the photoelectrostatic coating facing downwardly. The mechanism for raising and lowering the magazine consists of a pair of toggle arms on each side of the plate, one of which is connected to the piston of an air cylinder which is supplied with compressed air from the pressure side of a vacuum pump, the vacuum side of which is connected to the vacuum platen. The air pressure raises the magazine until it is stopped by the top of the stack of sheets it carries and comes into forceful contact with the vacuum platen. The upwardly movement of the magazine is automatically timed by the electrical system of the apparatus, by the operation of a solenoid valve in the compressed air line. At the time that the upwardly movement of the magazine is started, vacuum is applied to the vacuum platen by a tube from the vacuum pump to the platen. The vacuum platen picks the top sheet from the magazine. This establishes a vacuum in the vacuum line, due to the sheet sealing the vacuum platen. The solenoid valve is then signaled by a pressure-sensitive switch in the vacuum line that a sheet has been picked up and the solenoid then releases the pressure to the magazine air cylinder, permitting the magazine to drop under its own weight to its initial position of rest.

The use of compressed air for raising the magazine is an advantageous feature of this apparatus, since it automatically compensates for the progressive reduction in the height of the stack of photoelectrostatic sheets carried by the magazine as the sheets are successively removed therefrom by the action of the vacuum platen, and for the sudden increase in the height of the stack when the magazine is restocked with a supply of the photoelectrostatic sheets. Further, it eliminates the need for a hand toggle manipulated by the operator and, hence, is fully automatic in its operation.

The dual use of the vacuum pump of this apparatus to provide the vacuum required for the operation of the vacuum platen, and the compressed air required for the operation of the compressed air cylinder of the magazine, is also an advantageous feature of this apparatus in that it simplifies the apparatus by eliminating the necessity of two separate pumps, one a vacuum pump and the other a compressed air pump.

This copy supply magazine and the vacuum platen provide an advantageous feature of this apparatus arising from the fact that the magazine must deliver a sheet to the vacuum platen, which effectively seals the vacuum platen, before the vacuum platen can proceed with its cycle of operation. When the supply of sheets in the magazine is exhausted and no vacuum is produced in the vacuum platen, the solenoid switch does not receive the signal which is pre-requisite to the movement of the vacuum platen by its transport system, as described hereinafter. Furthermore, the suction of air through the orifices in the face of the vacuum platen creates an audible sound, which informs the operator of the apparatus as to the reason for the failure of the apparatus to automatically continue its sequence of operations.

The horizontal plate of this magazine which carries the stack of copy sheets can be withdrawn from the cabinet of the apparatus on carrier rails, into a position at which the supply of copy sheets thereon can be conveniently replenished. This carrier plate must be returned to its operating position and accurately repositioned therein, before the electrical system can start the automatic cycle of operations of the apparatus. The copy sheets are one of the two expendible supplies required for the operation of this apparatus. This provision for the convenient replenishment is an advantageous, time-saving feature of the apparatus. The toner is the other expendible material required for the operation of the apparatus. As described hereinafter, the apparatus also provides for the convenient replenishment of the toner outside the cabinet of the apparatus.

VACUUM PLATEN AND ITS TRANSPORT MECHANISM

The vacuum platen of this apparatus is smaller in at least one dimension than the photoelectrostatic copy sheets with which it is used. It may, for example, be approximately two inches smaller in each dimension of its surface than the sheet which the apparatus is designed to utilize. In its initial position, it is centered over the position to which the sheet magazine is raised to permit the platen to pick up a sheet of photoelectrostatic copy paper, so that the edges of the sheet on the platen extend beyond the edges of the platen the same distance along at least two opposite edges.

This feature of the apparatus is important in the operation of the apparatus at two different points. It permits the sides of the magazine to clear the edges of the platen as it is raised to permit the platen to pick up a copy sheet. Further, as will be described hereinafter in detail, it permits the conveyor system to pick the sheet off for toning and fusing after an electrostatic image has been formed on it. Further, it allows the stack to be mechanically riffled as the magazine drops away from the platen, thus insuring a single sheet pick-up. Stated in another way, it permits the mechanical riffling of the edge of the stack to avoid a multiple pick-up of sheets by the platen, which can otherwise occur due to an accumulation of static electricity in the stack which causes the sheets to cling together.

The vacuum platen is attached by a flexible hose to the vacuum side of a vacuum pump, and is mounted on a shaft which is carried by journals attached to a carrier plate which forms a part of the transport mechanism. The shaft on which the platen is mounted can both rotate and slide laterally in these journals. One end of this shaft carries a gear, and the other end is loaded by a spring which has its tension directed to retain the platen in its normal position with respect to the carrier plate.

The carrier plate is carried on one side by journals on a horizontal carrier rod, which permits the carriage to be slid from its initial position over the magazine to a position in which the platen is rotated to place the surface of the copy sheet in the image plane of the apparatus, while accurately maintaining the predetermined line of travel of the carrier plate. The other side of the carrier plate is carried by a roller, which travels along the upper surface of a second horizontal carrier rod which parallels the first rod. Alternatively, this carrier plate may be carried by a pair of journals on each side which are, respectively, mounted to slide on parallel rods.

Two sprockets, carrying a sprocket chain which is preferably of the roller type, are located above the line of travel of the platen carriage. These sprockets are spaced apart along a line parallel to the horizontal carrier rods a distance determined by the length of the travel of the carrier plate. One of the sprockets is driven through a reduction gear by an electric motor, while the other sprocket is merely an idler. A cross-slide carrying a pawl is located on the top of the carriage. The pawl is attached to the sprocket chain and, as the chain moves, causes the carriage to slide along its carrier rods in reciprocating travel, while the pawl slides laterally back-and-forth in its slide.

The ends of the horizontal carrier rods near the image plane of the apparatus are held by a plate which also carries a short rack, located to engage the gear at the end of the shaft which carries the vacuum platen. When this gear engages this rack, as the vacuum platen is moved toward the optical image plane of the apparatus, the vacuum platen is rotated through a ninety-degree angle to position the surface of a sheet which it carries in the vertical optical image plane.

This vacuum plate transport mechanism is provided with a second electric motor which operates a cam which is in contact with one end of a shift arm, which is pivoted and spring-loaded at its opposite end to keep it bearing on the cam. The cam is timed to move the free end of the shift arm outwardly at an angle to the direction of travel of the platen carriage, as the platen carriage is returned to its position over the magazine. The vacuum platen is provided, on its upper surface, with a shift roller which engages the shift arm as the platen nears its position over the magazine, and forces the platen to move laterally against the tension of the spring around the shaft which carries the platen. This places the platen in a laterally-displaced position in which a gripper, carried by the conveyor system of the apparatus, can grasp the edge of a sheet carried by the platen. At the instant that the gripper grasps the sheet, the vacuum on the vacuum platen is relieved by the action of the electrical system of the apparatus and the cam and its associated shift arm permit the platen to return to its normal position over the magazine by the action of the spring around its shaft.

THE CORONA DISCHARGE UNIT

The corona discharge unit of this apparatus has a corona discharge grid, an electrically-conductive base plate behind the wires and a stabilizing grid in front of the corona discharge grid. The corona discharge wires are provided with a source of negative electrical potential of about 10,000 volts. The base plate is insulated from the stabilizing grid and is grounded, while the stabilizing grid is grounded through a resistor which permits that grid to build up a negative voltage of 600–700 volts, or even higher, from the corona discharge grid.

The corona discharge grid consists of a plurality of corona discharge wires of small diameter positioned in parallel arrangement in a plane parallel to, and spaced apart from, the base plate of the unit. The corona discharge wires are in a plane which parallels and is spaced below that through which a photoelectrostatic sheet is carried by the vacuum platen and its associated transport mechanism. The stabilizing grid is spaced apart from the plane in which the corona discharge grid is located, on its side opposite that on which the reflector is located. Thus, the stabilizing grid is located in a plane paralleling and between that in which the corona discharge wires are situated and the plane in which the vacuum platen travels.

The stabilizing grid consists of two sets of parallel wires which are, respectively, at an angle to each other with the wires in each of the sets preferably at an angle within the range of ninety degrees to about ninety-five degrees to each other and at angles of about forty-five degrees to the lengths of the corona discharge wires. The angulation of the wires which make up the stabilizing grid offers two advantages. The first of these advantages is an increase in the uniformity of the electrostatic charge imposed on the surface of a photoelectrostatic sheet which is passed over the corona discharge unit by the vacuum platen. This uniformity arises from the fact that with the angulated wires, no single wire can cast a continuing shadow on the photoelectrostatic sheet as it travels above the unit. The second of these advantages arises from the fact that this angulation of the stabilizing grid prevents a sheet which is accidentally dropped by the vacuum platen by a malfunctioning of the apparatus, from coming into contact with the high voltage wires of the corona discharge grid which are fragile due to their small diameters. Thus, this angulation of the wires of the stabilizing grid eliminates the hazards of fire, of dangerous electrical short-circuiting, and of possible damage to the corona discharge grid.

This corona discharge unit is positioned below and across the line of travel of the vacuum platen, between the magazine and the optical image plane, with its stabilizing grid on the upper side so that its corona discharge is upwardly. This corona discharge unit is actuated by the electrical system of the apparatus as the leading edge of the vacuum platen, carrying a photoelectrostatic sheet in its travel from above the sheet magazine towards the optical plane of the apparatus, reaches a point above the forward edge of the corona discharge unit.

The corona discharge unit is inherently dangerous, since it must be supplied with a high-voltage electrical current. The location of this unit in this apparatus is a safety feature of the apparatus, inasmuch as its position is such that it is virtually impossible for the operator of the apparatus to come into inadvertent contact with it while it is being supplied with current.

As a photoelectrostatic sheet is carried by the vacuum platen with its photoelectrostatic coating facing downwardly from the magazine to the optical image plane, it passes over the corona discharge unit and the areas of its photoelectrostatic coating opposite the vacuum platen acquire an electrostatic charge from the corona discharge.

The vacuum platen is carried over the corona discharge unit in a plane parallel to the plane of its corona emission wires. The corona discharge is turned on as the forwardly end of the photoelectrostatic sheet approaches the rearwardly edge of the corona discharge unit, and is shut off as the rearwardly edge of the sheet reaches a point over its forwardly edge. The activation and the shutting-off of the corona discharge unit are automatically controlled and timed by the electrical system of the apparatus.

In an embodiment of this apparatus intended for use with photoelectrostatic copy sheets having bases which are of limited conductivity, the width of the electron emission zone of the corona discharge unit across the direction of travel of the vacuum platen is desirably, but not necessarily, made the exact width of the electrostatic image to be reproduced by the choice of the length of the corona discharge unit. This electron emission zone is the open area of the shield of the unit which carries the stabilizing grid. Similarly, the area of the photoelectrostatic sheet in the direction of travel of the vacuum platen which is exposed to the electron emission is desirably, but not necessarily, restricted to the length of the electrostatic image to be reproduced. This is accomplished by synchronizing the period during which the corona discharge unit emits electrons with the forwardly movement of the vacuum platen. Thus, the corona discharge unit is turned on its high voltage at the instant that the forwardly edge of the image area of the photoelectrostatic sheet reaches the rearwardly edge of the electron emission zone, and is turned off at the instant that the trailing edge of the image area reaches the rearwardly edge of the electron emission zone. In this manner, only the area of the photoelectrostatic sheet which is to receive a latent electrostatic image receives a full electrostatic charge, while the margins of the sheet remain relatively uncharged. This minimizes the residual electrostatic charge remaining in the boundary areas at the time that the electrostatic image is toned. This minimizes the tendency for residual toner to adhere to the marginal areas, which will give the marginal areas a dirty appearance.

When the vacuum platen carrying a charged photoelectrostatic sheet comes to a vertical position in which the charged surface of the sheet is in the optical image plane of the apparatus, the movement of the platen is interrupted and the lights of the optical system are automatically turned up and the lens shutter opened by the electrical control system of the apparatus. After a predetermined period of exposure, which is fixed by the operator of the apparatus, the lens shutter is closed and the lights are turned down, and the movement of the platen resumed to return it to its displaced position above the magazine, at which it delivers the sheet to he conveyor sysem and, finally, to its normal position above the magazine.

In the automatic operation of the apparatus, the electrical control system automatically causes the vacuum to be turned onto the platen immediately after it returns to its normal position above the magazine, and the magazine to be simultaneously raised to supply a sheet to the platen. The movements of the platen, as described above, then follow in automatically-timed sequence under the control of the electrical system.

THE CONVEYOR SYSTEM

As already noted, the conveyor system of this apparatus is designed to grasp a sheet carried by the vacuum platen while the vacuum platen is in its displaced position over the magazine, carry its surface into contact with the toning unit, pass it through an inspection station from which it can be removed by the operator, if desired, for any indicated manual correction, then adjacent the fusing unit and, finally, to deliver it to the copy-receiving station at the top of the apparatus. It is located near the end of the cabinet of the apparatus, and its direction of travel is across the length of the cabinet.

This conveyor system is made up of three separate sections. The first of these sections is comprised of two transport chains carried in parallel planes by sprockets. These transport chains are preferably the roller-type, sprocket chains. These parallel chains carry two grippers, each of which are adapted to grasp the edge of a sheet carried by the vacuum platen when the vacuum platen is in its laterally-displaced position, and to carry the electrostatic image-bearing surface of the sheet while facing downwardly into contact with the upper peripheries of the brushes of the toner mechanism, which is located near the bottom of the cabinet near the vacuum platen when the platen is in its original position. This section of the conveyor system then carries the sheet upwardly and deposits it on the second section of the system, with its now toned image-bearing surface facing upwardly.

Each of the grippers carried by the transport chains of this first section of the conveyor system, are insulated from each of the transport chains by a block of plastic insulation which has a strength such that it will shatter under any abnormally-high stress which could, otherwise, damage the conveyor system. This is a valuable safety feature of the apparatus, since the transport system could, otherwise, be damaged by a gripper pulling a strong photoelectrostatic sheet which was improperly caught in the vacuum platen transport system.

In addition to being insulated from the transport chains by insulating blocks, each gripper has leaves made of an insulating material, or made of a metal which is coated with a layer of insulating material. The combination of the insulating blocks and the insulation of the gripper leaves, themselves, eliminates the possibility of an electrical short-circuit either of the latent electrostatic image on the surface of a photoelectrostatic sheet being carried by the gripper, or of the bias voltage applied to the sheet during its toning.

The electric motor which drives the transport chains of this first section of the conveyor system is provided with an electric brake, which is operated by a relay. This relay is first cocked, and then activated, by limit switches operated by accurately positioned lugs on one of the transport chains. This use of lugs on the transport chains to preliminarily cock the relay, and then activate it, provides a simple and highly-efficient means of positively-stopping the gripper at the exact location at which it is to receive a photoelectrostatic sheet from the vacuum platen.

This first section of the conveyor system is provided with a sweep at the point that the travel of the sheet carried by one of its grippers goes from longitudinal to vertical travel around which the back of the sheet passes as it changes its direction of travel. Two spring-loaded idler rolls ride on the marginal edges of the face of the sheet to hold its back surface in contact with this sweep, and to prevent its trailing end from flipping outwardly to bring the toned face into contact with the inside of the adjacent wall of the cabinet of the apparatus.

This first section of the conveyor system is provided with a second pair of spring-loaded idler rolls, located near its upper or exit end at the point at which a sheet carried by this section of the conveyor system is transferred to its second section. The idler rolls ride on the marginal edges of the image side of the sheet which, at this point, is facing upwardly and assure that the back of the sheet is in contact with the belts of the second section of the conveyor system.

The second section of this conveyor system consists of a plurality of parallel belts carried by rollers which are spaced apart in a substantially horizontal direction. A sheet carried by the first section of the conveyor system is deposited on those belts by the opening of the gripper by which it has been carried upwardly.

Racks are positioned below the spaces between the parallel belts of this second section of the conveyor system. These racks can be raised to positions above the upper surfaces of the conveyor belts by the manual operation of a convenient lever on the top of the cabinet of the apparatus. When in their raised position, the racks lift a copy sheet off of the conveyor belts, interrupt its travel, and hold it in a position from which it can be manually removed for inspection by the operator of the apparatus. When in their lowered position, the racks do not interfere with the travel of a copy sheet to the third section of the conveyor system.

These racks may be automatically operated, as an alternative to manual operation. In such automatic operation, the rack is automatically raised, by the approach of a copy sheet, to interrupt the travel of the sheet for a momentary interval which permits its visual inspection and, if desired, its removal from the rack for any desired manual revision. At the end of the momentary interval during which the rack is raised, it is then automatically lowered to its position of rest below the upper surfaces of the belts, to permit the copy sheet to resume its travel to the third section of the conveyor system.

The provision for the interruption of the automatic processing of a copy before it becomes fixed by the fusing of the toned image, is an important feature of this apparatus. It is frequently desirable in the production of such copy for the operator of the apparatus to make a leisurely inspection of the reproduced image and, if desired, make manual deletions from the image and then return the copy to the apparatus for the fusing step, which makes the reproduced image permanent. The design of this apparatus places the racks for this interruption of the travel of the copy at the top of the apparatus, which is convenient to the operator of the apparatus. Furthermore, the location is such that the operator has a brief opportunity to judge whether or not it is desirable to interrupt the completion of a given copy before its forward progress is, in fact, interrupted.

A copy sheet guide is positioned along each edge of this second section of the conveyor system, and extends from a point near its upper mid-section, across a gap between its exit end and the entrance end of the third section of the conveyor system, and over a portion of the third section of the conveyor system adjacent its entrance end. These copy sheet guides adjust any misalignment of the copy sheets, and assure that a pair of their opposite parallel edges are parallel to the direction of travel of the second and third sections of the conveyor, as they pass from the second to the third sections of the conveyor system.

The third section of the conveyor system receives the toned copy sheet, with its toned surface still facing upwardly, and carries it beneath the fuser unit which fuses the toner and renders the now visible image permanent. It includes, in succession along the line of travel of the copy sheet, a solid belt conveyor, a delivery sweep which turns the sheet in an upwardly direction and reverses the direction of its travel, and a pair of rolls which receive the copy sheet from the delivery sweep and deposits it in the copy-receiving station of the apparatus.

The solid belt conveyor of this third section of the conveyor system includes two parallel rolls which carry a single belt which is of the width of the conveyor system. One of these two parallel rolls is a driven roll, while the other is an idler roll. The driven roll is, preferably, the one at the exit end of the conveyor belt adjacent the delivery sweep.

This conveyor belt has a crown sweep position beneath its upper span, which carries the copy sheet beneath the fuser unit. This crown sweep is, preferably, a sheet of metal or other material having a high heat conductivity. It is curved upwardly along the direction of travel of the upper span of the conveyor belt, and bears on the lower surface of that span of the belt to cause the upper span of the belt to travel in an upwardly-arcuate path as it passes beneath the fuser unit.

This crown sweep is an important feature of this apparatus. It causes the copy sheet to follow a curved path of travel under the fuser unit, which prevents it from curling across its direction of travel and, thereby, prevents its edges from coming into direct contact with the fuser unit. This eliminates a serious fire hazard in the operation of the apparatus, since the curling of the copy sheet into direct contact with the hot fuser unit could, and probably would, cause the sheet to catch fire.

Although the direction of travel of the second and third sections are close to horizontal, the second section has a slightly upward angulation with respect to the general direction of travel of the third section, with the result that a photoelectrostatic sheet passing from the second section to the third section passes over a hump. This hump contributes to the action of the crown sweep in preventing the sheet from curling across its direction of travel.

The crown sweep provides a second important feature in that it tends to eliminate the fire hazard in the fusing step, which is present even when the copy sheet is in its normal, uncurled position on the conveyor belt. This hazard becomes particularly serious during a stoppage of the third conveyor when a sheet is beneath the fuser unit. It conducts heat away from the area of the conveyor belt directly beneath the fuser unit and, in turn, from the lower surface of the copy sheet. This prevents the body of the copy sheet from rising to its combustion temperature while the resinous toner on its upper surface is being fused.

Two narrow idler rolls are positioned at the edges of the exit end of this solid belt conveyor, and bear on the surface adjacent its edges. The rolls bear on the edges of a copy sheet, outside its toned image area, and propel the sheet through the delivery sweep.

The delivery sweep is a sheet of, for example, sheet metal which is curved into a semi-circle across the direction of travel of a copy sheet coming from the solid belt conveyor, which causes the sheet to travel upwardly and around a curved path which reverses its direction of travel and directs its leading edge into the nip of a pair of rolls which form the third part of this third section of the conveyor system. These rolls are positioned, one above the other, across the direction of travel of the copy sheet and are in contact, forming the nip which receives the copy sheet with its copy-bearing surface facing downwardly. One of this pair of rolls is a driven roll, while the other is an idler. Upon receiving the leading edge of the copy sheet in the nip between them, they pull the sheet around the delivery sweep and deliver it into the copy-receiving station.

THE TONER UNIT

The toner unit of this apparatus is designed to apply a powdered, solid, resinous toner to the latent electrostatic image on a photoelectrostatic sheet, as the sheet is carried by the conveyor system over the toner unit with its image-bearing surface facing downwardly. The powdered, solid toner is applied to the surface of the sheet by at least one, and preferably two or more, magnetic brushes. The embodiment of this apparatus, described hereinafter with reference to the drawings, includes a toner unit which forms two rotating magnetic brushes.

This toner unit comprises at least one cylindrical, stationary core of a non-magnetic material such as, for example, brass which has lengthwise grooves which are circumferentially spaced apart. Longitudinally, permanent magnets, which may be of the plastic type, are positioned within these grooves and substantially, completely fill them to complete the cylindrical surface of the stationary core. Each of these permanent magnets has a length equal to the width of the image area of the sheet to be toned. A preferred embodiment of this stationary core carries six such longitudinal, permanent magnets at circumferentially, equally-spaced intervals around about 230° of its circumference. The rotary position of this core is capable of adjustment, and of being firmly held in the desired position with respect to the permanent magnets in its surface. A rotatable, closely-fitting, cylindrical sleeve of a non-magnetic material such as, for example, brass is positioned around this stationery core and has a means for its rotation around the core. The combination of a stationary core, the means for adjusting its circumferential position, the outer sleeve and the means for its rotation around the stationary core, will be referred to hereinafter as a "magnetic brush unit."

One of these magnetic brush units, and preferably two or more of them, are located wthin a longitudinal tray and spaced apart from its bottom. Also located within this tray, below the magnetic brush unit or units, is at least one, and preferably two or more, rotary stirrers or agitators. In the embodiment of this unit described hereinafter with reference to the drawings, four such agitators are located below the two magnetic brush units with their axes parallel to the axes of the magnetic brushes. Each such agitator is provided with means for its rotation around its longitudinal axis.

This magnetic toner unit is located in the apparatus with the axes of its magnetic brush units at right angles to the direction of travel of a sheet carried by the conveyor system.

When in use, this longitudinal tray is filled with a toner mix to a level such that the lower surface of the magnetic brushes are immersed therein. This toner mix is a mixture of a powdered, resinous toner and particles of a magnetic material such as, for example, iron which is well known to the art. The toner used for the direct production of copies is colored. That used for the production of a master which is to form a lithographic printing plate may or may not be colored, but is preferably colored to facilitate the visual inspection of the image. The toner may be one which acquires a positive charge in the toner mixture. Such a toner tones the negative image areas of a latent electrostatic image, and produces a positive copy. Alternatively, the toner may be one which assumes a negative charge. Such a toner is repelled by the negative image areas and tones the background areas of a latent electrostatic image, and produces a negative reproduction of the original image.

The rotation of the cylindrical sleeve within the toner mix forms a brush on the portion of the outer surface of the rotating sleeve which is adjacent the magnets of the stationary core. This magnetic brush is continuously formed and disrupted as the sleeve rotates, since it exists only on the segment of the sleeve which is adjacent the permanent magnets of the stationary core of the unit at any instant. The portion of the sleeve adjacent the circumferential portion of the core, which has no permanent magnets, cannot retain a magnetic brush.

Further, the end sections of the sleeve adjacent the end sections of the core, which do not carry the permanent magnets, do not form a magnetic brush. The width of the magnetic brush which is formed is equal to the lengths of the permanent magnets of the core which, as already noted, are made equal in length to the width of the image area on the sheet to be toned. Thus, the marginal areas of the sheet do not come into contact with the magnetic toning brush or brushes, as the case may be and, hence, cannot pick up residual toner and become dirty in appearance, even if they carry a residual electrostatic charge.

A doctor blade is located adjacent the sleeve of the magnetic brush, in a position to smooth the surface of the magnetic brush on the sleeve as it rotates to its uppermost position, in which it contacts a photoelectrostatic sheet passing over the toner unit. This doctor blade corrects inherent tendencies of the magnetic brush to have a non-uniform surface.

An insulating-idler roll is positioned ahead of the toner brush unit, and another just after it. In a toner unit carrying two or more magnetic brush units, an insulating-idler roll is located between them. The upper peripheries of these idler rolls are pust below the upper periphery or peripheries of the magnetic brush or brushes, as the case may be, which are formed during the operation of this unit. The purpose of these rolls is to support the trailing end of the sheet being toned. The last of these insulating rolls, i.e. the one on the forwardly side of the toning unit, is particularly important in that it prevents the trailing end of the sheet being toned from flipping into the edge of the toner tray as it passes around the sweep of the first section of the conveyor system and, thereby, avoids the tendency which it would otherwise have to knock the toner mix out of the toner tray.

This continous disruption of the magnetic brush or brushes, as the case may be, in combination with the action of the agitators of the unit in continually stirring the toner mix, is an important feature of this toner unit. It continually provides in the magnetic brush a toner mix composition which is substantially the same as that of the body of the mix within the tray of the unit, despite the continuing depletion of the toner from the magnetic brush by deposition on the electrostatic image of the photoelectrostatic sheets brought into contact with the brush or brushes of the apparatus.

The mechanical stirrers for the toner mix described above provide an effective means for stirring the toner mix to keep its composition uniform. In an alternative embodiment of this toner unit, which carries two or more magnetic brush units, the agitation of the toner mix is effected by means of one or more magnetic stirrers located beneath and adjacent to the bottom of the tray of the toner unit, which is preferably sinuous in contour across its length with parallel, semi-cylindrical depressions, separated by a convex, semi-cylindrical hump, which corresponds to a concave, semi-cylindrical depression in its lower surface. The axis of each of the magnetic brush units is directly above, and parallel to, the axis of one of the semi-cylindrical depressions in the bottom of the toner tray.

The magnetic stirrer of this toner unit is a rotatable, magnetic cylinder comprised of a generally cylindrical body of a non-magnetic material, carrying longitudinal strips of permanently magnetic material spaced apart around its circumference. This magnetic cylinder is located beneath the bottom of the toner tray with its axis parallel to the axis of the hump in the bottom of the tray, as viewed from above, and parallel to the axes of the magnetic brush units. In this embodiment of the toner unit, the sleeves of the magnetic brush units are preferably rotated in the same direction, while the magnetic stirrer cylinder is provided with means for rotating it in the opposite direction and is rotated in that direction when the unit is in use. The rotation of this magnetic stirrer cylinder causes the toner mix within the tray of the unit to move in the direction that the lower peripheries of the sleeves of the magnetic brush units are moving, with a resultant mixing of the material which falls from the sleeves upon the disruption of the magnetic brushes with the body of the toner mixture within the tray.

The tray of the toner unit of this apparatus has a partition extending downwardly from its top, which is parallel to the axis of the magnetic brush unit or units and adjacent thereto. The lower edge of this partition is above a bottom surface of the tray, leaving a slot which opens into the section of the tray which carries the magnetic brush units and agitators. A cylindrical member which carries longitudinal slots or grooves on its surface, is located adjacent this slot in a position which substantially closes the slot. This partition and the grooved cylinder form a compartment for toner, or a toner mix which carries a toner content higher than that normally contained in the adjacent compartment in which the magnetic brush units are located. The rotation of the grooved cylinder will convey the toner powder or enriched toner mix from this compartment into the adjacent compartment in which the magnetic brush units operate. Thus, this grooved cylinder is adapted to function as a feeding and metering device for the replenishment of toner from the toner mix in the adjacent compartment by the magnetic brushes. This grooved cylinder will be referred to hereinafter as the "toner feed cylinder" and the compartment from which it feds toner or an enriched toner mix will be referred to as the "toner supply compartment."

This toner feed cylinder is provided with a means for its rotation at periodic intervals to replenish the toner in the adjacent compartment as it is depleted. This means for the rotation of the toner feed cylinder is controlled by the electrical system of the apparatus, to feed toner at intervals determined by the number of copies which have been toned. Thus, it may be activated by the electrical system to feed an increasement of toner each time ten copies have been toned. This electrical control includes a series of switches or, alternatively, a multiple-contact, rotary switch, located at a position convenient to the operator of the apparatus, by which the periodicity of the operation of the toner feed cylinder can be determined. By the operation of these switches or the rotary switch, as the case may be, the operator of the apparatus may cause the toner feed cylinder to furnish an increasement of toner to the toner mix after, for example, the toning of ten copies, twenty copies, fifty copies, etc.

The periodicity with which the toner is replenished to the toner mix in the operation of the apparatus is determined by the density of the image which is being toned. An image which is relatively light, i.e. has a relatively small proportion of surface which accepts toner from the magnetic toner brush, depletes the toner at a slower rate than one which has massive dark areas. In the toning of the latter type of image, the toner is replenished more frequently than in the case of the former.

This mechanism for periodically replenishing the toner in the toner mix is an important feature of this apparatus, in that it makes possible the continuous production of copies of substantially uniform density. Stated in another way, it avoids any progressive lightening of the copies resulting from the progressive depletion of the toner from the toner mix.

The toner unit and its means for the rotation of the sleeves of its magnetic brush units, its agitators, and its toner feed cylinder form a self-contained unit which can be displaced laterally from its normal operating position to bring it outside the cabinet of the apparatus, or completely removed therefrom to permit the replenishment of the toner or the enriched toner mix. In a specific embodiment of this apparatus, this is made possible by self-centering connectors between the drive means of this toner unit and the drive of the conveyor system from which it receives its power. This is a valuable feature of this apparatus, in that it permits the convenient replenishment of the toner outside the cabinet of the apparatus. As already noted, the supply of photoelectrostatic copy sheets in the magazine of the apparatus is also replenished from outside the apparatus. These are the only expendible materials required by the apparatus.

The fact that the toner unit is a self-contained unit which is readily removable from the apparatus, is an advantageous feature from two additional standpoints. In the event that the unit requires repair, a duplicate unit can be inserted in the apparatus and the operation of the apparatus continued without waiting for the completion of the repairs on the original unit. Again, when it is desired to change the toner being used, either the color or the polarity thereof, the toner unit as a whole can be readily changed, thereby avoiding the necessity to clean a single unit between changes of toner mix.

A means for vibrating the back of the photoelectrostatic sheet, after it has passed in contact with the magnetic toning brushes, is located above the toner tray in a position forwardly of the magnetic brush unit or of the last magnetic brush unit, as the case may be, in the direction of travel of the sheet. In a preferred embodiment of this apparatus, the vibrator is a cylindrical brush which is provided with a means for its rotation around its horizontal axis, which is at right angles to the direction of travel of the sheet. This brush is in contact with the back of the sheet as it is carried forwardly by the conveyor system. Its purpose is to cause any magnetic particles from the toner brush, which are mechanically adhering to the face of the sheet, to drop back into the toner tray. This vibratory action does not cause the particles of the toner, itself, to drop off of the image areas of the sheet since they are held in place by electrostatic force.

A shoe for each of the toner brush units of the toner unit is located above the toner brush unit, in a position to contact the back of the photoelectrostatic sheet as its face surface is in contact with the magnetic brush formed by the brush unit. The shoe holds a photoelectrostatic sheet carried by the conveyor system in uniform contact with the magnetic brush as it passes over it. This shoe is electrically insulated from the toner unit and is grounded through a relay switch. The toner unit, itself, is electrically insulated from the remainder of the apparatus and is electrically connected to a source of direct current which gives it a bias potential with respect to the electrostatic image on the face of the photoelectrostatic sheet. The electrostatic image is negative in charge. The bias potential supplied to the toner unit may be either positive or negative in charge, as may be desired. A positive charge on the toner unit increases the pick-up of toner by the surface of the photoelectrostatic sheet, and intensifies the visual image produced by the toning. However, it also tends to cause the background areas of the image to pick up toner, causing the finished copy to have a dirty appearance. Despite the tendency of a negative bias voltage to cause the background areas of the copy to have a dirty appearance, the use of such a bias is sometimes desirable in the reproduction of original copy which has a light image which is difficult to reproduce, or which is desired in a copy of increased density. Generally, it is desirable to supply a negative bias potential to the toner unit which is smaller in potential than the electrostatic charge of the electrostatic image, since such a bias has a relatively small effect on the density of the toned image, and which minimizes the pick-up of toner particles by the background areas of the image. The net effect of a negative bias voltage is to cause the finished copy to be clean and crisp in appearance. This net effect is desirable when reproducing original copy which is even reasonably good.

The shoes above the toner brush units are desirably longer than the width of the photoelectrostatic sheet which is toned. The combination of shoes which are of a length which extend at least to the edges of the sheet being toned and, preferably, somewhat beyond those edges, with the use of a magnetic toning brush which has a length equal to the width of the latent electrostatic image which is toned, is advantageous in keeping the side margins of the finished copy clean in appearance. The magnetic brush does not bring toner in contact with these marginal areas to be picked up by any residual, negative, electrostatic charge they may carry, and the negative bias voltage tends to restrain the positive toner from those areas. The result is that the marginal areas can pick up little or no residual toner to give them a dirty appearance.

The bias voltage on the toner unit is applied only during the interval during which a photoelectrostatic sheet is passing over the toner unit. As noted hereinbefore, the electrical circuit which grounds the shoe or shoes of this toner unit carries a relay switch. This relay switch is accurately timed in its operation by the electrical control system of the apparatus, as will be fully described hereinafter, to close as the leading edge of a sheet comes over the magnetic toning unit, and to open the instant that the trailing end of the sheet passes the unit. When this relay switch is in open position, no bias potential is applied to the unit. It is important that its closing and opening be accurately synchronized with the passage of a sheet over the toning unit, since the application of this bias voltage when a sheet is not between the shoe or shoes of the toning unit and the magnetic brush or brushes, as the case may be, will create a short-circuit in the unit.

THE FUSER UNIT

The purpose of the fuser unit of this apparatus is to heat the other powder carried by the latent electrostatic image to its fusion temperature, thereby making the visual image permanent. The fuser must raise the temperature of the particles of the toner to their melting point in a relatively short period of time as the sheet is passed beneath and, yet, must not bring the paper base of such a sheet to its charring point. Further it must not cause a material increase in the temperature of the adjacent parts of the apparatus.

In this apparatus, the fuser unit is located at the top of the apparatus above the path of travel of the conveyor system, between the inspection station and the delivery station. This unit is located directly beneath the delivery station of the apparatus, which is a tray section at the top of the cabinet of the apparatus, which is hinged to render the unit readily accessible. It comprises one, and preferably more, tubular infrared heating lamps in a horizontal plane. The number of lamps included depends upon the heating capacity of each lamp, the rate of travel of the adjacent section of the conveyor system, and the melting point of the toner powder. The longitudinal axes of these lamps are at right angles to the direction of travel of the photoelectrostatic sheets beneath them.

The infrared heating lamps are enclosed in a housing which comprises a reflector above and around the sides of the lamps and a wire screen below the lamps, which prevent any inadvertent direct contact between the lamps, themselves, and a photoelectrostatic sheet. In one embodiment of this unit, the reflector is enclosed by an outer housing which is spaced apart from the outer surface of the reflector to provide an air passageway through which air is blown by a fan. The outer surface of the reflector may carry longitudinal fins to increase its rate of transfer of heat to the passing air stream.

In a preferred embodiment of this apparatus, the electrical circuits to the fuser unit cannot be completed unless the electrical circuit motor of its fan, the motor which runs the third section of the conveyor system, and the motor which runs the delivery rolls of the conveyor system are closed. Thus, the fuser cannot be operated without a supply of cooling air and without the conveyor system being capable of moving a copy sheet from beneath it. This electrical circuit, combined with the ready accessibility of the fuser unit by merely raising the copy-receiving tray, and with the heat-absorbing crown sweep beneath the section of the conveyor belt directly beneath the fuser unit, are important safety precautions against any inadvertent over-heating of the apparatus by the fuser unit, with hazards from heat damage and fire.

In an alternative embodiment of this apparatus, the fuser unit is provided with a mechanism which automatically raises it to materially increase the clearance between its heating lamps and the belt of the third section of the conveyor system, at any time that the belt of the conveyor system stops. In this alternative, it is desirable to include means for automatically shutting-off the power supply to the infrared heating lamps, when the unit is raised. In this alternative embodiment, the fuser unit as a whole is supported by a pivoted, counterbalanced frame. This counterbalanced frame may be operated by several alternative automatic mechanisms to raise the fuser unit away from the conveyor belt. This automatic mechanism may be controlled either by the supply, or lack of supply, of power to run the conveyor belt, or by the actual movement of the belt, itself.

In the case of either of these alternative controls, the mechanism for raising the fuser unit may be, for example, of two alternative types. It may be a solenoid which operates directly to raise or lower the unit by the direct operation of its core on the pivoted frame supporting the unit. Alternatively, the mechanism may comprise the combination of a spring which is loaded to keep the fuser unit in its raised position, a latch to hold the unit in its operating position, and a solenoid which operates the latch to unlock the toner unit from its normal operating position and permit it to be raised by the spring.

Either of the foregoing alternative mechanisms may be controlled either by the power supply to the motor driving the belt of the third section of the conveyor system, or by the movement of the belt, itself. The control by the power supply is the more direct method of control in terms of the equipment involved, since the power supply to the belt motor can be used to activate the solenoid control of the position of the fuser unit.

The alternative of controlling the position of the fuser unit by the physical movement of the belt of the third section of the conveyor, is the more desirable of these two methods of control since it bypasses the possibility of a stoppage of the belt when it is being supplied with power, by slippage between it and its driven rollers. Either the belt, itself, or its idler roller can be used as the source of control through a switch of known design which is operated by the movement of the belt or of the idler roller which, in turn, operates the solenoid which determines the position of the fuser unit.

THE ELECTRICAL SYSTEM

The electrical system of this apparatus comprises electric motors which furnish the motive power for the various parts of the apparatus, power supplies for the corona discharge unit and the fuser unit, and an automatic control which activates and times the sequence of operation of the components of the apparatus which includes the combination of limit switches, stepping switches and relays. The exposure to produce the latent electrostatic image is controlled by an electrical timer which is manually set for the desired exposure time, and is interlocked with the other components of the electrical system which time the sequence of operation of the other components of the apparatus by limit switches and solenoid switches.

This electrical system includes two control panels at the top of the cabinet of the apparatus in locations convenient to the operator, which carry the exposure timer, the switches, and the voltage controls which are manipulated by the operator during the use of the apparatus. One of these panels carries all fuses of the apparatus which are likely to require replacement. This grouping of the control elements of the electrical system of the apparatus, which are operated manually in two readily and conveniently accessible panels, is an important feature of the apparatus in that it makes possible its use at relatively high speeds by a single operator.

Automatic electrical controls of the apparatus, including the stepping switches and various relays, are grouped in two units which can be conveniently disconnected and removed from the apparatus for repair or replacement. One of these units will be referred to as "A Box" hereinafter, while the other will be referred to as "B Box." These units include electrical control elements which are essential to the operation of the apparatus, but which are inherently both complex and delicate. The failure of any one of these delicate controls will prevent the operation of the apparatus on a fully automatic basis and, in the case of some of them, prevent its operation in a discontinuous manner.

The ease with which the A and B Boxes can be removed from the apparatus is important from two standpoints. On one hand, this feature permits either or both boxes to be removed from the apparatus to a location at which any indicated tests or repairs to their components can be conveniently made. On the other hand, either box may be removed from the apparatus in the event of a malfunction, and a replacement slipped into its place within minutes. This ease of replacement of the A and B Boxes avoids the extended interruption in the operation of the apparatus which could, otherwise, result from the necessity to repair a component of one of these boxes before the apparatus was again ready for service.

The various limit switches and solenoid switches of the apparatus are at the various locations with respect to the mechanical parts of the apparatus, in what will be termed hereinafter as the "process section" thereof, to provide for their operation by the performance of the associated mechanical part involved which, in turn, causes appropriate reaction by the automatic control units concentrated largely in the A and B Boxes.

It will be understood, from the foregoing description of this apparatus, that the sequence of essential steps which it must carry out for the production of a photoelectrostatic copy are: (1) the deposition of an electrostatic charge on the photoelectrostatic coating on a copy sheet; (2) the exposure of the charged surface of this sheet to an optical image, to form a latent electrostatic image on the surface of the coating; (3) the toning of the latent electrostatic image with a resinous toner; and (4) the fusing of the toner picked up by the latent electrostatic image, to produce a permanent image. These essential steps must be carried out in the order named.

It will also be understood, from the foregoing description, that in carrying out the four essential steps for the production of a photoelectrostatic copy, the apparatus must perform a series of timed and correlated actions in performing each of the four essential steps, and correlated steps in connection therewith, i.e. delivering a single sheet from a supply thereof for treatment to produce a copy, and delivering the completed copy to an accessible location. Each of these timed and correlated actions must be carried out with the proper timing in their correct sequence.

The electrical system of this apparatus has the important and advantageous characteristic of causing and, in certain instances, performing the essential actions in the properly-timed sequence and of being unable to perform them in any other manner. Further, this electrical system has the important characteristic of causing the resumption of the correct sequence of actions exactly where they were terminated by an interruption of the operation of the apparatus.

THE DRAWINGS

The apparatus in accordance with this invention for the photoelectrostatic reproduction of images, has been generally described and some of its advantageous features pointed out in the foregoing. FIGURE 1 has been discussed hereinbefore. Specific embodiments of this apparatus will now be described with reference to the remainder of the accompanying drawings, in which like reference characters have been used to refer to like parts wherever they may occur. In the drawings:

Figure 31:
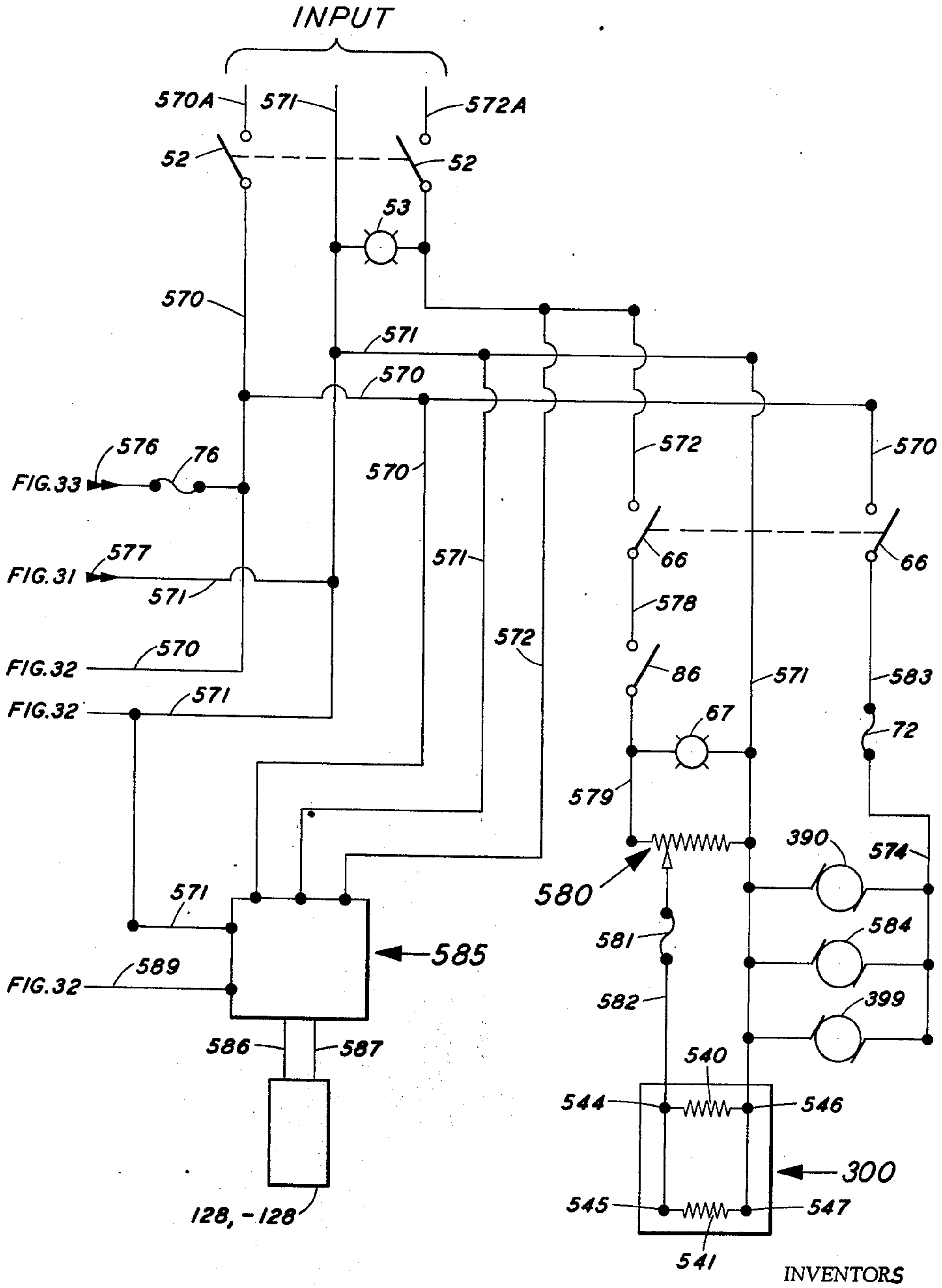
Figure 32:
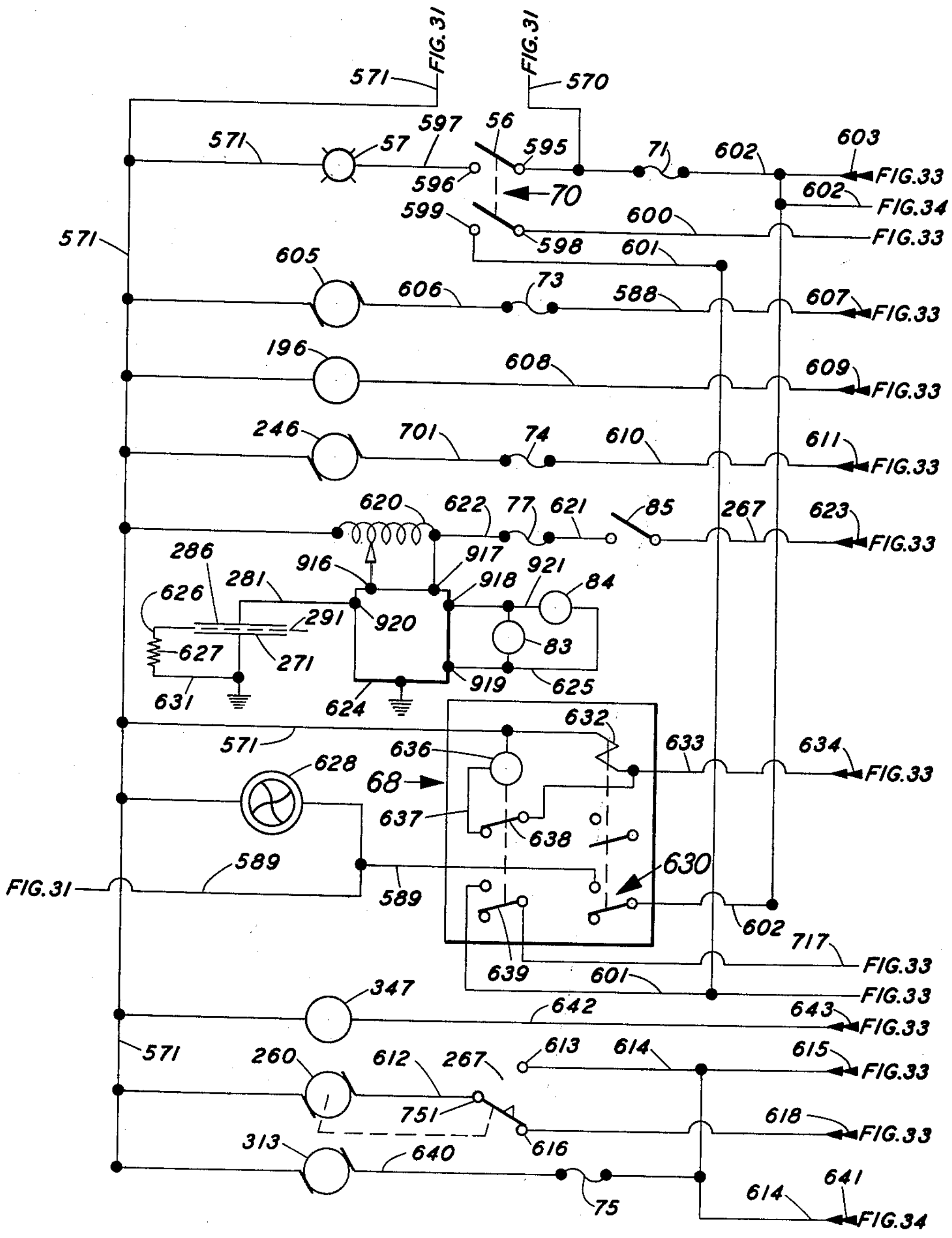
Figure 33:
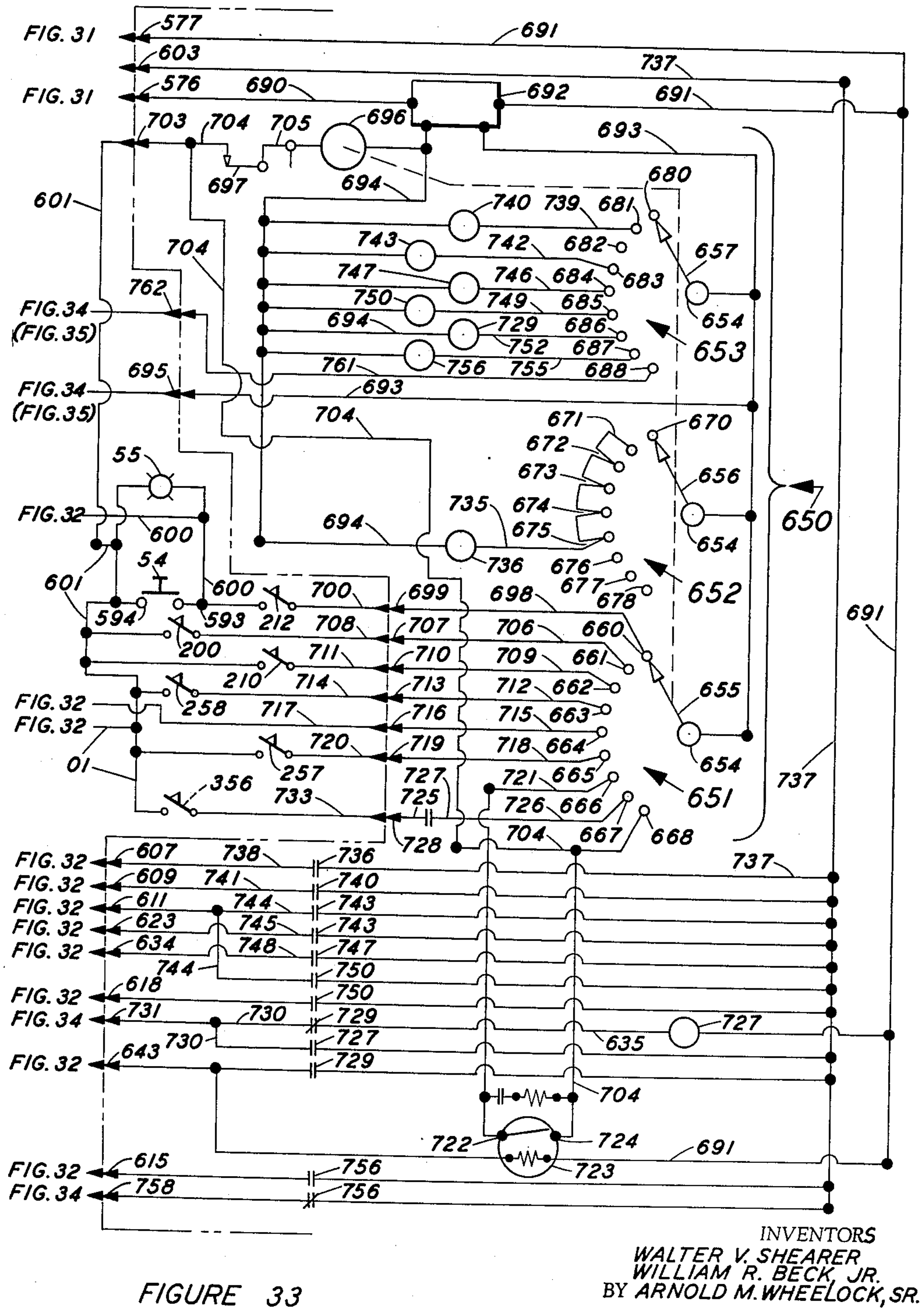
Figure 34:
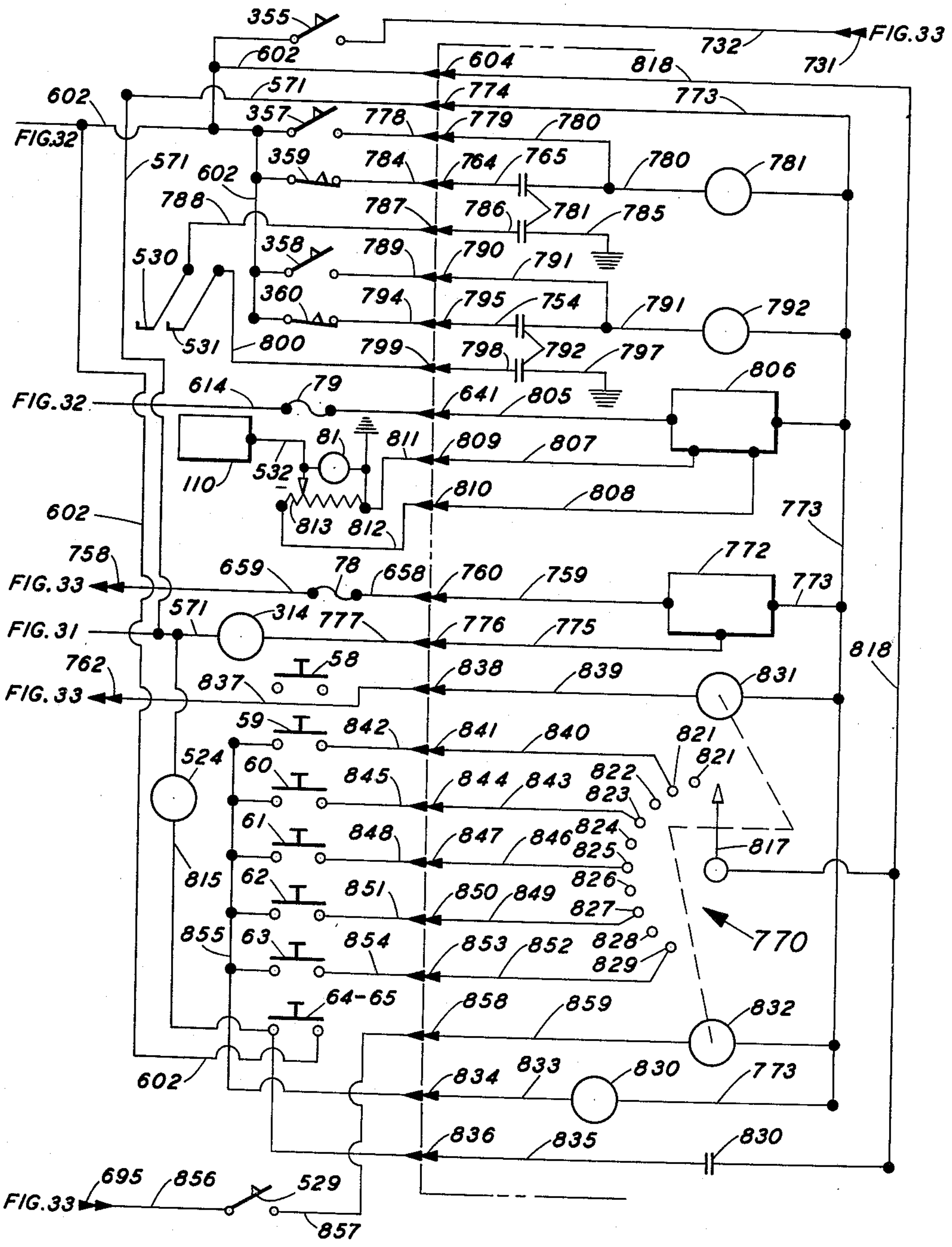
Figure 35:
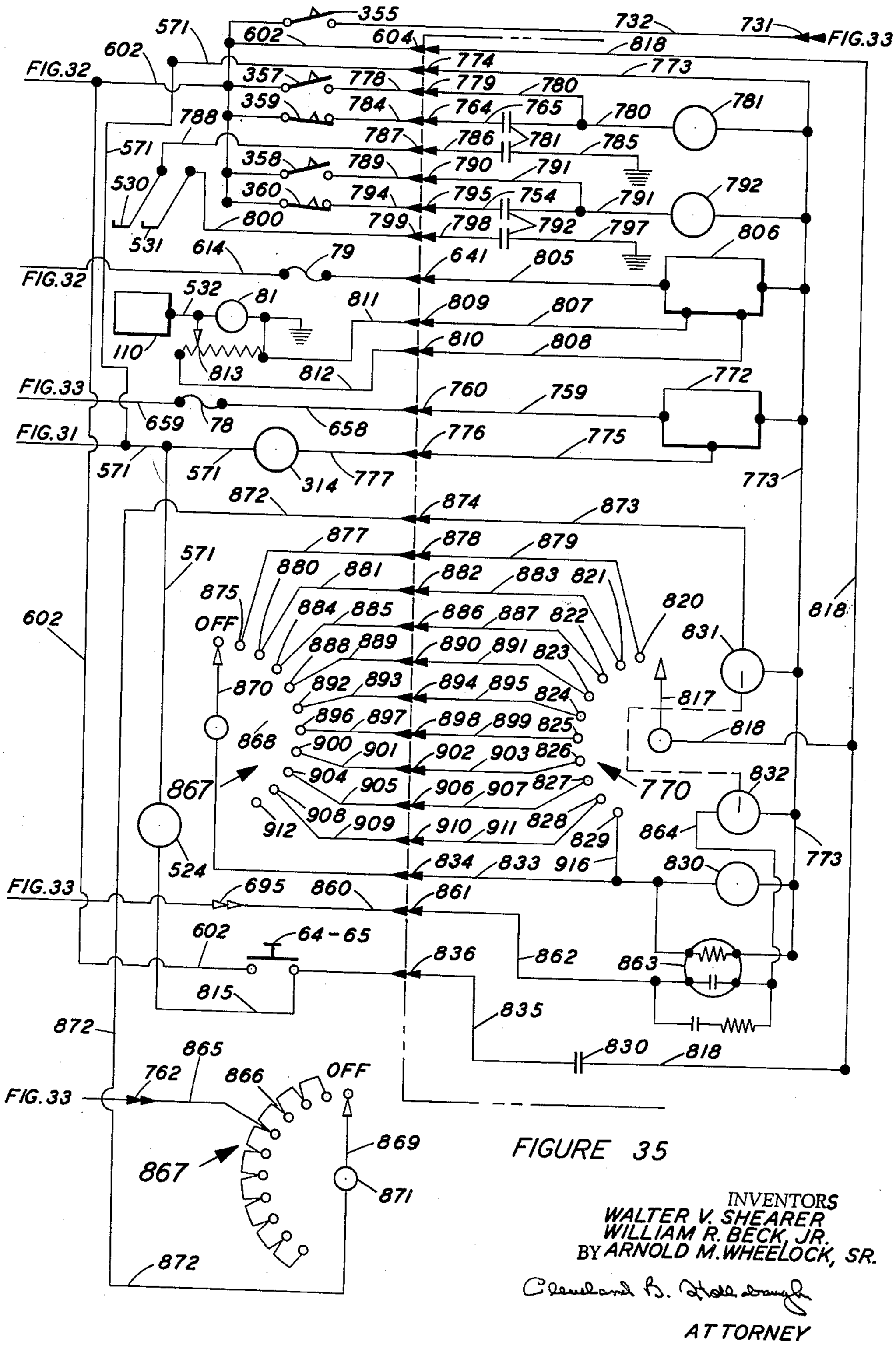

FIGURE 31 is an electrical wiring diagram of the circuits for the electric lights and lens shutter of the optical system, of the fuser unit, of the motor which runs the blower of the fuser unit, of the motor which drives the belts of the second and third sections of the conveyor system, and the motor which drives the delivery rolls and of the associated switches and fuses of the control panels of the apparatus;

FIGURE 32 is an electrical wiring diagram of the circuits for the vacuum pump motor, the solenoid air valve, the corona discharge unit, the transport motors, the toner unit, the motor which powers the first section of the conveyor system and the toner unit, the gripper solenoid control, and the associated fuses and manually-operated switches of the control panels;

FIGURE 33 is an electrical wiring diagram of the electrical components of the "A Box" and of the associated limit switches in the process section of the apparatus;

FIGURE 34 is an electrical wiring diagram of the electrical components of the "B Box," of the associated toner replenishment unit and its control switches on the control panel, and of the bias shoes and their limit-control switches in the process section of the apparatus;

FIGURE 35 is an electrical wiring diagram of the electrical components of an alternative embodiment of the "B Box," of the associated toner replenishment unit, and of its control switches on the Control Panel A, and of the bias shoes and their limit switches in the process section of the apparatus.

FIGURE 2.—COMPONENTS OF THE APPARATUS

Figure 2:
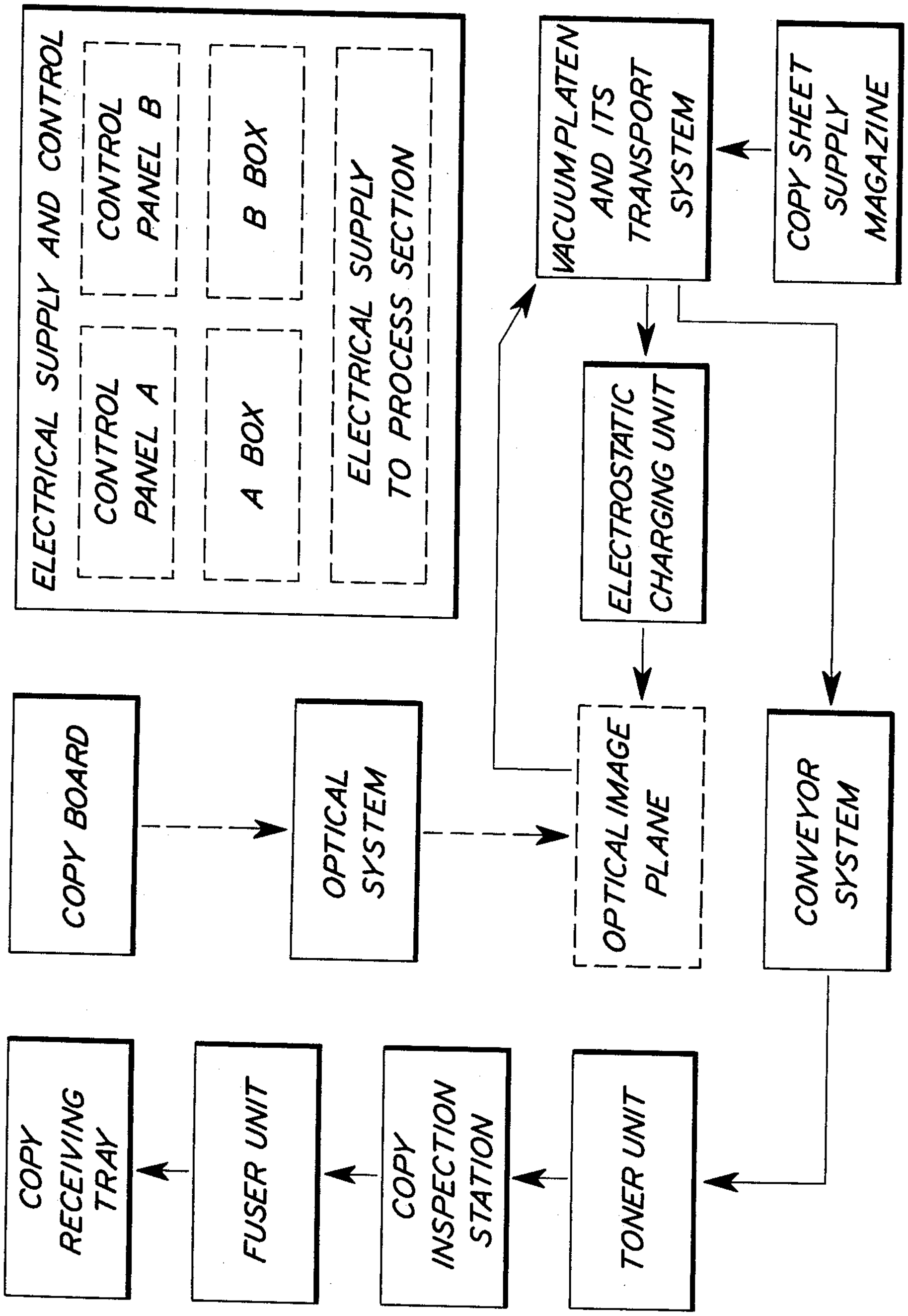
FIGURE 2 is a schematic diagram showing the various components of the apparatus, and their general relationship to each other.
Figure 12:
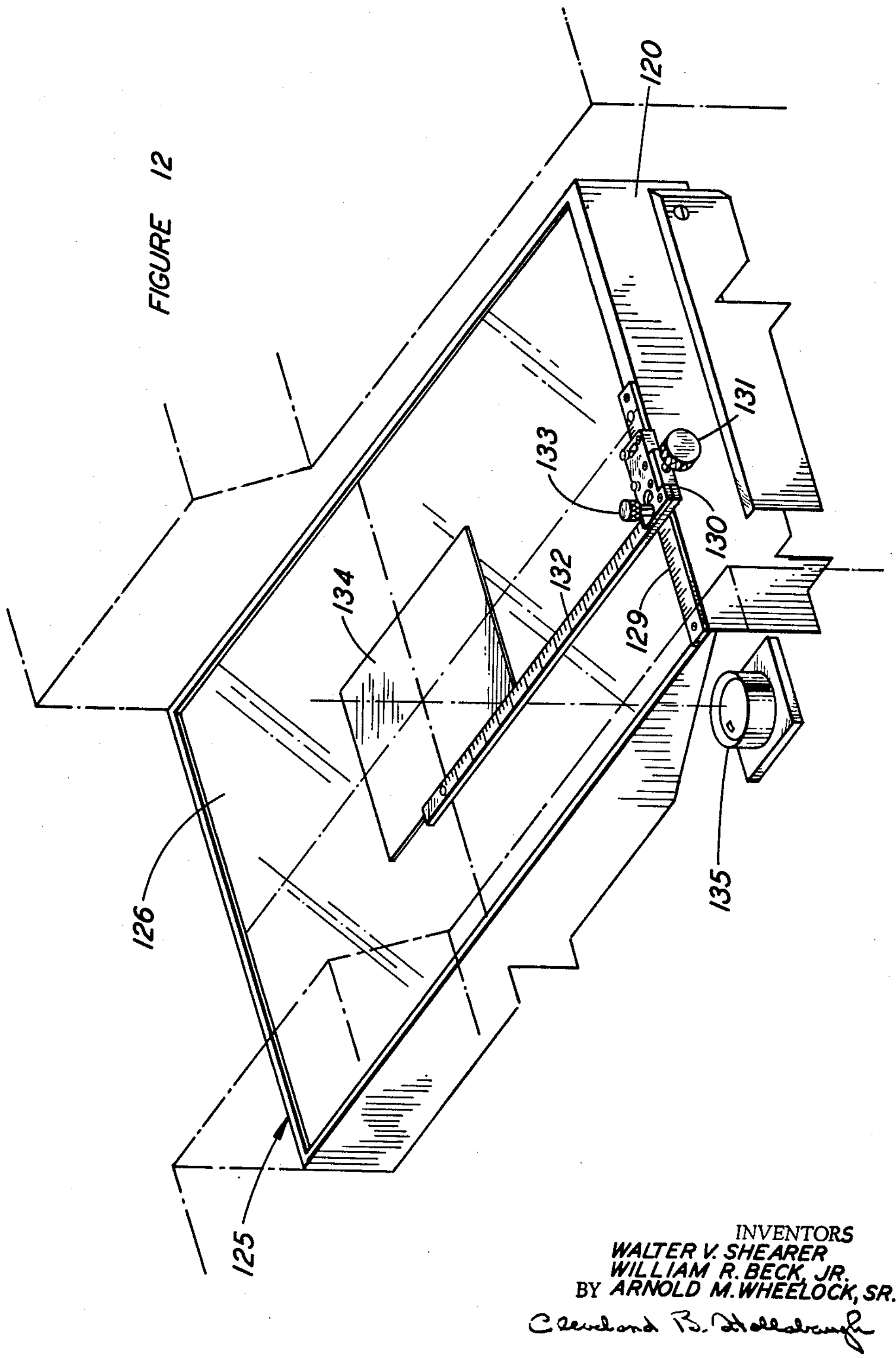
FIGURE 12 is a fragmentary, perspective view of the copyboard and of the copy-positioning guide of the apparatus.
Figure 13:
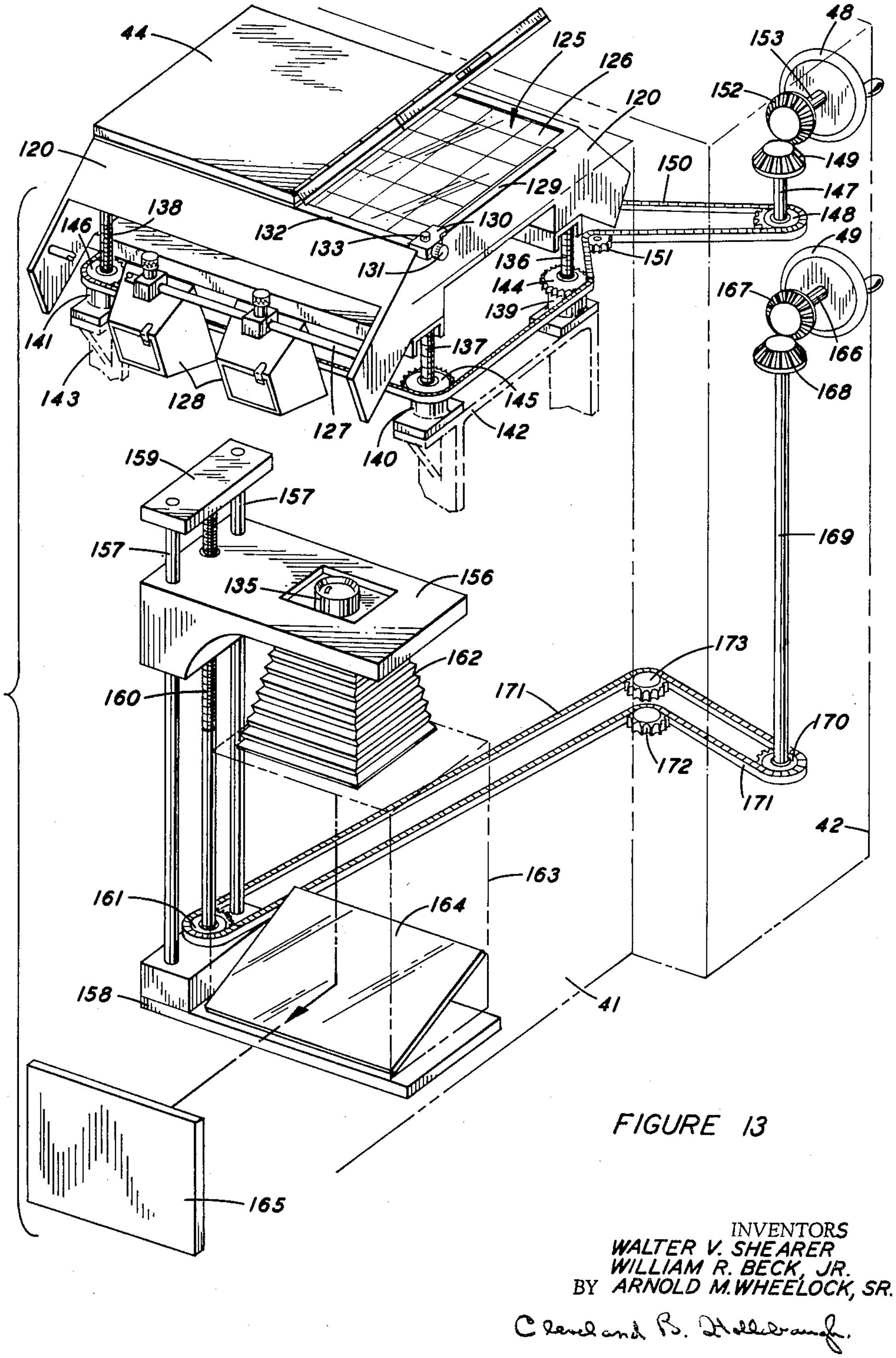
FIGURE 13 is an exploded, perspective view of the copyboard and of the optical system of the apparatus.
Figure 14:
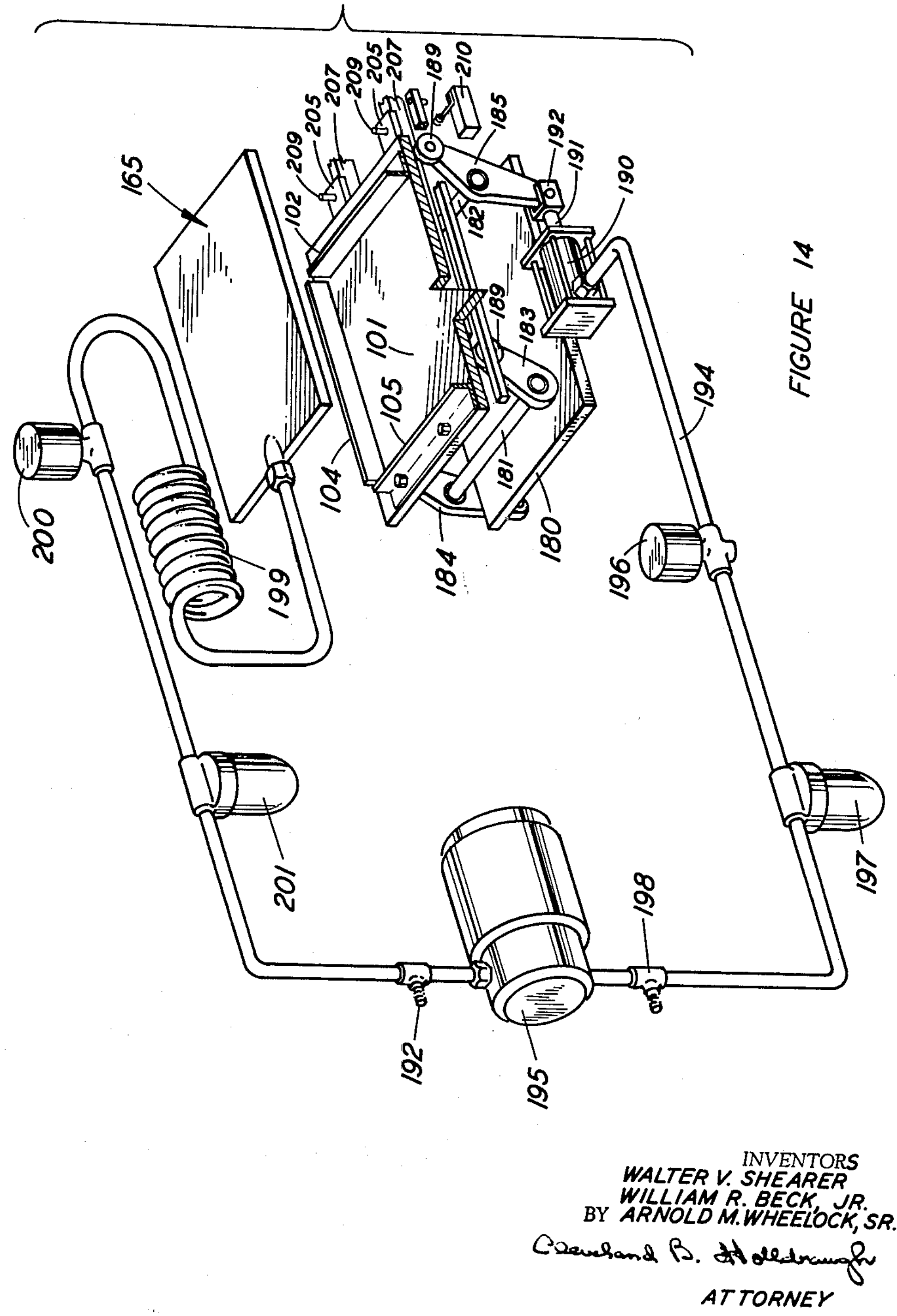
FIGURE 14 is a schematic, exploded, perspective view of the magazine for the supply of copy sheets of the apparatus, of its vacuum platen, and of the vacuum and air pressure supply associated therewith.
Figure 15:
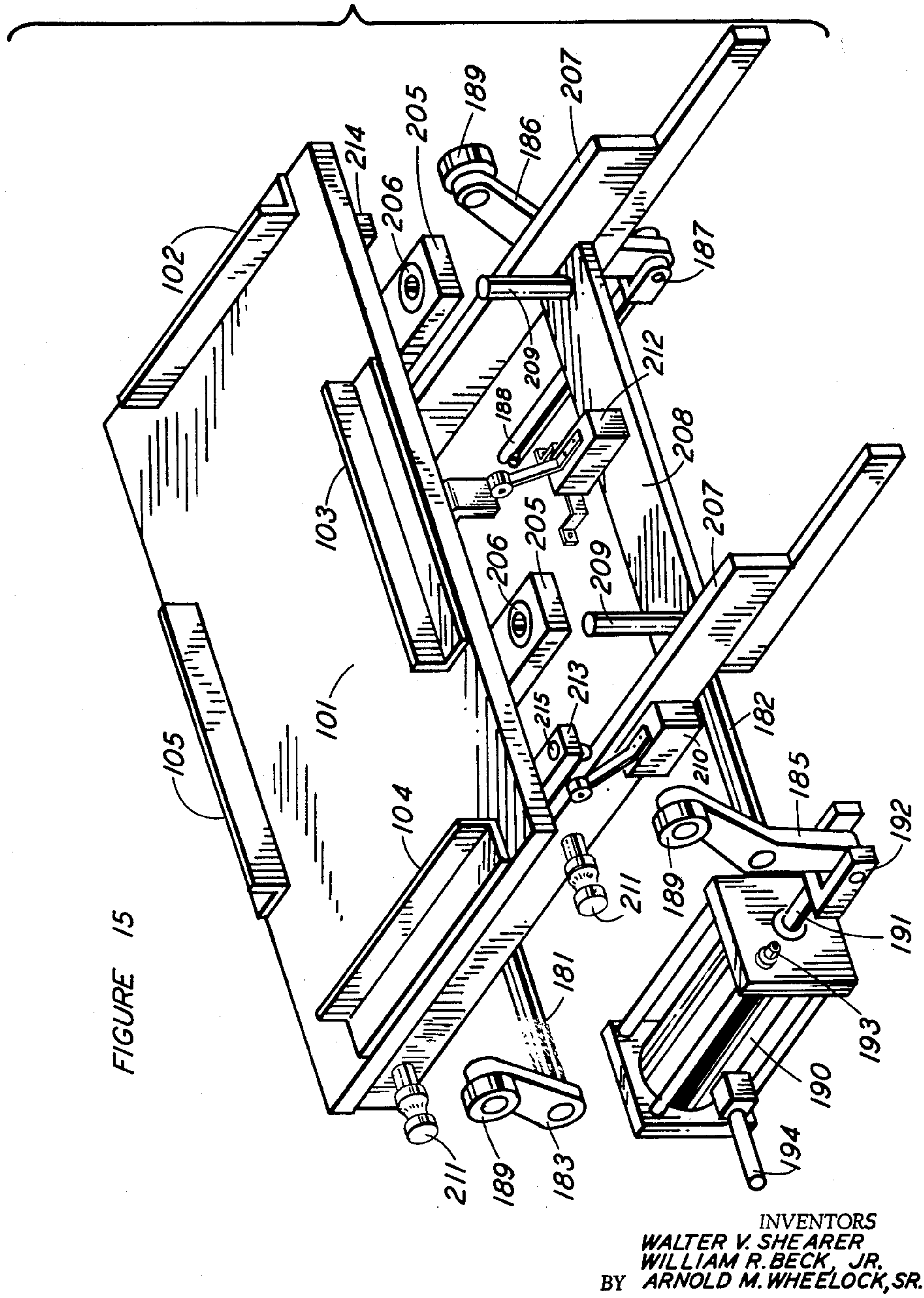
FIGURE 15 is a second exploded, perspective view of the magazine for the supply of copy sheets illustrated by FIGURE 14.
Figure 16:
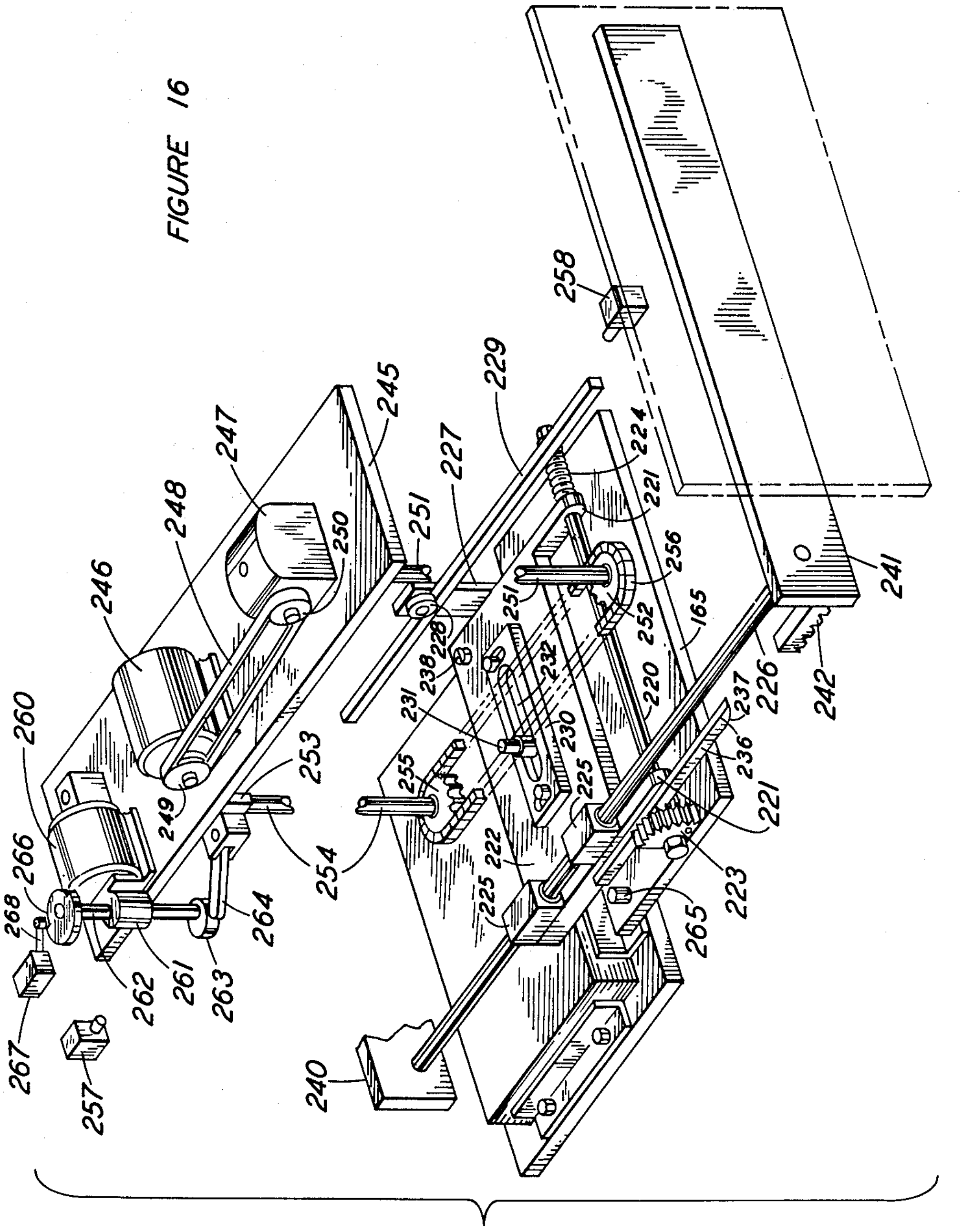
FIGURE 16 is an exploded, perspective view of the vacuum platen and of its transport mechanism, showing their relationship to the magazine for the supply of copy sheets illustrated by FIGURES 14 and 15, and to the optical image plane of the apparatus illustrated by FIGURE 13.
Figure 17:
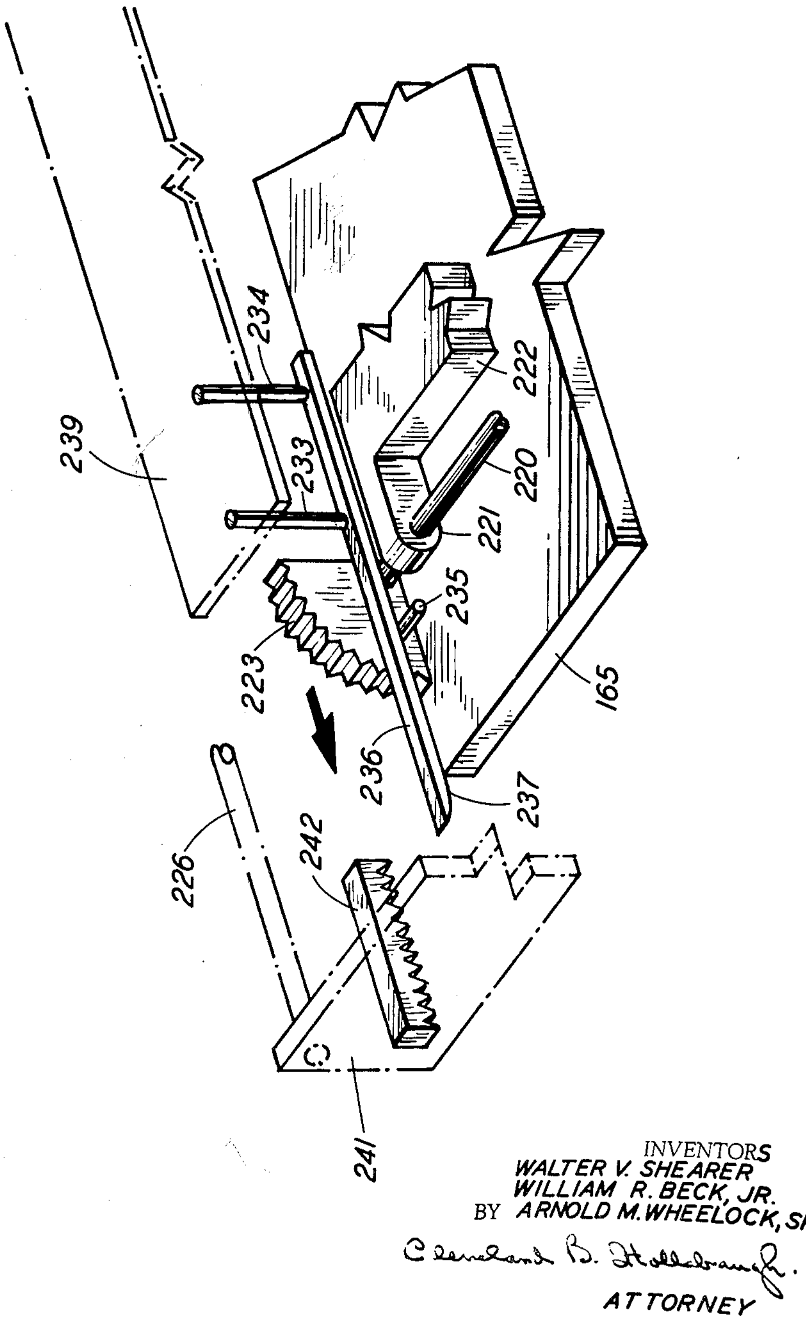
FIGURE 17 is a fragmentary, perspective view of the quarter gear on the top of the vacuum platen, and of the mechanism by which the vacuum platen is held in a horizontal plane as it is passed over the corona discharge unit of the apparatus.
Figure 18:
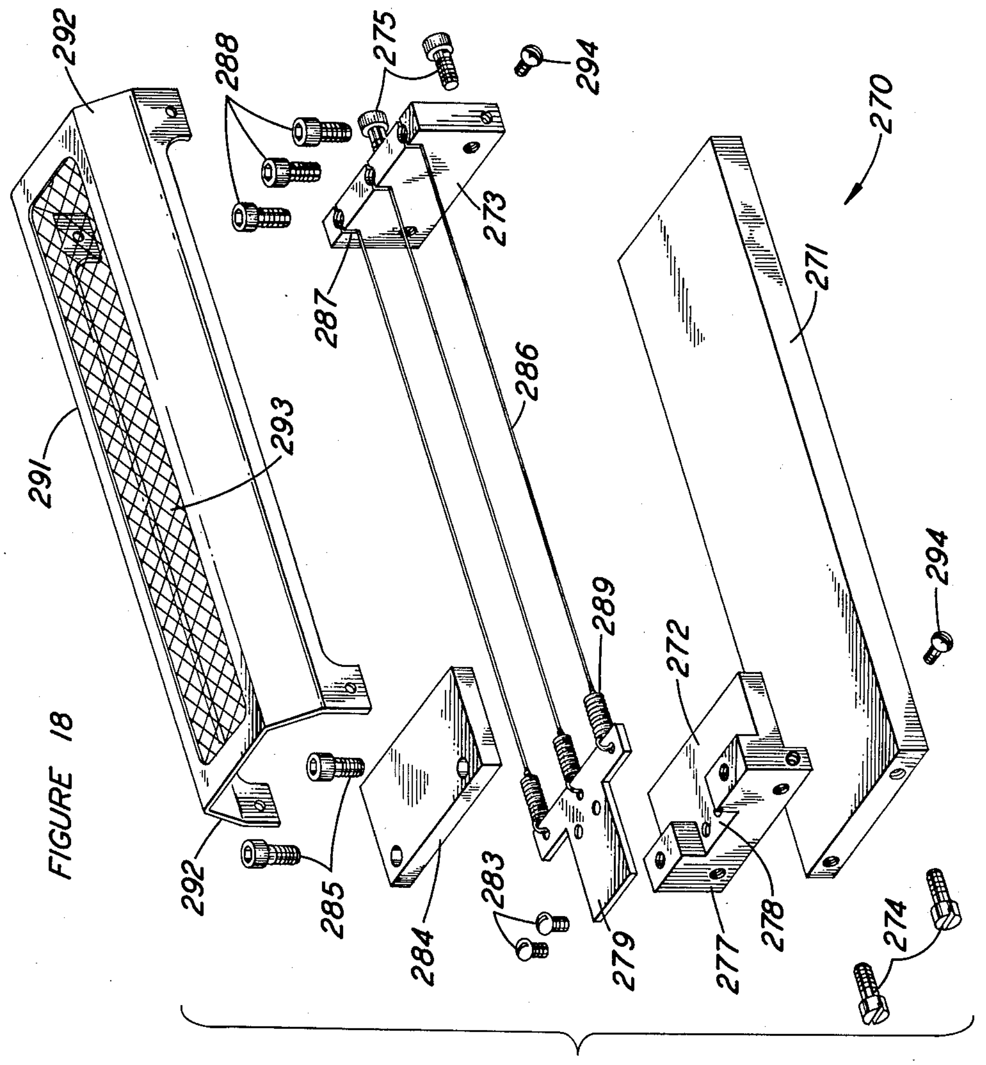
FIGURE 18 is an exploded, perspective view of the corona discharge unit of the apparatus.
Figure 19:
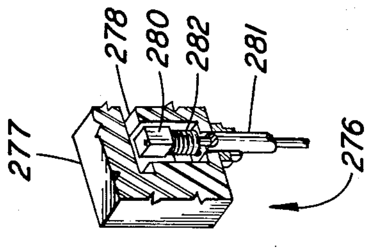
FIGURE 19 is a broken, cross-sectional view of the electrical terminal of the corona discharge unit.

Referring specifically to FIGURE 2, which shows generally the relationship of the major components of the apparatus, it will be seen that it includes a copyboard illustrated in detail by FIGURES 12 and 13; an associated optical system, illustrated by FIGURE 13; a copy sheet supply magazine, illustrated by FIGURES 14 and 15; a vacuum platen and its transport system, illustrated by FIGURES 14, 16 and 17, and an electrostatic charging unit illustrated by FIGURES 18 and 19.

As diagrammatically indicated by FIGURE 2, the copy sheet supply magazine delivers a copy sheet to the vacuum platen of the apparatus, which is then carried by its transport system to pass the photoelectrostatic surface of the copy sheet over the electrostaic charging unit to impose an electrostatic charge on its surface, to position the copy sheet in the optical image plane and then return the platen to a position laterally displaced from its initial position over the copy sheet supply magazine.

The apparatus also includes a conveyor system which is illustrated in detail by FIGURES 20, 21, 22, 23, 24 and 25. This conveyor system receives the copy sheet, bearing a latent electrostatic image, from the vacuum platen while it is in its laterally-displaced position and carries it over a toner unit, illustrated in detail by FIGURES 26, 27 and 28, to develop its latent electrostatic image. The conveyor system continues the sheet under a fuser unit, illustrated by FIGURE 29 or FIGURE 30. In passing the sheet between the toner unit and the fuser unit, the conveyor system passes the copy sheet through a copy-inspection station, best illustrated by FIGURE 3. After passing the copy sheet under the fuser unit to fix the toner image on its surface, the conveyor system delivers the copy sheet to the copy-receiving tray, which is illustrated by FIGURE 3.

These operations are carried out on an automatic basis by the electrical supply and control system of the apparatus. As indicated by FIGURE 2, the electrical system of the apparatus includes the Control Panel A illustrated by FIGURE 5, the Control Panel B illustrated by FIGURE 6, and the "A" and "B" electrical boxes. The electrical circuits of the Control Panels A and B and the electrical supply circuits of the process section of the apparatus are shown by FIGURES 31 and 32. The electrical circuits of A Box and the associated limit switches within the process section, are shown by FIGURE 33. The electrical circuits of B box, the associated limit switches in the process section, and the toner replenishment switches of Panel A are shown by FIGURE 34. In alternative form of the electrical circuits of B Box and of a rotary-type toner replenishment switch, are illustrated by FIGURE 35.

FIGURES 3–9, INCLUSIVE.—THE EXTERNAL FEATURES OF THE APPARATUS

Figure 3:
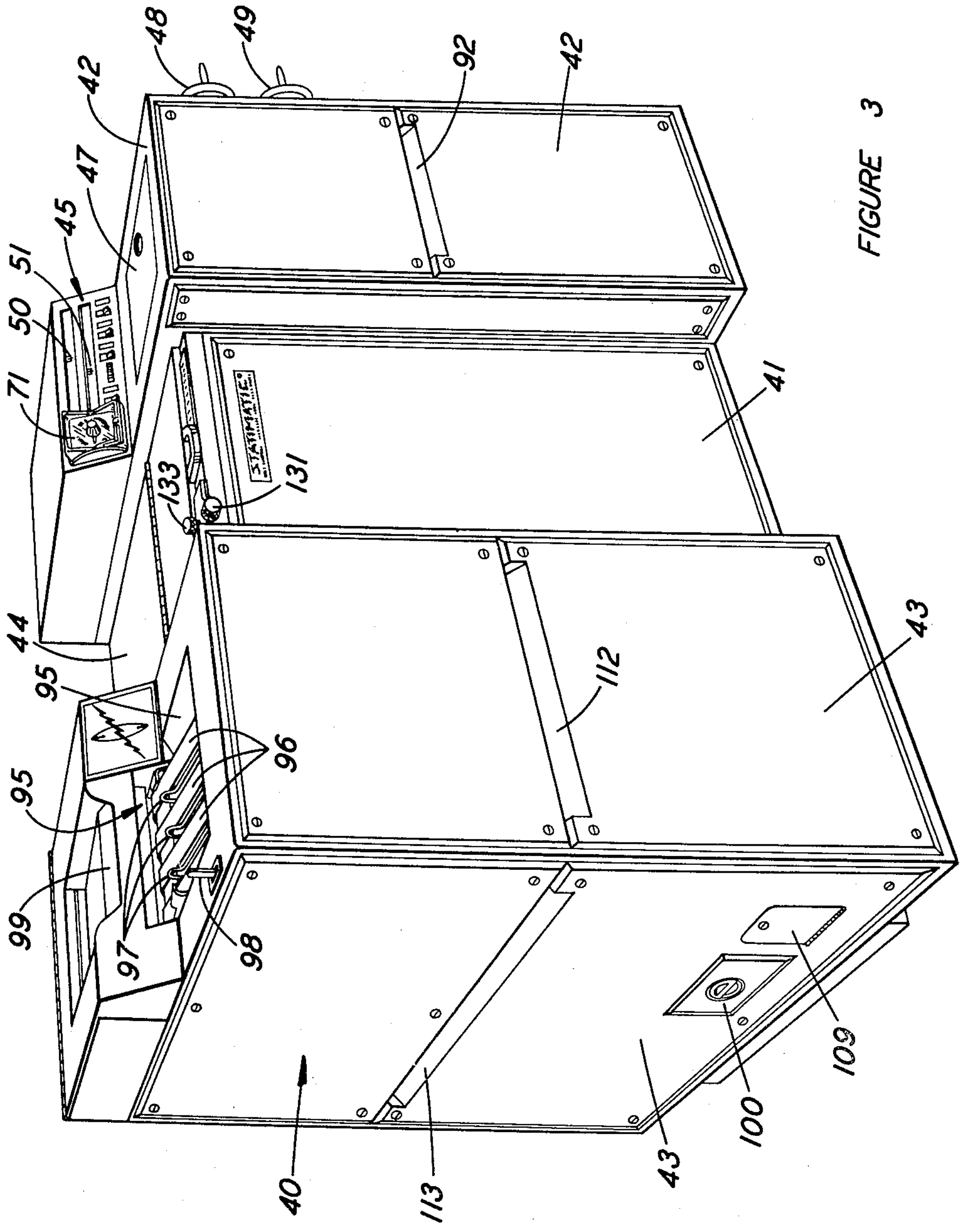
FIGURE 3 is a perspective view of the outside of one embodiment of the apparatus, showing the front or operating side of the cabinet, its left-hand end, and its upper working surface.
Figure 4:
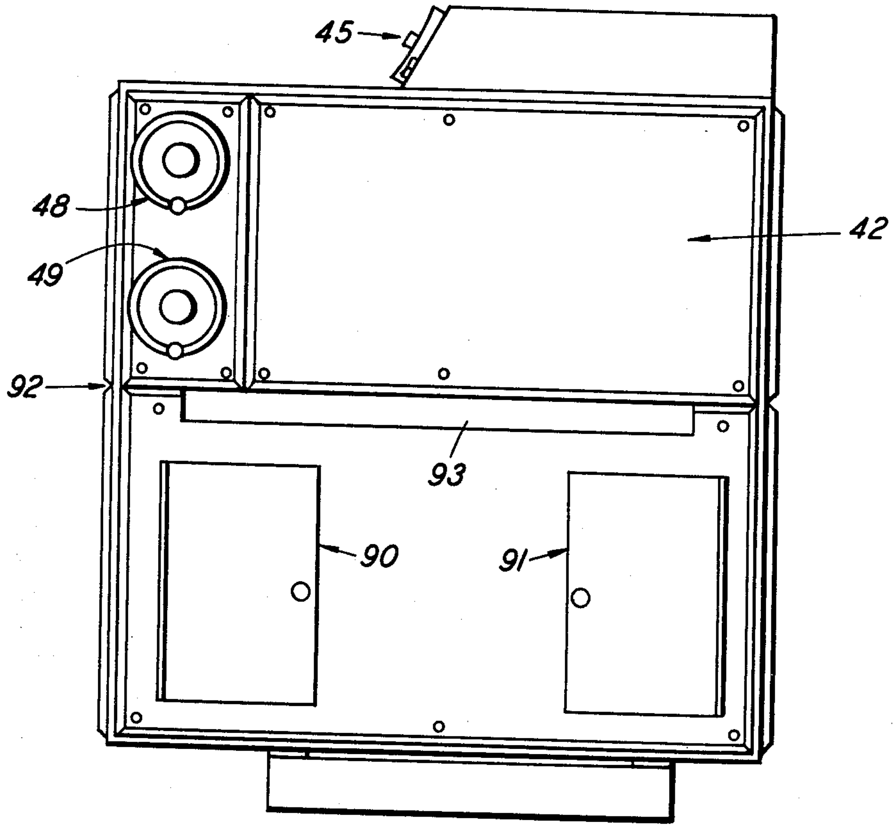
FIGURE 4 is an elevation of the right end of the outside of the apparatus illustrated by FIGURE 3.
Figure 7:
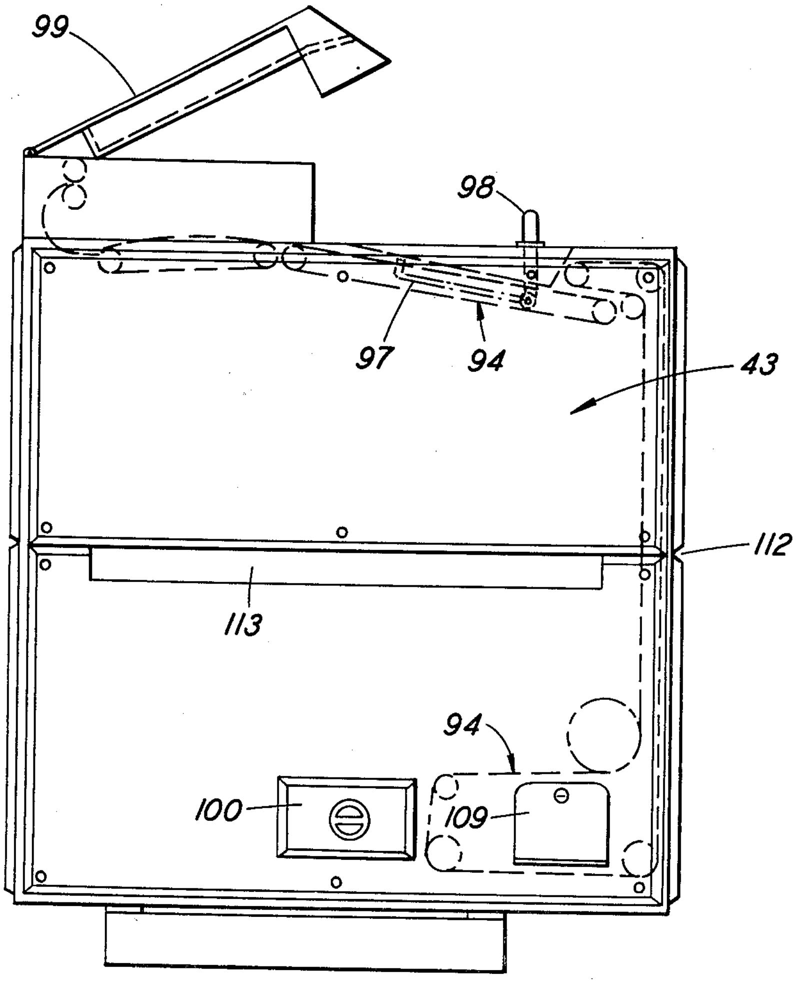
FIGURE 7 is an elevation of the left end of the outside of the apparatus of FIGURE 3, showing in broken outline the position of its second transport system, and the cover surrounding the copy-receiving station in open position.

Referring specifically to FIGURES 3, 4 and 7, it will be seen that the outside of this apparatus is a cabinet, indicated generally by the numeral 40, which is generally rectangular in shape and made up of three sections; a center section 41, a right-hand section 42, and a left-hand section 43. FIGURE 3 shows the front or operating side of the appaartus, its top working surface, and its left-hand side. The cover for the copyboard 44 forms the top of the center section 41 and the optical system, illustrated by FIGURE 13, is within this center section 41. The copyboard, beneath the cover 44, is at a convenient working level for an operator standing in front of it.

The right-hand section 42 of this apparatus carries Control Panel A, indicated generally by the numeral 45, and Control Panel B, indicated generally by the numeral 46, on its upper surface. These control panels are illustrated in detail by FIGURES 5 and 6, respectively. As shown by FIGURE 6, the control panel 46 is protected by a hinged cover 47 which, when closed, provides a working surface adjacent the copyboard 44. As best shown by FIGURE 4, this right-hand section 42 has the hand control wheels 48 and 49 on its right side near its top front corner, at a location convenient for operation by the operator of the apparatus, adapted for the adjustment of the optical system of the apparatus to secure the desired relationship between the size of the reproduced copy as compared with that of the original, while viewing the control panel 45.

The hand wheel 48 adjusts the position of the copyboard of the apparatus and its associated lighting system along a vertical line of travel. The position of the copyboard relative to the optical system of the apparatus is shown by the indicator 50 on the control panel 45. The hand wheel 49 adjusts the position of the lens of the optical system along a vertical line of travel. The relative position of the lens is shown by the indicator 51 on the control panel 45. The indicators 50 and 51 are connected, respectively, by wires or cords carried by suitably-positioned pulleys, to the frame of the copyboard and to the plate which carries the lens of the optical system and, respectively, move with the movement of the copyboard and the lens. The indicators 50 and 51 move horizontally in front of stationary scales, from which the respective positions of the copyboard and lens can be read. By the operation of the hand-wheels 48 and 49, the optical system of the apparatus can be adjusted to give a clearlyfocused light image in the optical image plane of the apparatus, which is the same in size as the original copy, reduced in size, or enlarged in size, as may be desired.

Figure 5:
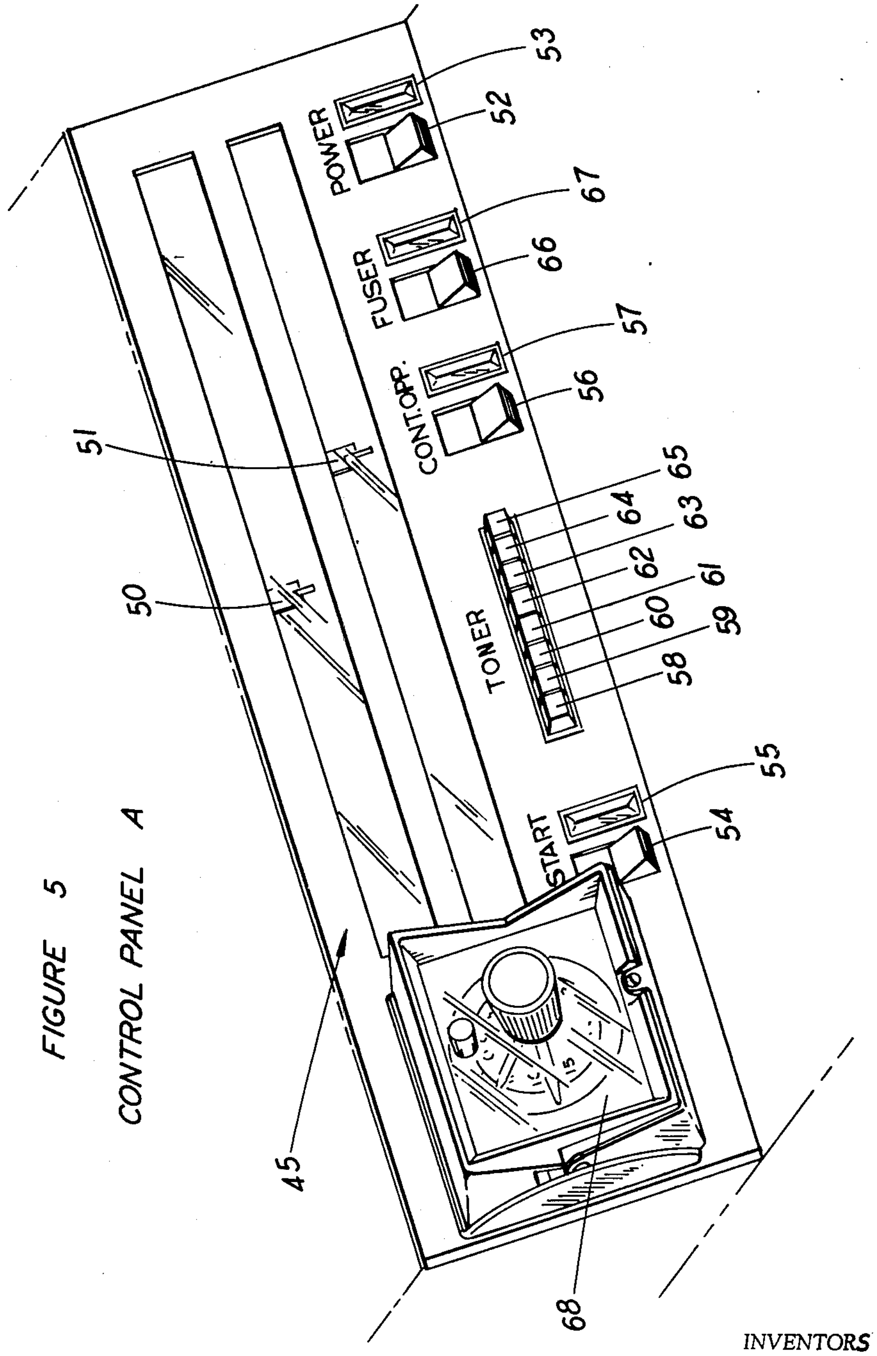
FIGURE 5 is a perspective view of Control Panel A of the apparatus illustrated by FIGURE 3.
Figure 6:
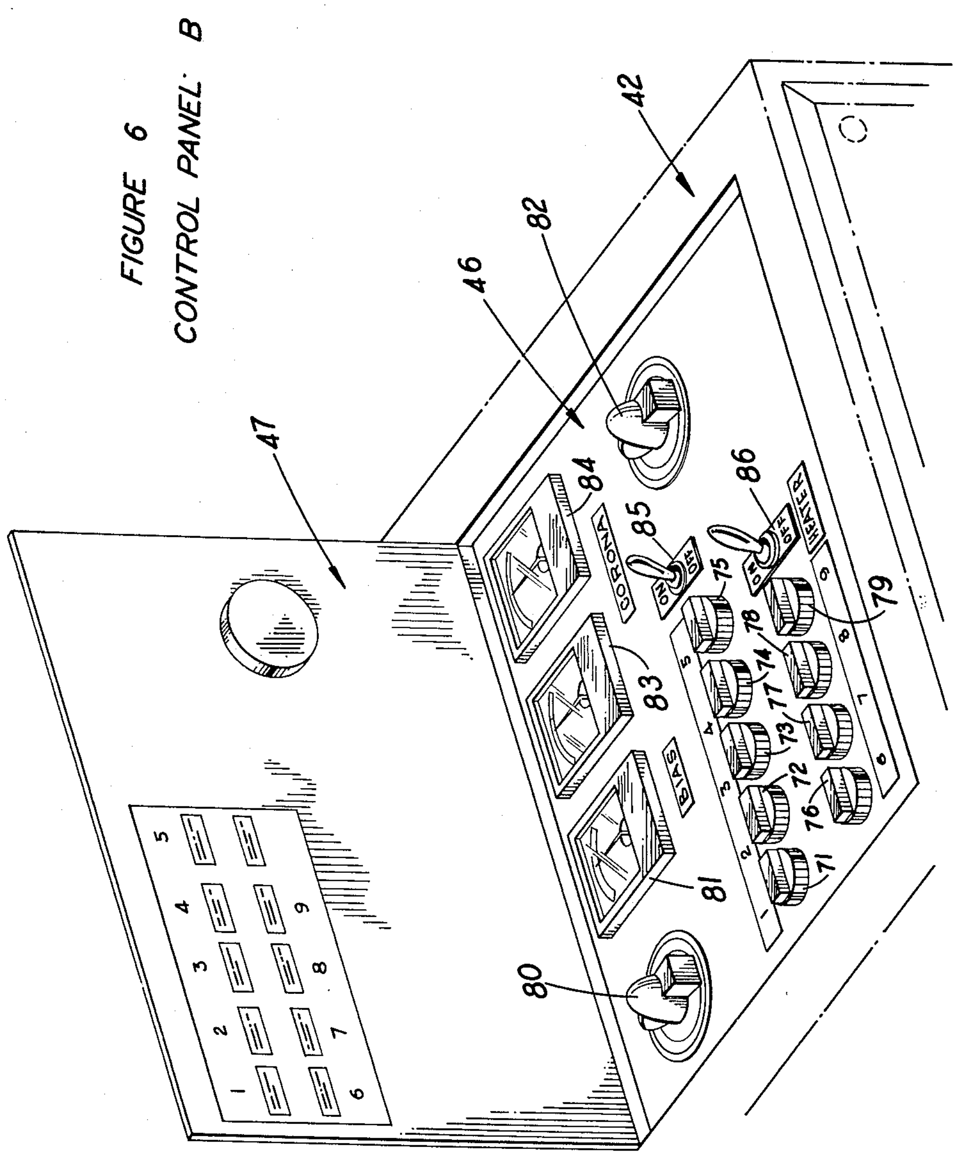
FIGURE 6 is a perspective view of Control Panel B of the apparatus illustrated by FIGURE 3.

As can best be seen by reference to FIGURE 5, the control panel 45 carries, in addition to the indicators 50 and 51, a master electric power switch 52 by which the electrical supply to the apparatus can be turned on or off. The pilot light 53 shows whether this switch is on or off. It carries a starting switch 54 by which the apparatus can be placed into operation and complete the sequence of steps required to complete one photoelectrostatic copy, after which the apparatus stops operating. The pilot light 55 shows whether the switch 54 is on or off. The switch 56 places the apparatus in automatic operation, which will continue to produce photoelectrostatic copies until this switch is pressed a second time. After the switch 56 is pressed a second time, the apparatus continues the sequence of steps required to complete a copy in process at that instant. The pilot light 57 indicates whether the switch 56 is on or off.

The switches 59, 60, 61, 62 and 63 automatically control, at different rates, the replenishment of toner in the toner mix in the toner unit, in terms of the number of copies produced between successive additions of an increasement of toner to the toner mix. The closing of switch 59 causes the addition of an increasement of toner, after the production of each fourth successive copy; the switch 60 causes the addition of an increasement of toner after the production of each eighth copy; the switch 61 causes the addition of an increasement of toner after the production of each twelfth copy; the switch 62 causes the addition of an increasement of toner after the production of each sixteenth copy; and the closing of the switch 63 causes the addition of an increasement of toner after the production of each twentieth copy. This automatic addition of toner increasements at the rate determined by the particular one of the switches 59, 60, 61, 62 and 63 which is closed, continues until the switch 58 is closed to stop the automatic addition.

As an alternative to the use of separate push-button types of switches for the automatic replenishment of toner, the control panel 45 may be provided with a single rotary switch which is provided with ten contacts, the first or last of which is a dead terminal with no electrical connection. The wiring diagram shown by FIGURE 33 shows the electrical circuits for such a rotary switch.

The switch 64 permits manual control of the addition of toner. The closing of this switch starts the addition of the toner, which continues until the switch 65 is closed.

The fuser switch 66 is one of two switches which must be closed to operate the fuser unit of the apparatus, as will be fully explained below. The second switch which must be closed to operate the fuser unit is carried by the control panel 46. The pilot light 67, on control panel 45, glows when both of these switches are closed and the fuser unit is in operation.

This control panel 45 carries, in addition, an exposure timer 68, by which the operator can fix the period of time during which the copy sheet bearing an electrostatic charge is exposed to a light image. Thus, this control panel provides in one convenient location, each of the controls required for either the manual or the automatic operation of the apparatus.

Referring to FIGURE 6, it will be seen that the control panel 46 carries a series of nine fuses. Fuse 71 is in the alternating current control circuit; fuse 72 is in the electrical circuit to the blower motor of the fuser unit; fuse 73 is in the electrical circuit to the motor of the vacuum pump; fuse 74 is in the electrical circuit to the motor of the transport system; fuse 75 is in the electrical circuit of the conveyor motor; fuse 76 is in the electrical circuit of the direct current control system; fuse 77 is in the electrical circuit of the corona discharge unit; fuse 78 is in the electrical circuit of the brake on the conveyor system, and fuse 79 is in the electrical circuit which provides a bias voltage to the toner unit.

Still referring to FIGURE 6, the knob 80 regulates the potentiometer which determines the voltage of the bias on the toning unit, which is registered by the voltmeter 81. The knob 82 regulates the high-voltage power supply to the corona discharge unit and, thereby, determines the voltage of the electrical current supplied to that unit. The voltage of that current is registered by the voltmeter 83, while its amperage is shown by the ammeter 84. That current may be turned on and off by the switch 85. The switch 86 controls the current to the blower motor of the fuser unit, to the motor which drives the second and third sections of the conveyor system, and the motor which drives the delivery rolls of the conveyor system, and must be closed before current can be supplied to the fuser unit by the closing of the switch 69 on the control panel 45.

Referring to FIGURE 4, it will be seen that the right-hand end of the cabinet of this apparatus has two doors 90 and 91, which provide access to the electrical supply and control equipment of the apparatus. As already noted and as fully described hereinafter, the electrical controls of the apparatus are in two units, A Box and B Box, each of which can be conveniently disconnected and removed from the apparatus for repair or replacement. A Box is located behind door 90, and B Box is behind door 91.

The right-hand section 42 of the cabinet 40 has slots 92 and 93 on its front and side, respectively, which provide ventilation for its interior to permit the escape of heat released by the electrical equipment.

Referring again to FIGURE 3 and to FIGURE 7, the left-hand section 43 of the cabinet 40 contains the copy sheet supply magazine, the vacuum platen and its associated transport system, the electrostatic charging unit, the conveyor system, and the fuser unit of the apparatus, and has the copy-inspection station and the copy-receiving station at its upper surface. The conveyor system, designated generally by the numeral 94, is shown in broken outline by FIGURE 7.

Referring specifically to FIGURE 3, it will be seen that the top of this section 43 has a rectangular opening 95 which exposes the inspection station of the second section of the conveyor system 94 of the apparatus. The belts 96, 96 of the second section of the conveyor system can be seen in the opening 95, together with the rods 97, 97 which form the rack by which a sheet can be lifted from the belts 96, 96 for removal from the apparatus. These rods are raised and lowered by the use of the lever 98 on the top of the apparatus. The top of this section 43 is also provided with a tray 99 which is the copy-receiving station of the apparatus. As can be seen by reference to FIGURE 7, this tray 99 is hinged on its rearwardly edge to permit it to be raised to permit access to the fuser unit of the apparatus.

Figure 8:
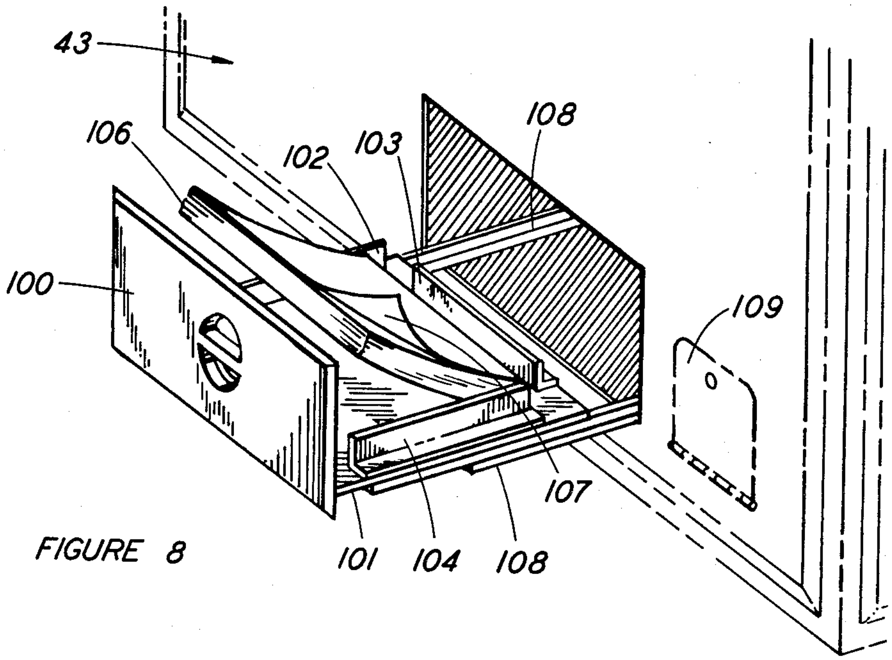
FIGURE 8 is a fragmentary, perspective view of the lower part of the left end of the outside of the apparatus of FIGURE 3, showing the copy-carrier plate of the copy-supply magazine pulled out of the cabinet of the apparatus, and diagrammatically illustrating the replenishment of the supply of copy sheets.

Still referring to FIGURE 3 and to FIGURE 8, the side of the left-hand section 43 of the cabinet 40 is provided with a pull-out drawer 100 by which the copy-receiving plate of the copy supply magazine can be pulled out of the cabinet to replenish the supply in the magazine of the apparatus, as shown by FIGURE 8. The bottom of the drawer 100 is the plate 101 of the copy sheet supply magazine, which is provided with the up-standing guide walls 102, 103, 104 and 105 and which is free to move along a vertical path guided by guide pins, as more fully described hereinafter. The guide wall 104, which is adjacent the toner unit of the apparatus when the drawer 100 is in closed position, is made of an electrically insulating material. The guide wall 105 cannot be seen in FIGURE 8, since it is behind the front of the drawer 100. It will be seen that the copy sheet supply 106 is inserted into the drawer within the guide walls 102, 103, 104 and 105 while protected from light by an opaque sheet 107, which is removed as the drawer is closed. The plate 101 is carried by telescoping rails 108, 108 and, when the drawer 100 is in closed position, the plate 101 is in its operating position as a part of the copy sheet supply magazine.

Figure 9:
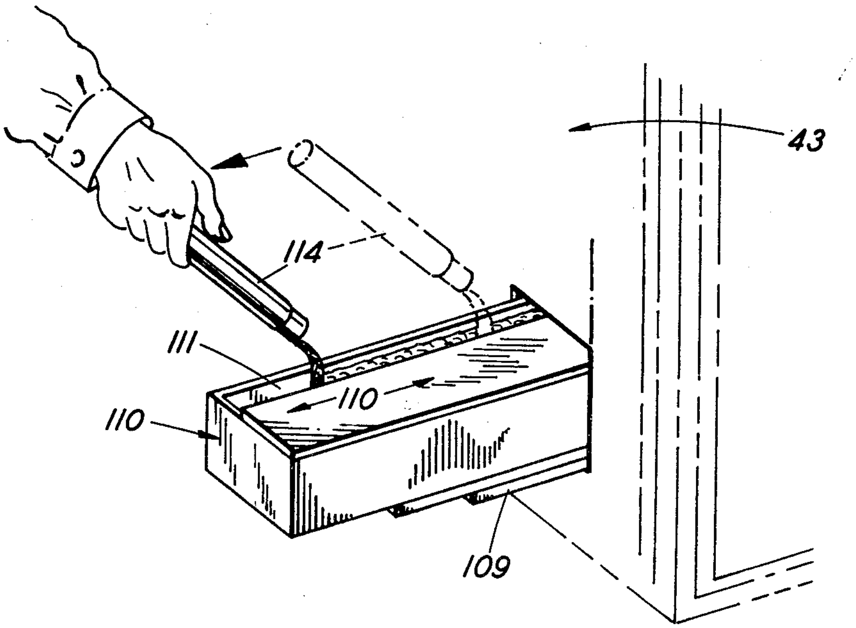
FIGURE 9 is a fragmentary, perspective view of the lower part of the left end of the outside of the apparatus, schematically showing the toner unit of the apparatus pulled out of the cabinet, and digrammatically illustrating the replenishment of the supply of toner within the apparatus.

The side of this left-hand section 43 is also provided with a door 109 which provides access to the toner unit of the apparatus. The toner unit, designated generally by the numeral 110, can be slid outwardly through this door 109 for the replenishment of the toner supply in its compartment 111, as shown diagrammatically by FIGURE 9. Referring specifically to FIGURE 9, it will be seen that the toner is replenished in compartment 111 by merely pouring a new supply into the compartment from the container 114.

As best shown by FIGURE 3, the left-hand section 43 of the cabinet 40 is provided with slots 112, 113 in its front and side, respectively, which provide ventilation which permits the escape of heat released by the electrostatic charging unit, the fuser unit and the several electric motors therein. The slots 112, 113, together with the corresponding slots 92, 93 of section 42, are a decorative feature of the cabinet 40.

FIGURES 10 AND 11.—ALTERNATIVE FORM OF APPARATUS

Figure 11:
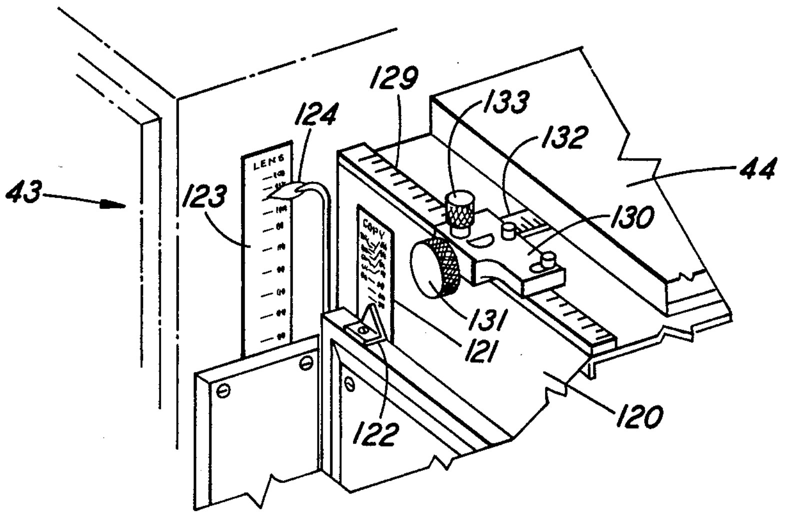
FIGURE 11 is a fragmentary view of the indicators for the relative positions of the copyboard and of the lens of the embodiment of the apparatus illustrated by FIGURE 10.
Figure 10:
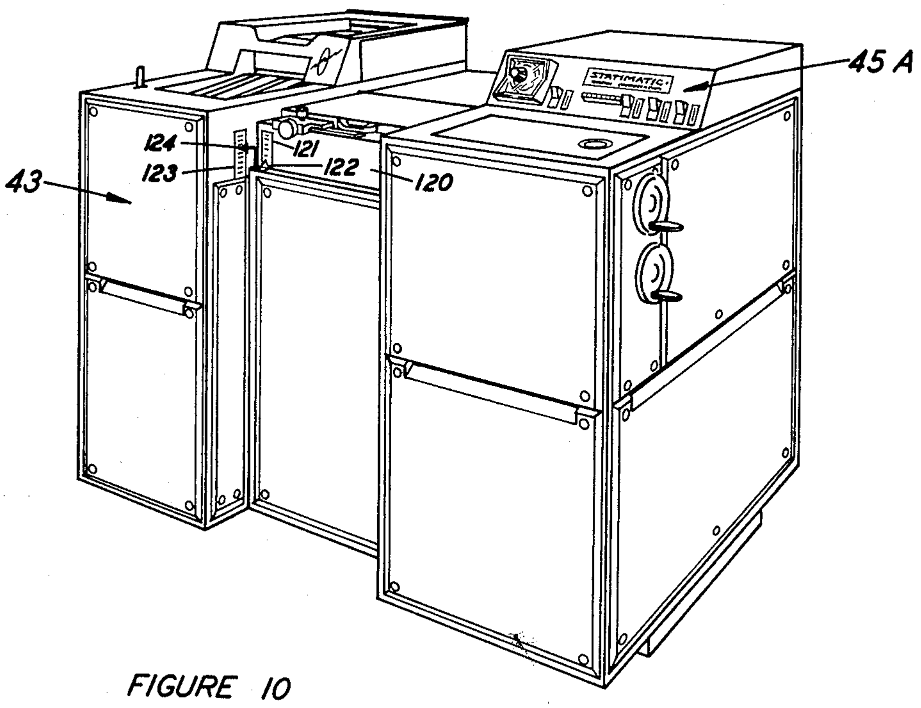
FIGURE 10 is a perspective view of an alternative embodiment of the apparatus of this invention.

FIGURES 10 and 11 illustrate a modified form of the apparatus in accordance with this invention which differs from that described in the foregoing, in the position of the indicators which show the positions of the copyboard and the lens system. Referring to those figures, it will be seen that the frame 120 of the copyboard carries a scale 121, while the upper edge of the front panel of the center section 41 of the cabinet 40 carries a pointer 122. As the copyboard is moved upwardly and downwardly by the operation of the hand wheel 48, the scale 121 moves with it and the pointer 122 shows the exact position of the copyboard.

The scale 123 for the indication of the position of the lens system, is affixed to the edge of section 43 of the cabinet 40. The pointer 124 is the end of a rod which is attached at its other end to the plate which carries the lens of the optical system, which is fully described hereinafter with reference to FIGURE 13. As this lens plate and the lens which it carries are adjusted upwardly and downwardly by the operation of the hand wheel 49, the pointer 124 is correspondingly moved and shows the exact position of the lens by its position relative to the scale 123.

As shown by FIGURE 10, in this alternative form of the apparatus the control panel 45A is identical with the control panel 45 described with reference to FIGURE 5, except for the omission of the copyboard position indicator 50 and the lens position indicator 51. Other than for the differences in the positions of the copyboard and lens position indicators, these alternative forms of the apparatus are identical.

These alternative means for indicating the position of the copyboard and of the lens are advantageous in that they are simple and positive in action, with no parts to get out of adjustment.

FIGURES 12 AND 13.—THE COPYBOARD AND OPTICAL SYSTEM OF THE APPARATUS

The details of the copyboard and the optical system carried by the center section 41 of the cabinet 40, are shown by FIGURES 12 and 13. Referring specifically to those figures, it will be seen that the copyboard 125 consists of a transparent sheet 126 which provides a horizontal surface on which an original copy to be reproduced is positioned facing downwardly, and a hinged cover 44, both of which are carried by a rigid frame 120. The frame 120 also carries light bars 127, 127 along each side, one of which can be seen in FIGURE 12. These light bars carry electric lamps 128, 128 adjustably positioned thereon. Each of these light bars are detachable from the frame 120 as a unit to permit its removal from the apparatus for the replacement of bulbs, adjustment, cleaning etc. As shown by FIGURE 13, the lamps 128, 128 are at a lower level than the sheet 126, and are each spaced away from the adjacent edge of the sheet 126, so they are not directly beneath it.

The electric lamps 128, 128 are disposed in positions with respect to the transparent surface 126 of the copyboard 125, to non-uniformly illuminate the transparent surface with an intensity of illumination which increases outwardly from a point directly above the axis of the lens system to the periphery of that surface, in a proportion which gives uniform illumination reflected from a white surface on the transparent surface 126, at the vertical optical image plane of the apparatus.

Referring specifically to FIGURE 12, it will be seen that the upper edge of frame 120 of the copyboard carries a fixed scale 129 forming a part of a copy position indicator. The slide 130 can be moved back-and-forth along the scale 129 and locked in any desired position by means of the thumb screw 131. The slide 130 carries the end of a rule 132 which is affixed thereto by the thumb screw 133. The rule 132 rests on the surface of the sheet 126 of the copyboard, and is free to slide across its surface as the slide 130 is moved along the scale 129. As will be seen from FIGURE 12, an original 134 to be copied can be centered over the lens and shutter 135 of the optical system by adjusting the position of the slide 130 on the fixed scale 129 and then, with the edge of the original 134 against the side of the rule 132, adjusting its position relative to the scale on that rule. After the original is properly positioned, the cover 44 of the copyboard is closed to retain it in position.

Referring specifically to FIGURE 13, it will be seen that the frame 120 is carried by four threaded shafts, three of which 136, 137 and 138, are visible in the drawing. The lower ends of these shafts are mounted in bearings 139, 140 and 141. The bearings 139 and 140 are, in turn, mounted on the frame 142, while the bearing 141 and a similar bearing, not shown by the drawing, are mounted on frame 143. The frames 142 and 143, shown broken away in the drawing, are supported by a lower frame of the apparatus. The four threaded shafts supporting the frame 120 including 136, 137 and 138 shown by the drawing, are threaded into internally-threaded collars attached to the frame 120 so that when the shafts are rotated the frame 120 is raised or lowered, depending upon the direction of rotation of the shafts. Each of these four shafts carry sprockets, of which 144, 145 and 146 on shafts 136, 137 and 138, respectively, are shown by the drawing.

The vertical shaft 147 is carried by a journal attached to the frame and carries a sprocket 148 on its lower end, and a beveled gear 149 on its upper end. The chain 150 passes around the sprockets 148, 144, 145 and 146, as well as around the sprocket on the fourth of the shafts which carry the frame 120. The idler sprocket 151 on the outer side of the chain 150 keeps the chain meshed with the sprocket 144. The beveled gear 149 on the upper end of the vertical shaft 147, is meshed with a second beveled gear 152 on the inner end of the horizontal shaft 153 which is carried by a journal attached to the frame of the apparatus, and extends through the right-side wall of the cabinet 40 of the apparatus. The outer end of the horizontal shaft 153 carries the hand wheel 48 to which reference has already been made. The rotation of the hand wheel 48 rotates the four shafts including 136, 137 and 138, and raises or lowers the frame 120 of the copyboard, as may be desired.

The four threaded shafts including shafts 136, 137 and 138 shown by FIGURE 13, provide a convenient and effective means for leveling the transparent sheet 126 of the copyboard 125. As can readily be appreciated, the plane of the upper surface of the transparent sheet 126 of the copyboard must be exactly normal to the axis of the lens system 135 of this optical system. The practical way to obtain this normal relationship is to align the axis of the lens system 135 perpendicularly, and to position the surface of the transparent sheet 126 in a horizontal plane by the adjustment of the position of its frame 120.

A precise adjustment of the frame 120 to position the transparent sheet 126 in a horizontal plane, can be readily accomplished in this apparatus by detaching the sprockets 144, 145 and 146 from the threaded shafts 136, 137 and 138 shown by FIGURE 13, and detaching the fourth sprocket from the fourth threaded shaft supporting the frame 120, not shown by FIGURE 13, and then rotating the threaded shafts to exactly level the surface of the transparent sheet 126 into a horizontal plane. The sprockets 144, 145 and 146 are then firmly affixed to the threaded shafts 136, 137 and 138 respectively, and the fourth sprocket similarly affixed to the fourth of the threaded shafts. This, in effect, adjusts the exact relative positions of the threads on the shafts 136, 137, 138 and those of the fourth, not shown by FIGURE 13, relative to the teeth of the sprockets they carry and to the drive chain 150.

Alternatively, such an adjustment can be achieved by detaching the drive chain 150 from engagement with the sprockets 144, 145 and 146 and the fourth corresponding sprocket, rotating these sprockets relative to each other to place the surface of the transparent sheet 126 in a horizontal plane, and then replacing the drive chain 150 with its links engaging the teeth of the sprockets in their adjusted position. Still referring to FIGURE 13, the optical system of the apparatus consists of a lens system 135 which includes a lens, a shutter, an adjustable diaphragm, a solenoid for the operation of the shutter, and electrical terminals for the connection of the solenoid to the electrical circuits of the apparatus, carried by the plate 156. The plate 156 is slideably mounted on the vertical rods 157, 157. The vertical rods are carried by the base plate 158 of the unit and are attached at their upper ends to the plate 159. The plate 156 is threaded onto the shaft 160, the upper section of which is threaded and which is held at its lower end by a bearing carried by the base plate 158, and at its upper end by a bearing carried by the plate 159. The shaft 160 carries the sprocket 161.

The plates 158 and 159 are rigidly attached to a supporting frame, not shown by FIGURE 13, to provide firm support for the rods 157, 157 and the shaft 160. The supporting frame is designed to be free of vibration resulting from the movement of the mechanical parts of the apparatus within its process section. The rods 157, 157 and the shaft 160 are exactly aligned with their axes normal to a horizontal plane. The lens system 135 is affixed to plate 156 with its optical axis also normal to a horizontal plane. These alignments assure that the optical axis of the lens system 135 remains normal to the surface of the transparent sheet 126, at any level to which it may be adjusted by the operation of the hand wheel 49.

The optical path below the lens system 135 is protected from scattered light by the flexible bellows 162 and by the box shroud 163, indicated by the broken lines. The box shroud is carried by the base plate 158 of the unit, and has an opening in one side. A mirror 164 is mounted in the box shroud at an angle of forty-five degrees to reflect an image from the lens system 135 through the opening in the side of the box shroud to the optical image plane of the apparatus, in which the surface of the vacuum platen 165 of the apparatus positions a photoelectrostatic sheet. The vacuum platen is shown schematically in FIGURE 13. The mirror 164, in this specific embodiment of the apparatus, is positioned to reflect the optical image to the left of the apparatus along a path parallel to the length of its cabinet. The optical image plane is vertical across the apparatus, and at a position approximating the division between the center section 41 and the left-hand section 43 of the cabinet 40 of the apparatus.

The hand wheel 49 on the outside of the right-hand section 42 of the cabinet of the apparatus, is attached to the end of a shaft 166 extending through the wall of the cabinet and is carried by a journal, not shown by the drawing, just within the wall of the cabinet. It has a beveled gear 167 on its inner end which meshes with the beveled gear 168 affixed to the upper end of the vertical shaft 169. The lower end of the shaft 169 carries a sprocket 170. The vertical shaft 169 is carried by journals attached to the frame of the apparatus, which are not shown by the drawings. The sprocket 170 is connected by the chain 171 to the sprocket 161 and is guided by the idler sprockets 172 and 173. The rotation of the hand wheel 49 causes the rotation of the shaft 160 which, in turn, causes the lens plate 156 to be raised or lowered, depending upon the direction of rotation of the hand wheel, thereby adjusting the position of the lens system 135 along a vertical path.

FIGURES 14, 15, 16 AND 17.—THE COPY SUPPLY MAGAZINE, THE VACUUM PLATEN AND ITS TRANSPORT MECHANISM

FIGURES 14, 15, 16 and 17 illustrate the copy supply magazine, the vacuum platen and the transport mechanism which carries the vacuum platen through its cycle of movement. The copy sheet supply magazine is located near the bottom and left side of the left-hand section 43 of the cabinet, adjacent the drawer 100 by which it is supplied copy sheets. The drawer 100 has been described hereinbefore with reference to FIGURE 8, which shows it being supplied with copy sheets.

FIGURE 14 illustrates the copy sheet supply magazine of this apparatus and its air pressure supply, from the pressure side of the vacuum pump, which provides the vacuum for the operation of the vacuum platen of the apparatus. Referring specifically to that figure, it will be seen that this copy sheet supply magazine is provided with a base plate 180 which carries two pairs of journals, not shown by the drawing, which carry the axles 181 and 182. The axle 181 carries toggle arms 183 and 184 attached to its ends, while axle 182 carries the toggle arms 185 and 186 attached to its ends. The lower ends of toggle arms 184 and 186 are connected through swivel joints 187, 187 to the rod 188. The swivel joints 187, 187 and the rod 188 are shown by FIGURE 15. The upper ends of the toggle arms 183, 184, 185 and 186 each carry a roller 189.

The base plate 180 has the air cylinder 190 attached to its edge. The piston rod 191 of the air cylinder 190 is attached to the lower end of the toggle arm 185 by a swivel 192. As air under pressure is supplied to the air cylinder 190, forcing its piston rod 191 outwardly, the top of the toggle arm 185 moves in the reverse direction and on an upwardly-curved path, due to the angulation of the toggle arm. The rigid attachment of the toggle arms 184 and 186 to the ends of the axle 182, the linkage of the lower ends of the toggle arms 186 and 184 and the connecting rod 188, and the rigid attachment of the toggle arms 184 and 183 to the ends of the axle 181 causes the upper ends of the toggle arms 183, 184, 185 and 186 and the rollers 189, 189, which they carry, to move in synchronism as the lower end of the toggle arm is moved by the air cylinder 190. The atmospheric-pressure side of the air cylinder 190 is provided with a throttling valve 193, by which the rate of the exhaust and intake of air on that side of the cylinder can be regulated.

Still referring to FIGURE 14, the air cylinder 190 is connected to and supplied with air through a tube 194 which is connected to the pressure side of the vacuum pump 195. The tube 194 is provided with a solenoid valve 196 which, when opened, permits the air to be exhausted from the tube 194. The tube 194 is also provided with a filter 197 and a pressure relief valve 198 to insure against excessive pressure build-up in the tube 194 and the air cylinder 190.

The vacuum side of the pump 195 is connected through the flexible tube 199 to the vacuum platen 165 of the apparatus, which is shown schematically. The tube 199 is provided with a pressure-sensitive solenoid switch 200 which, in open position, permits the pump 195 to draw air from the vacuum platen 165. The tube 199 is also provided with a filter 201 and a pressure-relief valve 202.

The four rollers 189, 189, on the upper ends of the toggle arms 183, 184, 185 and 186, carry the copy sheet carrier plate 101 of the copy sheet magazine. The carrier plate 101, as already noted, has four guide walls 102, 103, 104 and 105. The guide wall 104 is made of an insulating material such as, for example, a phenol-formaldehyde plastic.

As best shown in FIGURE 15, the parallel bars 205, 205 extend forwardly from the bottom of one side of the carrier plate 101. These bars each carry a perforation 206, 206. The outer sections 207, 207 of the telescoping rails 108, 108 have the cross-bar 208 extending across between them and attaching them together. The cross-bar 208 carries the two vertical pins 209, 209 which are positioned to extend upwardly through the perforations 206, 206 with a sliding fit. One of the rails 207, 207 carries a limit switch 210 which is held in closed position when the carrier plate 101 is resting on the rollers 189, 189, in its initial position of rest.

Each of the telescoping rails 108, 108 consists of, in addition to the rails 207, 207, a pair of telescoping rails of the type frequently used to carry the drawers of office filing cabinets. These pairs of rails are provided with rollers which enable them to telescope smoothly. The inner-most rail of each pair is attached to the frame of the cabinet 40. The rails 207, 207 are each provided with a pair of rollers 211, 211, which enable the rails 207, 207 to be extended with respect to the movable rail of the inner-most pair of telescoping rails.

The limit switch 212 is attached to the frame of the apparatus in a position such that it is closed when the rails 108, 108 are fully telescoped, and the carrier plate 101 is in its operating position with respect to the rollers 189, 189 and the vacuum platen 165. When the plate 101 is moved outwardly from its normal operating position, this limit switch 212 opens. The copy supply magazine cannot operate when this limit switch 212 is open.

The bottom of the carrier plate 101 is provided with a second set of parallel bars 213, 214. These bars are positioned directly adjacent to the outer sections 207, 207 of the telescoping rails 108, 108, and insure that the carrier plate is in exact lateral alignment after being raised by the rollers 189, 189. The pins 209, 209 coopreate with the bars 213, 214 in this function.

The bar 213 carries an adjustable screw 215, which acts as the physical contact point which activates the limit switch 210. This screw provides a convenient adjustment to assure the proper functioning of the limit switch 210.

When in their fully-telescoped position, the rails 108, 108 position the carrier plate 101 in its operating position under the vacuum platen 165, are supported by the rollers 189, 189, and keep the limit switch 212 closed so that it is ready for operation by the electrical system of the apparatus to supply a copy sheet to the vacuum platen 165. When the carrier plate 101 is raised by the action of the air cylinder 190, upon activation by the electrical system of the apparatus, to deliver a copy sheet to the vacuum platen 165, its upward movement is guided by the pins 209, 209. Further, the pins 209, 209 guide the carrier plate 101 as the drawer 100 is opened to form the bottom of that drawer.

The vacuum platen 165 is provided with a plurality of orifices in its lower surface which are located near each of its edges, not shown by the drawings, which extend to an internal air space in the platen, which is connected through tube 199 to the vacuum side of the vacuum pump 195, FIGURE 14. At the beginning of a cycle in which a copy is made by the apparatus, vacuum is supplied to the vacuum platen 165 by the opening of the solenoid valve 196. This vacuum retains the upper sheet of a stack of sheets on the lower surface of the vacuum platen 165, when the sheet is raised into contact therewith by the action of the copy sheet supply magazine.

The use of air pressure to raise the carrier plate 101 is advantageous in providing an automatic compensation for the variation in the height of a stack of copy sheets which it carries. The upward movement of the plate is automatically stopped by the forceful contact of the upper sheet of the stack of sheets with the vacuum platen 165. The pressure which is exerted upon such contact is determined by the air pressure in the cylinder 190, rather than by the distance that the plate 101 has been raised.

The carrier plate 101 returns under its own weight and the weight of the stack of copy sheets which it carries, when the air pressure within the cylinder 190 is released by the action of the solenoid valve 196. The rapidity with which the carrier plate drops back to its position of rest is determined by the adjustment of the throttling valve 193 on the atmospheric side of the piston of the cylinder 190. As already noted, upon returning to its position of rest, the carrier plate 101 activates the limit switch 210. The tripping of this limit switch starts the operation of the transport mechanism of the apparatus to move the vacuum platen 165 through the successive positions in which it carries a photoelectric copy sheet over a corona discharge unit to give it an electrostatic charge, into the optical plane of the apparatus to expose it to an optical image to produce a latent electrostatic charge on its surface, returns it to a position in which the sheet is picked up by the conveyor system of the apparatus and, finally, returns it to its initial position in which it is ready to repeat the cycle. This transport mechanism and the detailed construction of a preferred embodiment of the vacuum platen 165, will be described with reference to FIGURE 16.

In the event that the supply of copy sheets on the carrier plate 101 is exhausted or, for some other reason, the vacuum platen does not pick up a copy sheet from the carrier plate 101, no vacuum is developed in the vacuum line 199. This failure to develop a vacuum in the line 199 leaves the pressure-sensitive switch 200 in its open position. This switch 200 must be closed to permit the apparatus to proceed to the next step of its automatic cycle, i.e. the movement of the vacuum platen by its transport mechanism, etc. Therefore, the automatic cycle of the apparatus is stopped. The vacuum pump 195 continues to operate, sucking air through the orifices in the lower surface of the vacuum platen 165. The passage of air into these orifices creates an audible whistling sound which informs the operator as to the cause of the failure of the apparatus to proceed with its automatic cycle, and advises him that the supply of copy sheets on the plate 101 must be replenished.

Referring specifically to FIGURE 16, it will be seen that the vacuum platen 165 has attached to its upper surface an axle 220, which is carried by journals 221, 221 of the carrier plate 222. The vacuum platen 165 is smaller in area than the area of the plate 101 of the copy supply magazine defined by its guide walls 102, 103, 104 and 105, and smaller in dimension than the sheet with which it is intended to travel. Thus, for example, the copy sheet may extend one inch beyond each edge of the vacuum platen when being transported thereby. In any event, the copy sheet must extend beyond the edge adjacent the guide wall 104 to permit it to be picked up by the conveyor system of the apparatus, as described hereinafter.

One end of the axle 220 carries a quarter gear 223, while the other end is loaded by the spring 224, the tension of which tends to retain the platen in its normal position in relation to the carrier plate 222. The quarter gear 223 has its lower flat face attached to the upper surface of the vacuum platen 165. This attachment of the quarter gear 223 to the vacuum platen is the sole support of the vacuum platen. The carrier plate 222 has a pair of journals 225, 225 on its upper surface, which are slideably mounted on the cylindrical guide rod 226. The guide rod 226 serves both to support one side of the carrier plate 222 and to guide it along a fixed line of travel. The other side of the carrier plate 222 is attached to the vertical plate 227, the upper end of which carries a roller 228 which is supported by the horizontal rod 229, which is parallel to the rod 226 and has a flat upper surface in a horizontal plane over which the roller 228 is free to move. The rod 229 is attached to the frame of the apparatus in a firmly-fixed position. The parallel rods 226 and 229 extend longitudinally within the cabinet 40 from a position above the copy sheet supply magazine, FIGURE 14, over an electrostatic corona discharge unit, FIGURE 18, to a position adjacent the optical image plane of the apparatus. The upper surface of the carrier plate 222 has affixed thereto a cross-slide plate 230 which carries a pawl 231 in a slot 232, in which the pawl 231 is free to move along a path which is at right angles to the lengths of the parallel rods 226 and 229.

Referring specifically to FIGURE 17, it will be seen that the quarter gear 223 carries a roller 235 on its side which is laterally displaced from the center of rotation of the quarter gear 223 and the axle 220 in a forwardly direction, i.e. in a direction toward the optical image plane of the apparatus. The roller 235 rides on the lower surface of the rod 236, which is in a horizontal plane, to a position near its end section adjacent the optical image plane and is fixed in a stationary position to the frame 239 by the rods 233 and 234. This end section 237 of the rod 236 is curved upwardly. The length of this rod 236 is parallel to the cylindrical guide rod 226. The contact of the roller 235 with the horizontal lower surface of the rod 236 keeps the vacuum platen from tilting with a dropping of its backwardly edge. This is one of two elements which retain the lower surface of the vacuum platen 165 in a horizontal plane during its travel over the corona discharge unit of the apparatus. The second of these two elements is the set screw 238, which extends through the carrier plate 222 near its backwardly edge. The lower end of this set screw bears on the upper surface of the vacuum platen 165, is adjustable to position the lower surface of the vacuum platen 165 in a horizontal plane and, when in contact with the upper surface of the vacuum platen, prevents its forwardly edge from tilting downwardly.

The end of the guide rod 226 is attached at its backwardly end to plate 240, and at its forwardly end to the plate 241 which is in a vertical plane adjacent the optical image plane of the apparatus. The plates 240 and 241 are both rigidly attached to the frame of the apparatus. The plate 241 carries a rack 242 which extends horizontally from its surface and is positioned to engage the gear 223 as the vacuum platen is moved along the rods 226 and 229 to the proximity of the plate 241. Upon engaging the gear 223, the rack 242 causes the vacuum platen 165 to rotate through an angle of ninety degrees to place the surface of a photoelectrostatic copy sheet, which is carried on its lower surface, in the vertical optical image plane of the apparatus. As the vacuum platen 165 reaches the point at which its rotation is started, by the engagement of the rack 242 with the quarter gear 223, the roller rides upwardly along the curved section of the section 237 of the rod 236 and off of the end of that rod and, therefore, does not interfere with the rotation of the vacuum platen.

The motor plate 245 is located in a parallel plane directly above the rods 226 and 229. It is shown in an exploded position by FIGURE 16 to permit the detail of the lower parts of the unit to be shown. The motor plate 245 has an electric motor 246 and a speed reducer 247 attached to its upper surface. The electric motor 246 is adapted to drive the speed reducer 247 by the chain 248 carried by the motor sprocket 249 and the speed reducer sprocket 250. The speed reducer 247 drives a shaft 251, which extends downwardly through the plate 245 and carries the sprocket 252 on its lower end. The plate 245 carries a bearing 253 in which a second downwardly extending shaft 254 is free to rotate. The shaft 254 carries, on its lower end, the sprocket 255 which is in the same parallel plane as the sprocket 252. The shafts 251 and 254 are spaced apart along a line which parallels the rods 226 and 229.

The sprockets 252 and 255 carry a sprocket chain 256 to which the pawl 231 is attached. As the chain 256 passes around the sprockets 252 and 255, the pawl 231 moves back-and-forth in the slot 232, and moves the carrier plate 222 back-and-forth along the rods 226 and 229. The position of the shafts 251 and 254 is such that the carrier plate 222 transports the vacuum platen 165 back-and-forth, beginning from a position in which the vacuum platen is centered above the position to which the copy sheet carrier plate 101 of the copy supply magazine rises in its action to bring the top sheet of a stack of copy sheets into contact with the platen, to a position in which the vacuum platen's lower surface has been turned into the optical image plane of the apparatus.

The limit switch 257, carried by the frame of the apparatus, is located at, and activated by, the rearwardly edge of the carrier plate 222 when the carrier plate is in its initial position, and is in a closed position when the carrier plate 222 is in that position. The limit switch 258 is located at the forwardly end of the line of travel of the carrier plate 222, and is closed by contact with the forwardly surface of the carrier plate when it comes into the optical image plane of the apparatus. As will be explained hereinafter, these limit switches form an essential part of the electrical control of the apparatus.

The motor plate 245 carries a second electric motor 260 which is provided with a speed reducer 261, and a shaft 262 which extends downwardly from the speed reducer 261, to a location below the level of the edge of the motor plate 245, and upwardly above the speed reducer. The lower end of the shaft 262 carries a cam 263 which bears on the free end of the shift arm 264, which is pivotally attached to the edge of the motor plate 245 and spring loaded so that its free end always bears on the peripheral surface of the cam 263. The free end of the shift arm 264 is moved laterally back-and-forth by the rotation of the cam 263.

The upper end of the shaft 262 carries the cam 266. The limit switch 267 is attached to the frame of the apparatus, in a position such that the end of its activating arm 268 bears on the cam 266. The periphery of the cam 266 is such that the limit switch 267 is tripped each half-rotation of the cam at the point of rotation of the shaft 262 at which the shift arm 264 is in its fully-extended position, and then at which the shift arm is in its position of rest. As will be fully explained hereinafter, the limit switch 267 is an essential component of the electrical system of the apparatus which controls and times the operation of the cam motor 260 and the movement of the shift arm 264.

After the vacuum platen 165 has been moved into the optical image plane of the apparatus and started its return from that position, the cam 263 under the control of the electrical control system of the apparatus moves the free end of the shift arm 264 outwardly, and places its outer edge in a diagonal position across the line of travel of the platen 165 as the carrier plate 222 returns to its original position. The vacuum platen 165 carries, on its upper surface, a shift roller 265 which is located in a position such that it engages the diagonal surface of the shift arm 264, as the vacuum platen 165 is moved toward its initial position, and causes the vacuum platen to move laterally against the tension of the spring 224 around its shaft 220, and to be in its fully-displaced position when the carrier plate 222 reaches its initial position.

This lateral displacement of the vacuum platen 165 places the edge of a sheet which it carries in position to be grasped by a gripper of the second transport system of the apparatus, as will be fully described hereinafter. At the instant that a gripper of the second transport mechanism of the apparatus grasps a copy sheet carried by the vacuum platen, the vacuum supplied to the vacuum platen is shut off by the action of the solenoid switch 200, shown by FIGURE 14. After a sheet has been removed from the surface of the vacuum platen by a gripper of the second transport system of the apparatus, the cam 263 is rotated under the action of the electrical control system of the apparatus to cause the shift arm 264 to move inwardly, permitting the vacuum platen to move laterally under the action of the spring 224 to its normal initial position over the copy supply magazine of the apparatus. The vacuum platen 165 is then in position to receive another copy sheet from the copy sheet supply magazine.

FIGURES 18 AND 19.—THE CORONA DISCHARGE UNIT

Figure 20:
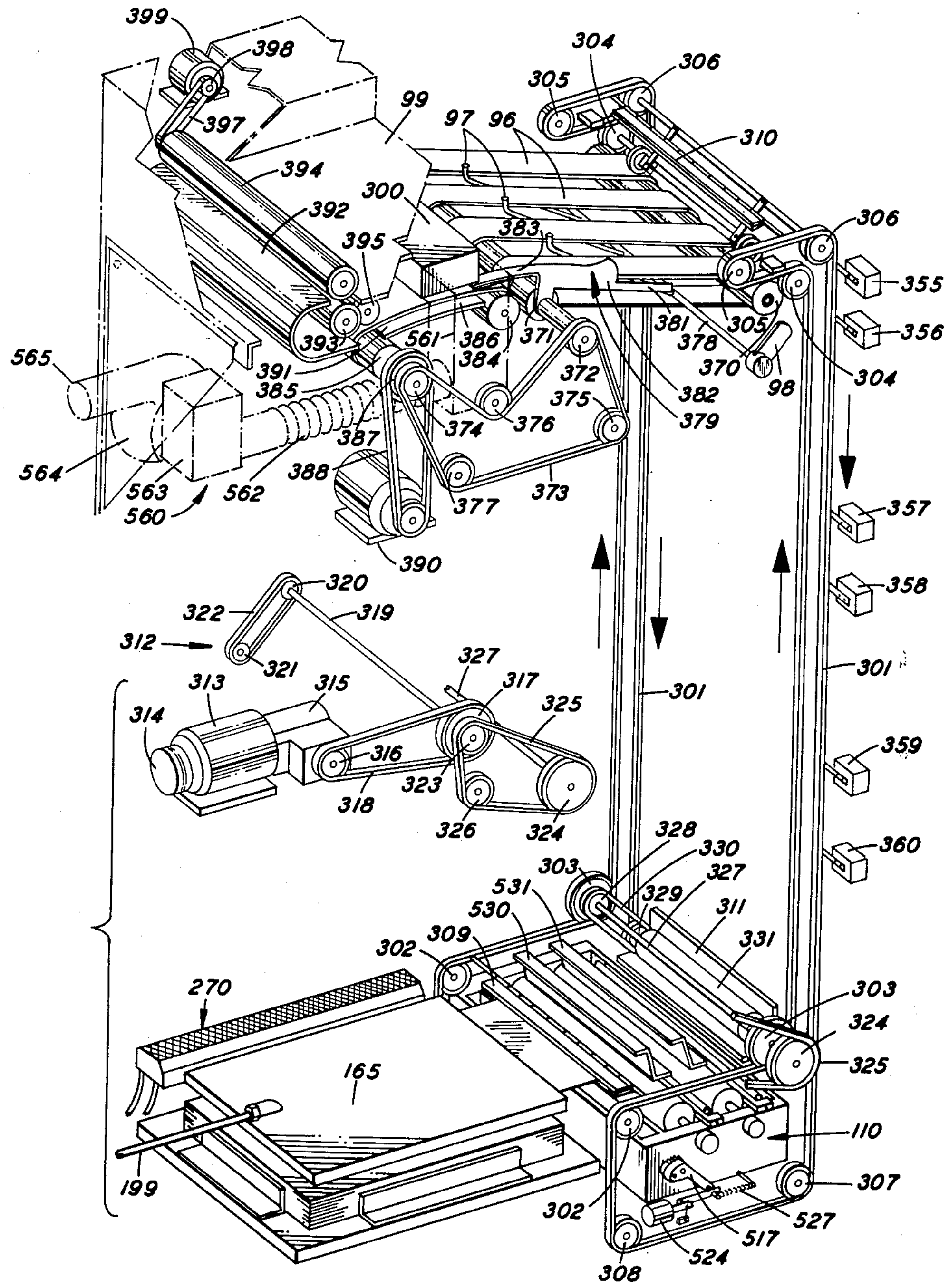
FIGURE 20 is a partially-exploded, perspective view of the conveyor system of the apparatus, of the vacuum platen in its off-set position, of the toner unit, and of the fuser unit of the apparatus.

The electrostatic charging, or corona discharge unit, of the apparatus is illustrated in detail by the exploded view of FIGURE 18 and indicated generally by the numeral 270. FIGURE 19 is an enlarged, broken view of the power terminal block, designated generally by the numeral 276, which forms an essential part of the corona discharge unit 270. This corona discharge unit is located adjacent the copy sheet supply magazine of the apparatus, illustrated by FIGURES 14 and 15. Its position is shown by FIGURE 20. In this position, it is beneath the line of travel of the vacuum platen 165 from its position over the copy sheet supply magazine in which it recevies a copy sheet, to its position in a vertical plane in which it places the surface of the copy sheet in the optical image plane of the apparatus.

Referring specifically to FIGURE 18, it will be seen that the corona discharge unit 270 has a rectangular base plate 271 of an electrically-conductive material such as, for example, a metal to which is attached at opposite ends the end blocks 272 and 273 by the screws 274, 274 and 275, 275, respectively. The terminal blocks 272 and 273 are made of an electrical insulating material. The end block 272 carries a power terminal block 276, illustrated by FIGURE 19.

Referring specifically to FIGURE 19, it will be seen that this block consists of an outer shell 277 of an insulating material which is provided with a slot 278 for the reception of the terminal strip 279. A graphite block 280, electrically connected to a coaxial power cable 281, is located within the shell 277 adjacent the slot 278 in a position to bear on and form electrical contact with the surface of the terminal strip 279. The graphite block 280 is held in firm contact with the surface of the terminal strip 279 by the tension of the retaining spring 282 within the terminal block 276. The corona discharge wires 286, 286 are in the same plane and are in a horizontal plane when the unit 270 is in position in this apparatus.

Referring to FIGURE 18, the terminal strip 278 is attached to the terminal block 276 by the screws 283, 283 and is covered by the insulating terminal block cover 284, which is held in position by screws 285, 285. The terminal block cover 284 also holds the terminal block 276 in position. The coaxial power cable 281 is connected to a source of high-potential, D.C. electric current, not shown by FIGURE 18.

The ends of the corona discharge wires 286, 286 are held in slots 287, 287 in the end block 273, and retained therein by the set screws 288, 288. As noted hereinbefore, the corona discharge wires 286, 286 are in the same plane and are in a horizontal plane when the unit 270 is in position in this apparatus. The opposite ends of the corona discharge wires 286, 286 are connected to the terminal strip 279 and held under tension by the springs 289, 289.

The stabilizing grid assembly 291 has sloping, metal-sheet side walls 292, 292 and an open top which carries a stabilizing grid 293 of two sets of parallel, metal wires, which are positioned at an angle within the range of about ninety degrees to about ninety-five degrees to each other, and at angles approximating fortly-five degrees to the lengths of the corona discharge wires 286, 286. This stabilizing grid is in a plane parallel to, and spaced away from the plane of the corona discharge wires 286, 286 which are, in turn, spaced away from the base plate 271. This diagonal positioning of the wires of the stabilizing grid 293 is advantageous in that it precludes any possibility of an edge of a sheet of copy, inadvertently being dropped by the vacuum platen as it passes over the grid, from being caught by the grid or from penetrating the grid and coming into contact with the corona discharge wires 286, 286 beneath the grid.

The stabilizing grid assembly 291 is attached to the insulating blocks 272, 273 by the screws 294, 294. It will be noted that the stabilizing grid assembly 291 is electrically insulated from the corona discharge wires 286, 286 and their electrical connections, and from the base plate 271. The stabilizing grid 291 is connected to ground through a resistor and accumulates an electrical charge from the corona discharge emanating from the corona discharge wires 286, 286 during the operation of the unit. The base plate 271 is connected directly to ground.

FIGURES 20, 21, 22, 23, 24 AND 25.—THE CONVEYOR SYSTEM

FIGURES 20, 21, 22, 23, 24 and 25 illustrate the conveyor system of this apparatus, the position of which is indicated in broken lines designated generally by the numeral 94 of FIGURE 7. FIGURE 20 shows the position of this conveyor system relative to the corona discharge unit 270, the vacuum platen 165, the toner unit 110, and the fuser unit 300 of the apparatus. As indicated diagrammatically by FIGURE 7, this conveyor system travels laterally within the lefthand section 43 of the cabinet 40 of the apparatus, at right angles to the direction of travel of the vacuum platen transport system of the apparatus, which has been described hereinbefore with reference to FIGURE 16.

Referring specifically to FIGURE 20, it will be seen that this conveyor system travels along a path which carries a copy sheet in contact with the magnetic brushes of the toner unit, designated generally by the numeral 110, and beneath the shoes above that unit. As shown by FIGURE 20, the toner unit 110 is located directly behind the copy sheet supply magazine and at approximately the same level in the cabinet 40. This transport system then travels upwardly to carry a copy sheet to the inspection station 95, under the fuser unit designated generally by the numeral 300 and, finally, to the receiving station 99 of the apparatus.

Figure 21:
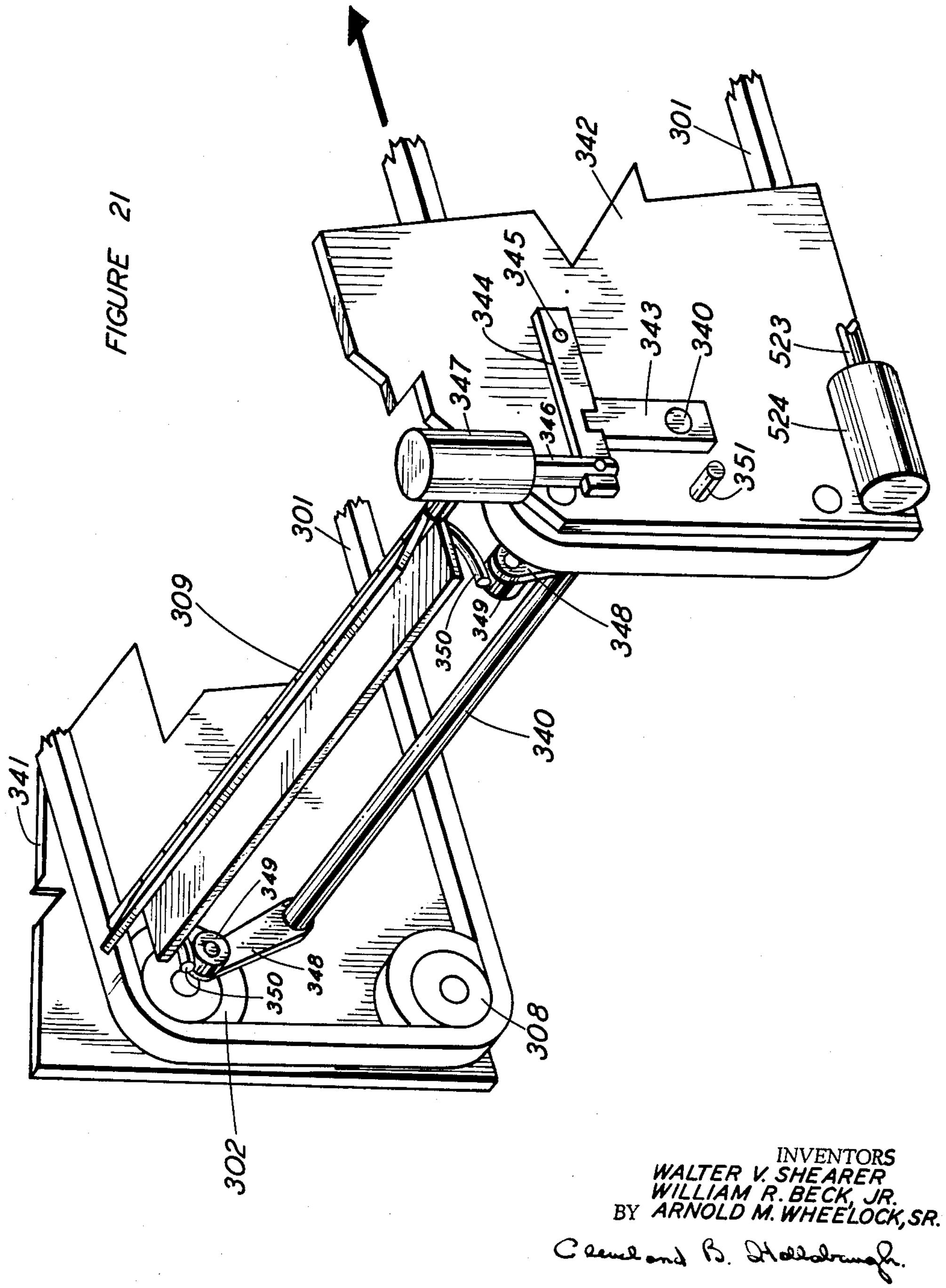
FIGURE 21 is a fragmentary, perspective view of the receiving end of the first section of the conveyor system adjacent the vacuum platen of the apparatus, showing a gripper in open position and the details of the mechanism for opening and closing the two grippers of the first section of the conveyor system in the position in which they receive a copy sheet from the vacuum platen of the apparatus.
Figure 22:
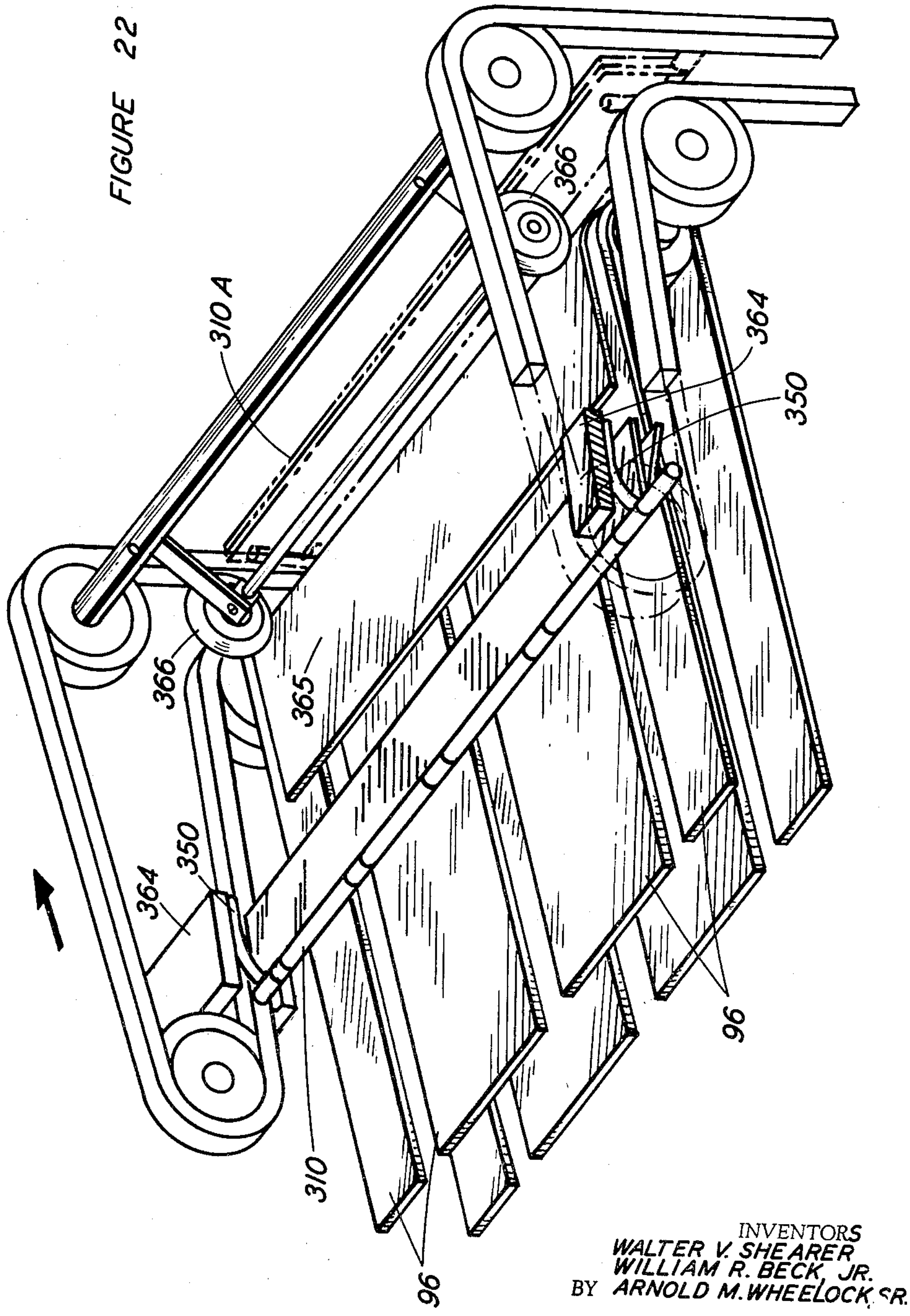
FIGURE 22 is a fragmentary, perspective view of the delivery end of the first section of the conveyor system, and of the receiving end of the second section thereof, showing a gripper in open position after delivering a copy sheet to the second section of the conveyor system.

The first of the three sections of this conveyor system comprises two transport belts or chains 301, 301, which are in vertical, parallel planes and are carried by pairs of pulleys or sprockets 302, 302; 303, 303; 304, 304; 305, 305; 306, 306; 307, 307 and 308, 308. FIGURES 20, 21 and 22 illustrate belts and pulleys for the sake of clarity. However, chains and sprockets are preferred in this conveyor system since they provide a positive drive, which is important to the precise functioning of the apparatus without the slippage which is frequently encountered with belts and pulleys. A roller type of chain has been found satisfactory for this purpose.

Figures 23, 24:
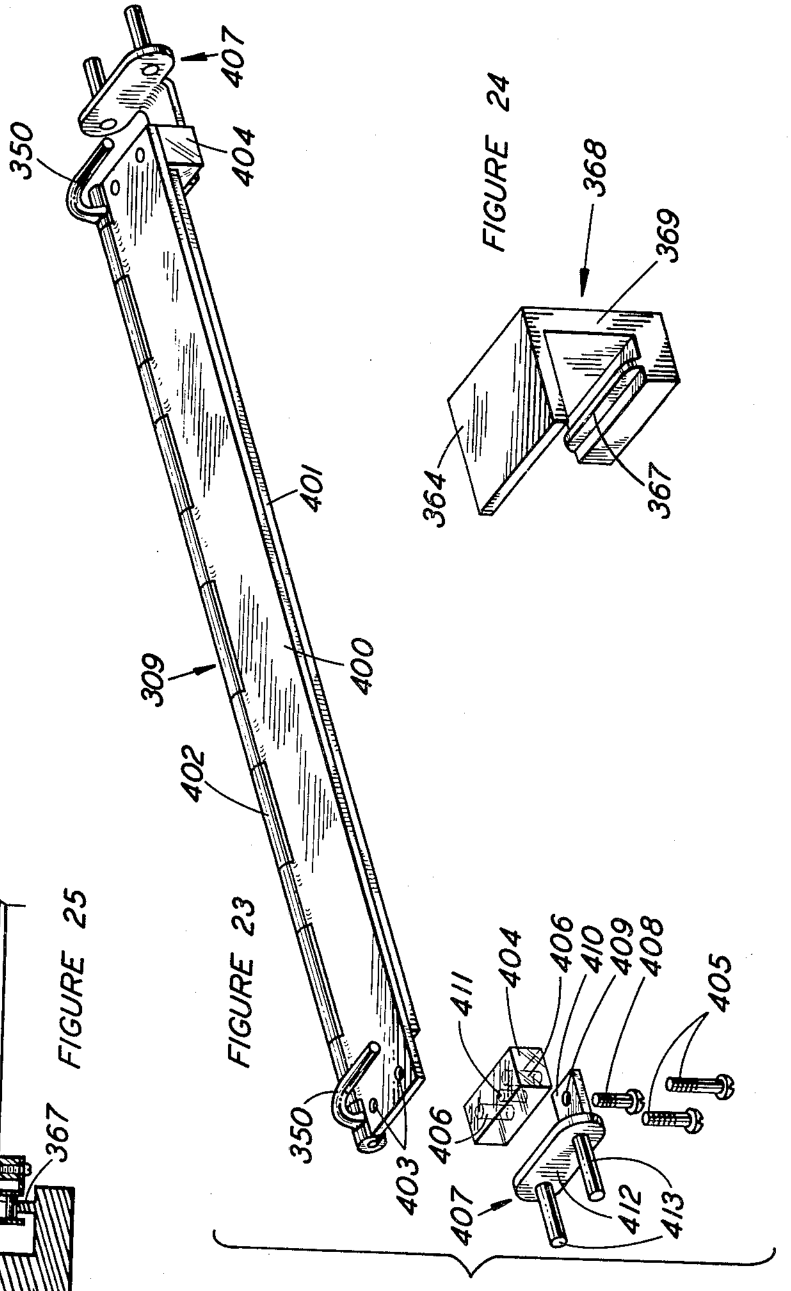
FIGURE 23 is an exploded, perspective view of one of the grippers of the first section of the conveyor system.
FIGURE 24 is a perspective view of one of the two anvil blocks at the delivery end of the first section of the conveyor system.

The transport chains 301, 301 carry two copy sheet grippers 309 and 310, which are attached at each end to the respective chains so that they extend laterally across the transport system. The grippers 309 and 310 are spaced apart along the lengths of the chains 301, 301 by one-half of their total lengths. FIGURE 23 illustrates the detail of one of these grippers 309 and 310. The grippers 309 and 310 are spring loaded to keep them in the closed position, and are opened when they come adjacent the vacuum platen 165, and then closed at that location to remove a sheet from the vacuum platen when it is in its laterally-displaced position by a tripper mechanism, which will be described below with reference to FIGURES 21 and 23. They remain closed while conveying the copy sheet to the second section of the conveyor system, and are opened at the location at which the sheet is picked up by the second section of the system by a tripper mechanism, which will be described hereinafter with reference to FIGURES 22, 23, 24 and 25.

The sprockets 302, 302 are located adjacent the vacuum platen 165 in positions which cause the transport chains 301, 301 to bring the grippers 309 and 310, alternatively, to a position such that the lateral displacement of the vacuum platen 165 places a marginal edge of a copy sheet in a position such that it is grasped by the gripper when it is closed. The driven sprockets 303, 303 are spaced apart from the sprockets 302, 302 in positions such that the transport chains travel between them in a horizontal plane. It is while traveling in this horizontal plane that the transport chains 301, 301 carry the gripper 309 or 310, as the case may be, and a copy sheet carried thereby, in contact with the magnetic brushes of the toner unit 110.

The sprockets 304, 304; 305, 305 and 306, 306 are located near the top of the cabinet 40 of the apparatus. The sprockets 304, 304 are located directly above the sprockets 303, 303 so that the transport chains 301, 301 travel vertically upward between the two pairs of sprockets, after making a right-angle turn around sprockets 303, 303. A copy guide sweep 311 is located between sprockets 303, 303 in a position such that the back of a copy sheet carried by one of the grippers 309, 310 passes in contact with it, and the sheet is guided from horizontal to vertical travel. Two spring-loaded rollers, not shown by the figures, are located near the outer edges of the convex or backward surface of the sweep 311. The rollers bear on the marginal edges of the face of a copy sheet passing around the sweep 311, and prevent the trailing end of the sheet from flopping outwardly and contacting its toned surface with the inside of the back wall of the cabinet of the apparatus.

The drive for this first section of the conveyor system and for the toner unit 110, is illustrated by FIGURE 20 as a broken-away unit designated generally by the numeral 312. It will be noted that the broken-away unit duplicates the showing of the drive sprocket 324, which fixes the position of this unit relative to the remainder of the conveyor system. It consists of an electric motor 313, provided with an electrically-activated brake 314 and a speed reducer 315 which drives sprocket 316. Sprocket 316 drives sprocket 317 through the chain 318. The sprocket 317 is on one end of the axle 319, the other end of which carries the sprocket 320 which drives sprocket 321 through the electrically-insulating timing belt 322, which carries teeth which positively engage the teeth of sprockets 320 and 321. The belt 322 may, for example, be made of rubber. It serves to insulate the toner unit 110 from the remainder of the drive mechanism of the conveyor system. The sprocket 321 is the main drive for the toner unit 110. The axle 319 carries a third sprocket 323 adjacent sprocket 317, which drives sprocket 324 through chain 325 which passes around the idler sprocket 326.

As shown by FIGURE 20, the sprocket 324 is affixed to the end of the axle 327 which carries the sprockets 303, 303 which drive the conveyor transport chains 301, 301 of the first section of this conveyor system. The axle 327 carries a fourth sprocket 328 which drives sprocket 329 through chain 330. The sprocket 329 is affixed to the end of an axle which carries a vibrator 331. The vibrator 331 is illustrated as a brush with bristles which extend through the slots in the adjacent sweep 311. The rotation of this brush vibrator 331 vibrates the back of a copy sheet passing around the opposite side of the sweep 311, and causes any mechanically-adhering particles of iron from the toner mix to drop from the surface of the sheet.

The revolving brush vibrator described in the foregoing is only one of several forms of vibrators which are suitable for use in this apparatus. An alternative form, which may be positioned above the upper edge of the sweep 311, is a rotating bar having an irregular surface which contacts the back of a sheet of copy paper just after it has passed around the sweep, and causes the sheet to vibrate.

FIGURE 21 shows the end of the first section of the conveyor system adjacent the vacuum platen 16, with the gripper 309 cocked in open position and ready to receive the edge of a copy sheet by the lateral displacement of the vacuum platen 165.

Referring specifically to that figure, the numeral 340 designates an axle, the ends of which are carried by the frame members 341 and 342 which are affixed to the main frame of the apparatus. One end of the axle 340 extends beyond the outer side of the frame member 342 and carries the lever arm 343. The lever 343 is held in a vertical position by having an end section in a notch in the lower edge of the lever arm 344. One end of the lever arm 344 is pivoted on a pin 345 attached to the frame member 342, and the other end is attached to the end of the core 346 of the solenoid 347 by a pivot joint.

The axle 340 carries two arms 348, 348 which have rollers 349, 349 positioned to bear on the arcuate lever arms 350, 350 of the gripper 309 and to force them upwardly when the lever 343 is held in position by the lever arm 344. The lever arms 350, 350 of the gripper are attached to the upper leaf thereof and, when forced upwardly, cause the gripper to open as illustrated by FIGURE 21. As shown by FIGURE 21, the arms 348, 348 are in an inclined position when they are held in position to open the gripper 309.

The activation of the solenoid 347 causes it to raise the end of the lever arm 344, freeing the axle 340 to rotate a fraction of a turn in the counter-clockwise direction. This rotation of the axle 340 is caused by the weight of the arms 348, 348 and the rollers 349, 349, causing the arms to fall from their inclined position. The rotation of the axle 340 is stopped by the lever arm 348 coming to rest against the pin 351. This rotation removes the rollers 349, 349 from their contact with the levers 350, 350 and permits the gripper 309 to close under its own spring tension. The solenoid 347 is activated by the electrical control system to cause the gripper 309 to close at the instant that the vacuum platen 165 reaches its laterally-displaced position, placing the edge of a copy sheet in position to be grasped by the gripper.

The pin 351 is in a location such that when the lever arm 343 is resting against it, the cam rollers 349, 349 are in the path of travel of the gripper lever arms 350, 350. As the gripper 309 moves into the position shown by FIGURE 21, the lever arms 350, 350 bring the arms 348, 348 and the axle 340 to the position shown by FIGURE 21 and causes the lever arm 343 to become locked in its vertical position by the lever arm 344. In this position, the leaves of gripper 309 are held in their open position, as shown by FIGURE 21.

It is essential that gripper 309 come to an accurately positioned stop in the position in which it is illustrated in FIGURE 21. This position must be accurate to permit the gripper to receive the edge of a copy sheet from the vacuum platen 165, as it comes to its laterally-displaced position just prior to the end of the cycle of operations of the vacuum platen trnasport system. Similarly, the gripper 310 must be stopped at exactly the same location when it is, in turn, carried around by the transport chains 301, 301 to receive a copy sheet.

Referring specifically to FIGURE 20, it will be noted that a series of six limit switches 355, 356, 357, 358, 359 and 360 are spaced at accurately-predetermined intervals along the path of the downward or return travel of one of the transport chains 301, 301. The particular chain involved is immaterial. That chain carries two lugs, not shown by the drawings, which are, respectively, precisely spaced on the chain in relation to the position of the grippers 309 and 310, one end of each of which is carried by the chain. The tripping arms of each of the limit switches 355, 356, 357, 358, 359 and 360 are in a position relative to the path of travel of the adjacent chain 301, such that the lugs carried by the chain will trip the switch as they pass.

The contact between one of the lugs carried by one of the chains 301, 301 and the tripping arm of the limit switch 355, cocks a relay which controls the brake 314 on the shaft of the electric motor 313 and the operation of that motor in driving the transport chains 301, 301. The following contact between that lug and the tripping arm of the limit switch 356 activates the control relay, which stops the motor 313 by applying the brake 314 to instantaneously stop the rotation of its shaft. The lug on the chain 301 and the tripping arm of the limit switch 356 are in exact positions to stop the motor 313 and the movement of the chains 301, 301 at the precise position which places the gripper 309 or 310, as the case may be, in the position illustrated, in the case of gripper 309, by FIGURE 21. The position of gripper 310, when gripper 309 is in the position shown by FIGURE 21, is shown by FIGURE 22.

The electrical connections by which the limit switches 355 and 356 control the motor 313 and its brake 314, are fully described hereinafter in the discussion of the electrical system of this apparatus with reference to FIGURES 34 and 35.

The limit switches 357, 358, 359 and 360 control the application of a bias potential to the toning unit 110 of the apparatus, as will be fully described hereinafter with reference to FIGURES 31, 34 and 35 in the discussion of the electrical system of the apparatus.

FIGURE 22 shows the detail of the upper or forward end of the first section of the conveyor system, together with the backward end of the second section of that system, and shows the gripper 310 at the instant after it has been forced into its open position to deliver a copy sheet that it is carrying to the second section of the conveyor system. The gripper 310 or 309, as the case may be, is not stopped in being opened to deliver a copy sheet to the second section of the transport system, but is opened and then permitted to close under its own spring loading while the transport chains are in motion. The movement of the transport chains is stopped only when one of these grippers comes into position to receive a copy sheet, as described hereinbefore.

Referring specifically to FIGURE 22, it will be seen that the copy sheet 365 is being carried by the belts 96, 96 of the second transport system, and is held on those belts by the spring-loaded rollers 366, 366. The leading edge of the copy sheet has just been released by the opening of the gripper 310 in its forward travel. The gripper 310 has pulled away from the leading edge of the copy sheet 365, because the first section of the conveyor systems travels at a somewhat faster rate than its second section.

The gripper 310 has been forced open by the arcuate lever arms 350, 350 riding under the surfaces of the anvil blocks 364, 364, which force the ends of the lever arms downwardly. The chains 301, 301 of the first section of the conveyor system are riding over the shoes 367, 367, which are beneath the chains at the location that the chains are placed under stress by the contact between the lever arms 350, 350 and the anvil blocks 364, 364. The shoes 367, 367 prevent this stress from causing the chain to sag and, thereby, interfere with the opening of the gripper 310.

Figure 25:
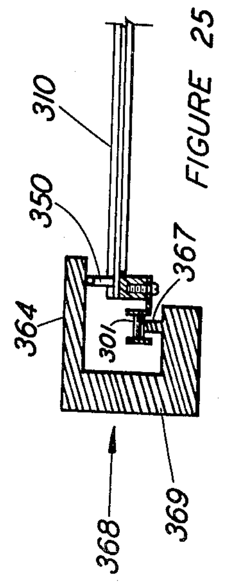
FIGURE 25 is a cross-sectional view of one of the two anvil blocks illustrated by FIGURE 24.

Referring specifically to FIGURES 24 and 25, it will be seen that the anvil blocks 364, 364 and the shoes 367, 367 are integral parts of the same members designated generally by the numerals 368, 368. As will be seen from those figures, the anvil-block section 364 of the members 368, 368 is above and spaced apart from the shoe section 367 of each of the members 368, 368, and that the two sections are attached together by a vertical section 369 which is on the outwardly side of one of the chains 301, 301. As will be seen by reference to FIGURE 22, the members 368, 368 are located adjacent the sprockets 305, 305 with their respective shoe sections below, and their anvil sections above, the lower and forwardly traveling spans of the transport chains 301, 301.

Referring again to FIGURE 22, as the gripper 310 is moved forwardly, its arcuate lever arms 350, 350 ride out from under the anvil blocks 364, 364. Upon being released from their depressed position, the arms 350, 350 cease to counteract the spring tension which closes the gripper 310, and the gripper closes. The movement of the chains 301, 301 continues until they reach the approximate position shown in broken outline designated 310A, at which point its return movement is stopped while the gripper 309 receives a copy sheet, as described with reference to FIGURE 21.

Referring again to FIGURE 20, the second section of this conveyor system comprises a plurality of belts 96, 96 carried by the rollers 370 and 371. The belts 96, 96 are spaced apart on the rollers 370 and 371. When utilizing four belts, as shown by FIGURE 20, three spaces are provided within the transport surface provided by the four belts. The roller 371 carries a sprocket 372, which is driven through chain 373 by sprocket 374. The chain 373 passes around the idler sprockets 375, 376 and 377, which serve merely to guide the path of travel of the chain 373.

Rods 97, 97, shown as three by FIGURE 20, are positioned in the spaces between the belts 96, 96 and are attached beneath the upper span of the belts 96, 96 to a shaft 378 to form a copy-lifting rack. The shaft 378 is attached to the lever arm 98 which is readily accessible above the top of section 43 of the cabinet of the apparatus, for backward and forward movement by the operator of the apparatus. This copy-lifting rack is normally below the upper surface of the upper span of the belts 96, 96 and does not interfere with the travel of a copy sheet being carried by these belts. When the lever arm 98 is moved forward to the position illustrated by FIGURE 20, the forwardly-curved ends of the rods 97, 97 are raised above the upper surfaces of the upper span of the belts 96, 96 and stop the forward travel of a copy sheet on those belts and hold it in a position within the inspection-station opening 95 at the top of the cabinet 40, so that the operator may inspect the visual image on the copy and, if desired, remove it from the apparatus for any manual correction which may be desired. The travel of a copy sheet on the belts 96, 96 is continued when the lever arm 98 is moved backwardly to lower the rods 97, 97 to their position of rest. When the rods 97, 97 are left in their depressed position of rest, the travel of a copy sheet proceeds uninterrupted across the second section of this conveyor system to its third section.

As mentioned hereinbefore, the manual operation of this copy-lifting rack by the operation of the lever 98, may be replaced by an automatic lifting of the rack which is timed and operated by the electrical system of the apparatus, in synchronism with the travel of each copy sheet to permit its inspection by the operator of the apparatus and, if desired, its removal therefrom for manual correction.

Copy sheet guide plates are located adjacent the exit end of the second section of this transport system, and function to realign a sheet carried by this transport section which may have become somewhat angulated on this transport. One of these guide plates, 379, is shown by FIGURE 20. The other guide plate on the opposite side of the conveyor system is a mirror image of the guide plate 379. It will be noted that each of these guide plates has a vertical section 381 which extends from approximately the mid-point of the outer edge of the upper span of an outer belt 96 of the second section. The copy guide plates each have a central section 382 having a vertical side wall and a horizontal upper wall which is flared upwardly, beginning at a point near the entrance end of the copy guide plate. It has an exit end section 383 which is horizontal and extends over the entrance end of the third section of this transport system.

Still referring to FIGURE 20, the third section of the three sections of this conveyor system comprises two rollers 384 and 385 which carry a solid conveyor belt 386. The roller 385 carries, on the end of its axle, the sprocket 374 through which the second section of the conveyor system is driven, and a second and larger sprocket 387 which is connected by the chain 388 to the sprocket 389, driven through reduction gears by electric motor 390. Thus, it will be seen that the electric motor 390 provides the drive for both the second and the third sections of this conveyor system.

The upper span of the conveyor belt 386 rides on an upwardly curved crown sweep 391, which is a plate of a material such as a structural metal which has a high-heat conductivity. This crown sweep is located directly beneath the fuser unit 300, which is above and spaced away from the conveyor belt 386. This crown sweep causes the upper span of the conveyor belt and a copy sheet thereon to follow a curved path which prevents the copy sheet from curling laterally and coming into contact with the lower surface of the fuser unit 300. This crown sweep has the second function of absorbing heat from the section of the conveyor belt 386 which is immediately beneath the fuser unit, thereby preventing the base of the copy sheet carried by the conveyor belt 386 from becoming over-heated during the fusion of the toner image carried on its upper surface.

Still referring to FIGURE 20, it will be seen that the upper span of the belts 96, 96 of the second section of the conveyor system are inclined upwardly in their forwardly direction of travel. Further, it will be seen that the arcuate path of travel of the upper span of the belt 386 of the third section has a generally downward inclination in its forwardly direction of travel. The differences in the slopes of the second and third sections of the conveyor system slightly bends a copy sheet across its direction of travel, as it passes from the second to the third sections of the conveyor system. This bending of the sheet has an effect of preventing a lateral curling of the sheet, which is identical to that of the crown sweep 391.

The delivery sweep 392 is an arcuate plate which guides a copy sheet passing from the solid conveyor belt 386 into the nip between the rolls 393 and 394. The idler wheels 395, 395, one of which can be seen in FIGURE 20, guide a copy sheet onto the delivery sweep 392 and keep it moving around the sweep into the nip between the rolls 393 and 394.

The end of the shaft of the roll 394 carries a sprocket which is connected by the chain 397 to the sprocket 398 on the shaft of the reduction gear of the electric motor 399. Thus, the electric motor 399 drives the roll 394. The roll 393 is an idler roll driven by roll 394, or by a copy sheet passing between the two rolls. Upon entering the nip between the rolls 393 and 394, a sheet of copy paper is pulled around the delivery sweep 392 and delivered to the copy-receiving tray 99 of the apparatus. The roll 394 is driven at a speed which carries a sheet of copy paper somewhat faster than the rate at which it is carried by the third section of the conveyor system, and propels the trailing edge of the sheet clear of the rolls so that it comes to rest well within the copy-receiving tray 99.

FIGURE 23 is an exploded view of a preferred form of one of the grippers 309 or 310, which are identical in construction. Referring specifically to that figure, it will be seen that these grippers have two leaves 400 and 401 which are attached together by a piano-type hinge 402, which is spring loaded to keep the leaves 400 and 401 in contact with each other in what has been referred to hereinbefore as the "closed" position. The leaves 400 and 401 are made of metal and are coated on their outer sides with an electrically-insulating material.

The flat surface of the upper leaf 400 is longer than the corresponding surface of the lower leaf, and extends beyond both ends of the lower leaf. Each end of the surface of the upper leaf has two threaded perforations 403, 403. The plastic insulating blocks 404, 404 are attached to each end of the leaf 400 by the screws 405, 405, which pass through perforations 406, 406 in each of the blocks 404, 404, and are threaded into the perforations 403, 403.

The insulating blocks 404, 404, are each attached to a carrier member 407 by the screw 408, which passes through the perforation 409 in the flat section 410 of the member, and is threaded into the cavity 411 in the insulating block. The member 407 has a second flat section 412, which is in a plane at right angles to the plane of its section 410, and has rounded ends. The flat section 412 carries two pins or rods 413, 413 which extend outwardly from its outer face and are attached to a transport chain 301 of the conveyor system.

The insulating blocks 404, 404 are made of a relatively fragile plastic, which will fracture under a stress which is substantially lower than that required to break the chains 301, 301 or damage other parts of the conveyor system. Thus, the insulating blocks 404, 404 function both to insulate the leaves 400 and 401 from the carrier member 407 and the transport chains 301, 301 to which they are attached, and to protect the conveyor system from physical damage which could, otherwise, result in the event that the gripper grasped the edge of a copy sheet which had inadvertently jammed and could not be moved by the gripper.

Figure 1:
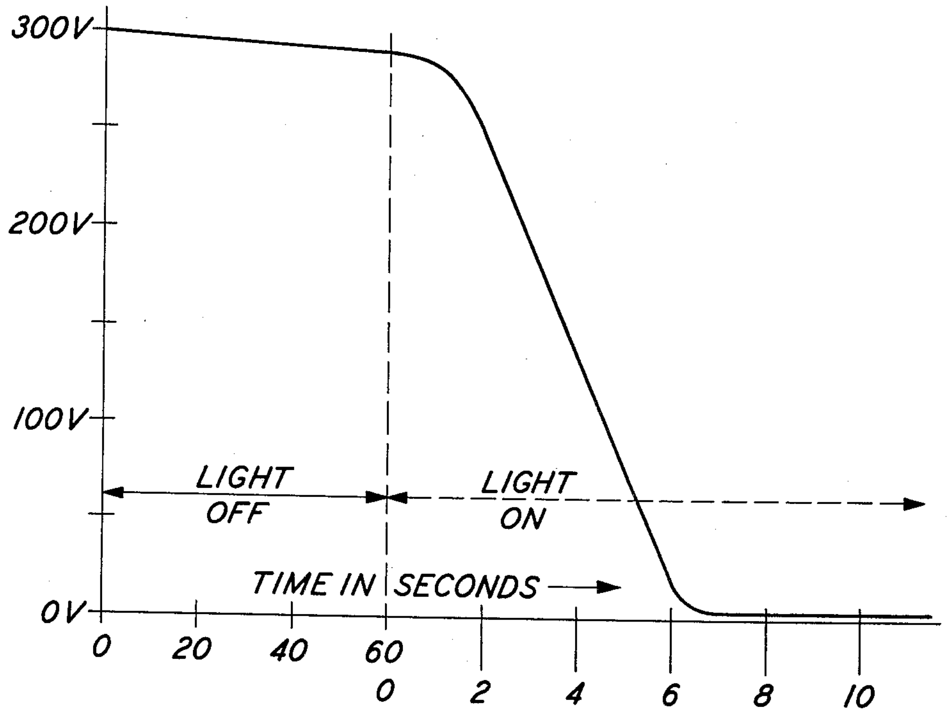

The hinge section of the lower leaf 401 of the gripper is the same length as the upper leaf 400, and carries at each end an upstanding, arcuate rod 350. The arcuate rods 350, 350 function as lever arms to force the gripper open against the spring tension of the hinge 402, when they are forced toward the upper leaf 400 of the gripper. This action has been described hereinbefore with reference to FIGURE 1, which shows the gripper in the inverted position in which it receives a copy sheet from the vacuum platen 165 of the apparatus. It has also been described with reference to FIGURES 22 and 25 which show the gripper in the position, as illustrated by FIGURE 23, in which it delivers a copy sheet to the second section of the conveyor system.

FIGURES 26, 27 AND 28.—THE TONER UNIT

Figure 26:
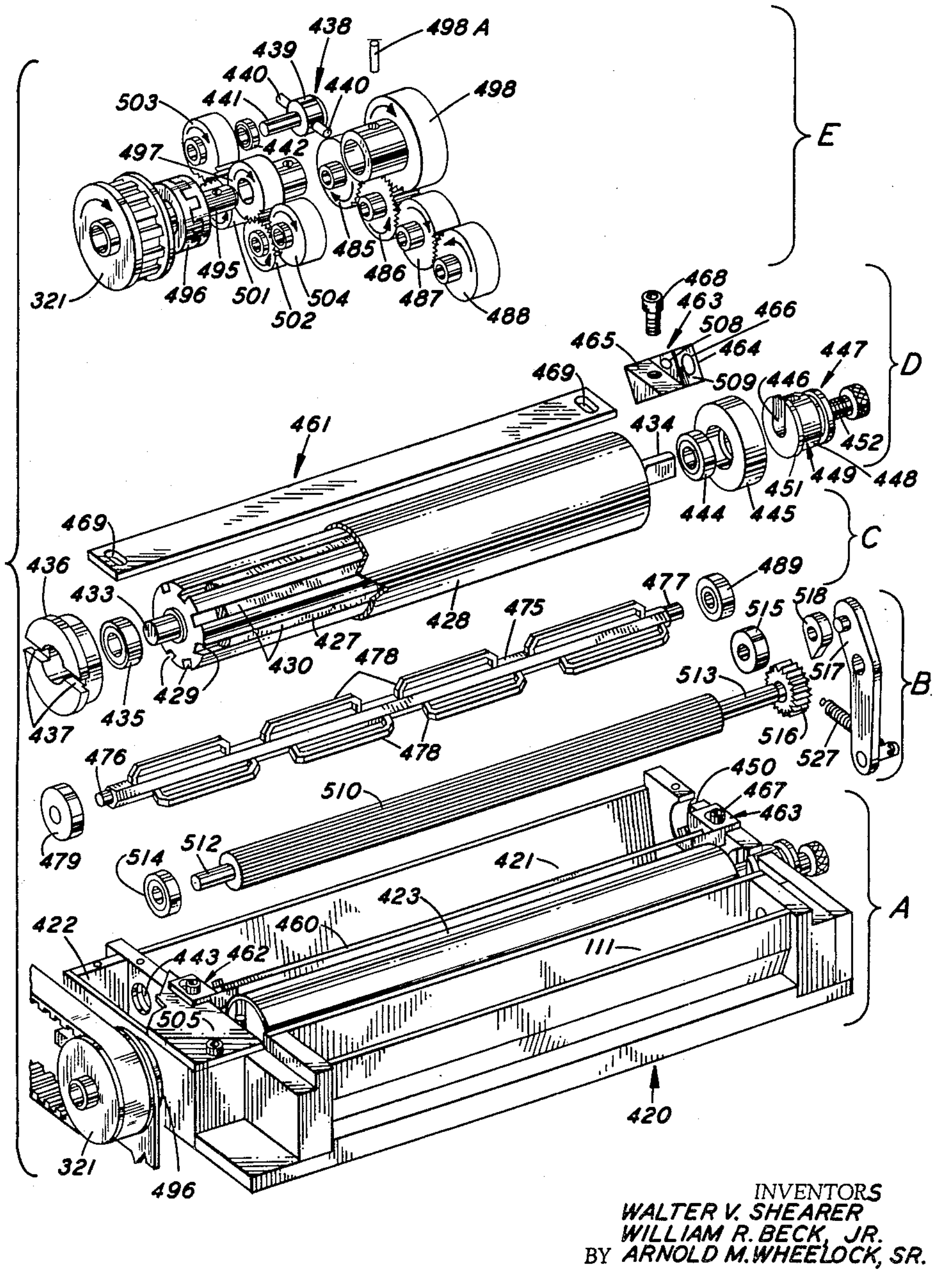
FIGURE 26 is an exploded, perspective view of the toner unit of the apparatus, showing the relationship between its components.
Figure 28:
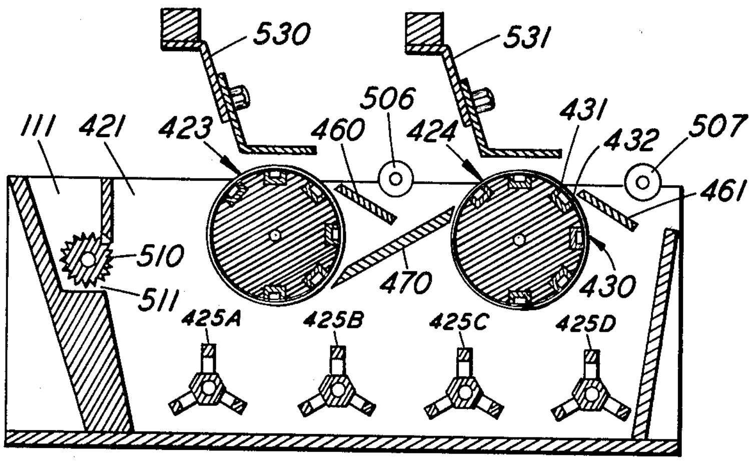
FIGURE 28 is a cross-sectional view of the toner unit illustrated by FIGURE 26, and of the cooperating shoes associated therewith.

The details of the toner unit, which has been designated hereinbefore by the numeral 110, are shown by FIGURES, 26, 27 and 28. Referring specifically to those figures, it will be seen that this toner unit comprises a tray 420 which is divided into three compartments 421, 422 and 111. The compartment 421 carries the magnetic toner rolls 423 and 424, the details of one of which are shown by FIGURE 26–D, and four toner mixers 425, 425, the details of one of which are shown by FIGURE 26–C. As best shown by FIGURE 28, the compartment 111 carries the toner feed roll 510, which forms a seal between that compartment and compartment 421 when at rest. The details of this toner feed roll are shown by FIGURE 26–B. The compartment 422 carries the gear train, illustrated by FIGURE 26–E, which operates the two magnetic toner rolls 423, 424 and the four toner mixers 425, 425.

The magnetic toner rolls 423, 424 are identical in design and are rotated in the same direction. Referring specifically to FIGURE 26–D, it will be seen that the roll 423 or 424 comprises a stationary, cylindrical core 427 and a rotatable outer shell 428. The cylindrical core 427 is made of a non-magnetic material such as, for example, brass and has a series of six longitudinal grooves 429, 429 cut into its cylindrical surface at equally-spaced intervals around approximately two-thirds of its total circumference. These longitudinal grooves carry permanent, plastic, magnet strips 430, 430. The cross-sections of these plastic magnets are illustrated by FIGURE 28, from which it will be seen that it is, in effect, a longitudinal horse-shoe magnet with its north pole 431 along one of its upper margins, and its south pole 432 along the opposite upper margin. As shown by FIGURE 26, the permanent magnet strips 430, 430 do not extend to the ends of the cylindrical core 427. The lengths of these permanent magnet strips are the width of the latent electrostatic image which is to be toned by the magnetic brush unit.

The core 427 of this magnetic toner unit has coaxial shaft ends 433 and 434, as shown by FIGURE 26–D. The shaft end 433 is cylindrical and is carried by the bearing collar 435 in which it is free to rotate. The collar 435 is, in turn, carried by the concentric collar 436, the outer surface of which carries the keyways 437, 437. The collar 436 is fitted into the end of the outer cylinder 428 with a tight slip fit and is attached thereto by set screws, not shown by the drawings. The inner surface of the collar 436 is adjacent the end of the core 427 which carries the shaft end 433.

Referring specifically to FIGURE 26–E, the member 438 has a cylindrical section 439 carrying keys 440, 440 and a shaft section 441. This cylindrical section 439 fits into the concentric opening of the collar 436, with the keys 440, 440 in the keyways 437, 437. The cylindrical shaft section 441 is carried by the bearing collar 442 which is within the perforation 443 in the wall of the compartment 421. The end of the shaft section 441 is within the gear compartment 422 of the toner unit and is connected to the gear train of the unit, as will be fully described hereinafter.

The shaft end 434 has a short, cylindrical section directly adjacent the end of the core 427 which carries the bearing collar 444 which, in turn, carries the concentric collar 445 which is fitted into the end of the outer cylinder 428 with a tight slip fit and attached thereto by set screws. The shaft end 434 has an outer flat-sided section which is fitted into the channel 446 of the shaft adjuster, designated generally by the numeral 447. The cylindrical section 448 of the member 449 of the shaft adjuster unit 447 is carried by the semi-circular perforation 450 in the wall of compartment 421 with its rim section 451 in the compartment in a position to bear against the inner edge of the perforation 450.

The member 449 of the shaft adjuster unit 447 has a threaded, coaxial perforation which carries the thumb screw 452, which has a centered point on a conical, inner end which centers itself in a centered, conical depression in the end of the shaft section 434. This thumb screw aligns the surface of the outer cylinder with the remainder of the toner unit.

The cylindrical surface of section 448 of the shaft adjuster member 449 has a groove 450 near its outer end which is outside the wall of compartment 421. This groove receives the end of the set screw 456 which can be seen by reference to FIGURE 27. This set screw locks the shaft adjuster unit in any desired rotational position within the perforation 450 of the wall of compartment 421. The adjustment of the rotational position of the shaft adjuster unit 447 determines the rotational position of the shaft end 434 and of the core cylinder 427, with respect to the toner unit as a whole.

The adjustability of the rotational position of the core 427 and of the plastic magnets 430, 430 which it carries, is an important feature of this toner unit in that it enables maximum efficiency to be obtained in the application of toner to a latent electrostatic image, carried by a photoelectrostatic sheet passed over the toner unit by the conveyor system of the apparatus. The adjustment of the position of the core 427 to obtain maximum efficiency in the toning operation, is made on the basis of trial and error. Although theories can be advanced on the basis that the positions of the north pole and the south pole edges of the plastic magnets should be in specific positions relative to the tangential path of travel of the photoelectrostatic sheet carrying the electrostatic image being toned, the trial and error adjustment is the simplest and most direct means for obtaining maximum efficiency in the toning operation.

As best shown by FIGURE 28, each of the two magnetic toner rolls 423 and 424, are, respectively, provided with the doctor blades designated generally by the numerals 460 and 461. The details of these doctor blades are identical and are shown by FIGURE 26–D for doctor blade 461. Referring specifically to FIGURE 26–D, it will be seen that the blade 461 is provided with end brackets 462 and 463, one of which is the mirror image of the other. Each of these end brackets is provided with two surfaces 464 and 465 which are at an angle of approximately forty-five degrees to each other. The section of the bracket forming surface 464 is provided with an oval perforation 466, through which the screw 467 passes to adjustably attach the bracket 464 to the top of the side wall of compartment 421 of the toner unit. The angled surface 465 is tapped to receive the screw 468 by which the end of the blade 461 is adjustably attached to the surface 465 through the oval perforation 469 near the end of the blade.

The screws 467, 467 and 468, 468 permit the edge of the blade 461 to be accurately adjusted to parallel the cylindrical surface of the shell 428 of the toner roll with a clearance which determines the height of the magnetic brush which comes into contact with the electrostatic image on a photoelectrostatic sheet. The edges of the doctor blades 460, 461 are below the horizontal tangent passing through the upper end of the vertical diameters of the magnetic toner units. The excess toner mix which is removed by the action of the doctor blades 460, 461 falls back into the toner mix tray.

Referring specifically to FIGURE 28, it will be seen that the angulated plate member 470 is located between the magnetic toner rolls 423 and 424 in a position such that its upper surface receives the toner mix falling from the surface of the shell 428 of the roll 424 adjacent the part of its core 427 which carries no magnets to retain the toner mix as a magnetic brush. This member 470 causes the toner mix dropped by the toner unit to fall into the toner mix in the bottom of the compartment 421 at a location such that it cannot be immediately picked up by the roll 424 without being admixed with the body of the toner mix in the bottom of that compartment.

The four mechanical stirrers 425*a*, 425*b*, 425*c*, 425*d*, near the bottom of the compartment 421 and below the magnetic toner rolls 423 and 424, agitate and mix the toner mix in the bottom of the compartment 421. The stirrers 425*a* and 425*c* are rotated by the gear train in clockwise direction, while the stirrers 425*b* and 425*d*, like the shells of the magnetic toner rolls 423, 424, are rotated in the reverse direction.

The mechanical stirrers 425, 425 are identical in construction the details of one of which are illustrated by FIGURE 26–C. The mechanical stirrer 425 comprises a rod 475 which is generally hexagonal in cross-section with cylindrical end sections 476, 477. The alternate surfaces of the hexagonal section of the rod 475 each carry four elongated loops 478, 478, which are spaced apart along each surface. The loops on the alternating surfaces around the rod are in stepped positions with respect to the length of the rod.

The cylindrical end section 476 of the rod 475 passes through a bearing 479 carried by the wall of compartment 421, and extends into the compartment 422 carrying the gear train of the unit. The end of section 476 of the stirrer 425*a* is attached to the gear 485 of FIGURE 26–E, which is located within compartment 422. The corresponding ends of the stirrers 425*b*, 425*c* and 425*d*, respectively, carry the gears 486, 487 and 488.

Referring again to FIGURE 26–C, the end section 477 of the stirrer 425 is carried by the bearing 489, which is located in a perforation in the wall of compartment 421 opposite that through which it carries the end section 476.

FIGURE 26–E illustrates the gear train by which the shells 428, 428 of the magnetic toner rolls 423 and 424 and the mechanical stirrers 425*a*, 425*b*, 425*c* and 425*d* are driven. The main drive sprocket 321 of this train is outside the wall of compartment 422, as shown by FIGURE 26–A, while the remainder of that gear train is within that compartment. The shaft 495 is detachably connected to the sprocket 321 by a self-centering, multi-jaw coupling 496. One of the two elements of this coupling 496 is attached to the sprocket 321, while the other is attached to the end of the shaft 495. This coupling 496 is located outside the wall of compartment 422. The shaft 495 is carried by a bearing in the wall of compartment 422.

The coupling 496 is disconnected by a movement of the toner unit away from the sprocket 321. This coupling permits the toner unit to be pulled, partially or wholly, out of the cabinet 40 of the apparatus through the door 109 for the replenishment of toner in its compartment 111, as described hereinbefore with reference to FIGURE 9, for servicing or for the substitution of a duplicate unit. As already noted, this is an advantageous feature of this apparatus both from the standpoint of the convenience in the replenishment of the toner, and the ease with which the toner unit can be replaced with a duplicate unit.

Referring specifically to FIGURE 26–E, the shaft 495 carries the gears 497 and 498 which are keyed together by the pin 498A. The gear 498 meshes with the gear 486 which, in turn, meshes on one side with the gear 485 and on the other with gear 487. The gear 487, in turn, meshes with gear 488. As shown by the arrows of FIGURE 26–E, this meshing of the gears causes gears 485 and 487 to rotate in one direction, and gears 486 and 488 to rotate in the opposite direction. As already noted, the gears 485, 486, 487, 488 are, respectively, carried by the shaft ends of the stirrers 425A, 425B, 425C and 425D, respectively.

Still referring to FIGURE 26–E, the gear 497 is the main drive for the shells 428, 428 of the magnetic toner rolls 423 and 424. The gear 497 meshes with the gears 501 and 502 which are idler gears and, respectively, mesh with gears 503 and 504 which drive the shells of magnetic toner rolls 423 and 424 through key members 438. Each of the gears 503 and 504 is attached to the shaft sections 441, 441 of the key members 438, 438 which are, in turn, keyed to the shells 428, 428 of the magnetic toner rolls 423 and 424, as described hereinbefore with reference to FIGURE 26–D. The top of the compartment 422, carrying the gear train, is closed by a cover 505 to protect the gear train from foreign matter.

Referring again to FIGURES 26–A and 26–D, it will be seen that the brackets 462 and 463 of the doctor blades 460 and 461 carry the ends of the axles of nylon rollers 506 and 507 which extend longitudinally above the upper surfaces of the blades 460 and 461. The position of these nylon rollers, with respect to the doctor blades 460 and 461, is best shown by FIGURE 28. The rollers 506 and 507 are insulating idlers, which prevent the trailing end of a photoelectrostatic sheet, being carried over the toner unit, from dragging over the surface of the blades 460 and 461 and interrupting the downwardly flow of the toner mix over their upper surfaces.

The toner mix feed roll 510 extends across the toner mix feed compartment 111 adjacent the longitudinal slot 511 along the bottom of the compartment 111, as can best be seen by reference to the cross-sectional view of the toner unit shown by FIGURE 28. The toner mix feed roll 510 has a generally-cylindrical surface which carries longitudinal grooves or serrations. When at rest, this toner mix feed roll seals the slot 511 but, due to its serrations, when rotated transfers an enriched toner mix or toner powder from the compartment 111 to the compartment 421 carrying the magnetic toning rolls 423 and 424.

The roll 510 is provided with cylindrical shaft ends 512 and 513. The shaft end 512 is carried by the bearing 514 in the side wall of the compartment 111, while the shaft end 513 is carried by the bearing 515 in the opposite side wall of the compartment 111, and extends through the bearing 515 to position a stub section outside that wall of compartment 111.

Figure 27:
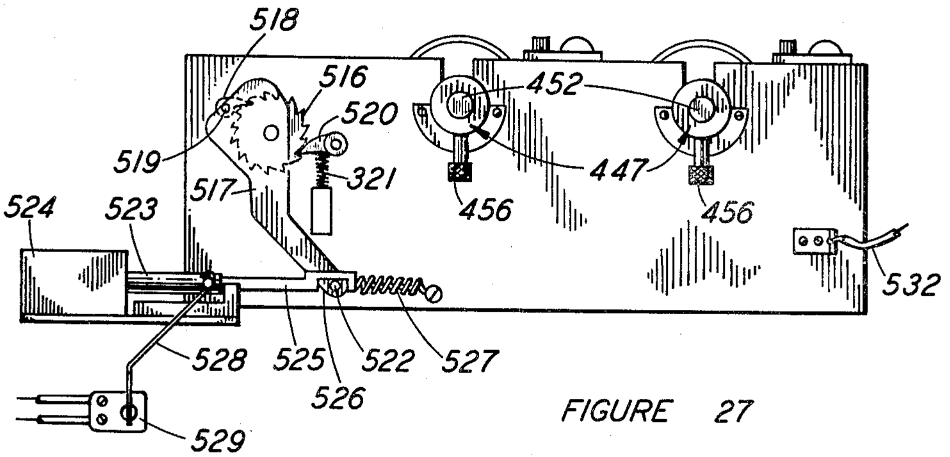
FIGURE 27 is an elevational view of the end of the toner unit illustrated by FIGURE 26, showing the means for adjusting and locking its magnetic cores in position.

Referring specifically to FIGURE 27, it will be seen that the outer end of the shaft end 513 carries the rachet wheel 516 which is keyed thereto, and the rachet arm 517 which is pivotally mounted thereon. The upper portion of the rachet arm 517 carries a spring-loaded, pivotally-mounted, rachet pawl 518, the edge of which bears on the rachet wheel 516. The pivot 519, carrying the rachet pawl, is located on the rachet arm 517 with respect to the end of the shaft end 513 which carries the rachet arm in a position such that when the lower end of the lever is moved laterally, shown as being to the left in FIGURE 27, the edge of the pawl engages the rachet wheel, causing it to rotate a minor fraction of its total circumference. This rotation of the rachet wheel 516 by the action of the rachet arm 517, causes a corresponding rotation of the toner mix feed roll which delivers an increasement of enriched toner mix or toner powder contained in compartment 111 to a body of toner mix carried by compartment 421, after each second such successive movement.

The rachet wheel 516 has a second pawl 520 having an edge bearing on its teeth. This pawl is loaded with a spring 521, which holds its edge against the rachet wheel 516 and permits the edge to ride over the teeth as the rachet wheel is rotated forwardly by the rachet arm 517 and the pawl 518, but prevents the rachet wheel from rotating in the reverse direction when the pawl 518 is drawn backwardly.

The lower end of the rachet arm 517 carries a pin 522, which is attached to the core 523 of the solenoid 524 by hook 525. The hook 525 is attached, at one end, to the end of the solenoid core 523 by a pivot, and at the other end to the pin 522 by the channel 526 near its opposite end. This channel 526 can be removed from the pin 522 and the hook 525 pivoted to get it out of the way, when it is desired to remove the toner unit 110 from the apparatus. The lower end of the rachet arm 517 is attached to the spring 527, which exerts tension which tends to pull the bottom of the lever in the direction, to the right as illustrated by FIGURE 28, which causes the pawl 518 to move backwardly over the rachet wheel 516.

When the solenoid 524 is energized, it retracts its core 523 which pulls the lower end of the rachet arm, to the left as shown by FIGURE 28, in the direction which causes the pawl 518 to move the rachet wheel 516 in a forwardly direction and, thereby, feed an increasement of enriched toner mix or toner powder from the compartment 111 to compartment 421. The solenoid 524 is energized by the electrical system of the apparatus, as will be fully described hereinafter, as determined by the particular one of the toner replenishment rate control switches 59–63 on the control panel 45 which has been closed by the operator of the apparatus.

The solenoid core 523 operates against the tension of the spring 527 as it is retracted. Upon reaching its fully-retracted position, the solenoid 524 is de-energized by the operation of the rod 528 connecting the outer end of the solenoid core and a switch 529 of the electrical system. When the solenoid is de-energized, the spring 527 returns the solenoid core to its extended position, the bottom of the rachet arm to its original position, and places the pawl 518 in position again to move the rachet wheel 516 forwardly to feed another increasement of enriched toner mixture or toner powder. As already noted, the pawl 520 holds the rachet wheel 516 against the backwardly movement of the pawl 518.

Referring again to FIGURE 28, it will be seen that the shoes 530 and 531 are, respectively, positioned above the magnetic toner rolls 423 and 424. These shoes 530 and 531 serve two functions. First, the back of a photoelectrostatic sheet being carried over the magnetic toner rolls 423 and 424 by the gripper 309 or 310 of the first section of the conveyor system, passes in contact with the lower sections of these shoes, which hold the reverse surface in contact with the magnetic brushes of the toner rolls 423, 424 to permit a uniform toning of the electrostatic image carried by that surface. Second, these shoes provide a ground contact for the application of a bias voltage applied by the operation of the limit switches 357, 358, 359 and 360, which are tripped by two lugs carried by the adjacent transport chain 301 of the first section of the conveyor system. The bias voltage which is applied through the toner unit 110 which, as noted elsewhere herein, is electrically insulated from the remainder of the apparatus, is determined by the setting of the potentiometer control knob 80 on the control panel 46. That current is registered by the voltmeter 81 of that control panel.

The toner unit 110 is continuously connected to the desired pole of the D.C. bias voltage. Both the toner unit 110 and the bias shoes 530 and 531 are electrically insulated from the remainder of the apparatus. The tripping of the switch 357 applies the bias voltage at the shoe 530 at the instant that the leading edge of a photoelectrostatic copy sheet is brought under it by the gripper 309 or 310. The bias voltage is then turned at the shoe 531 by the tripping of the switch 538, as the leading edge of the sheet comes under that shoe. The tripping of the switch 359 turns the bias voltage off at the shoe 530 as the trailing edge of the sheet reaches that shoe. The tripping of the switch 360 then turns the bias voltage off at the shoe 531 as the trailing edge of the sheet reaches that shoe. The bias voltage is applied by the switches 357 and 358 by establishing a connection between the shoe 530 and the shoe 531, respectively, and ground. This voltage is turned off by the switches 359 and 360 by breaking the connection between these shoes and ground. The mechanism by which the electrical connection between the bias shoes 530 and 531 and ground is made by the operation of the switches 357 and 358, respectively, and broken by the operation of the switches 359 and 360, respectively, will be fully explained hereinafter with reference to FIGURES 34 and 35.

From the foregoing, it will be understood that the bias voltage is turned on only when a photoelectrostatic sheet is between the shoes and the magnetic brushes of the adjacent magnetic toning unit. This avoids a short-circuit which would result from the bias voltage being on when there was no photoelectrostatic sheet between the shoe and the magnetic brushes.

FIGURES 20, 29 AND 30.—THE FUSER UNIT

Figures 29, 30:
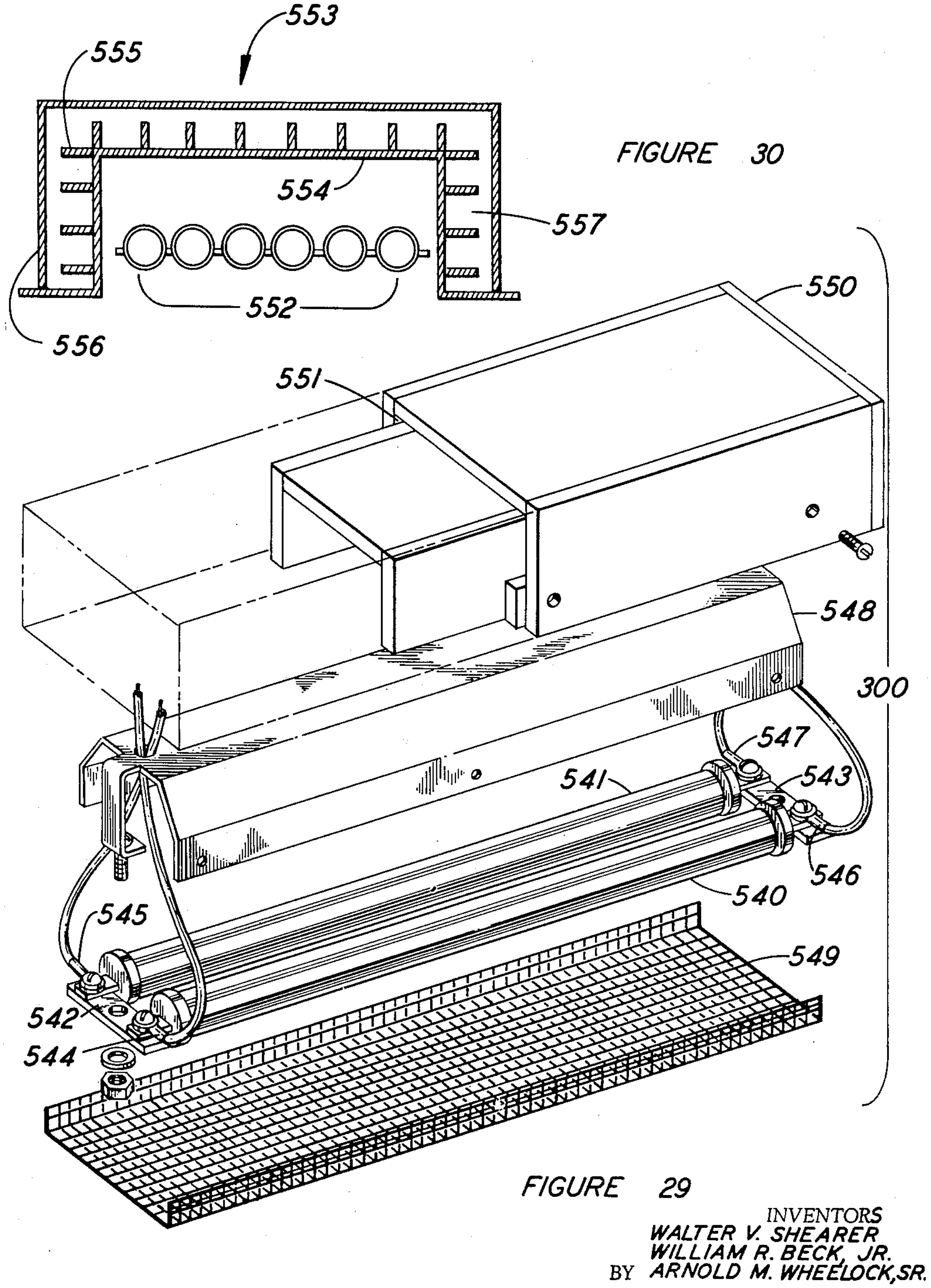
FIGURE 29 is an exploded, perspective view of the fuser unit of the apparatus.
FIGURE 30 is a schematic, cross-sectional view of the heat reflector, and the infrared heating tubes of an alternative form of the fuser unit.

FIGURE 29 illustrates the fuser unit 390 in an exploded view, while FIGURE 30 shows the cross-section of an alternative embodiment of a fuser unit. FIGURE 20 shows the relationship of this unit to the conveyor system of the apparatus, and shows the blower unit which cools the fuser unit. Referring specifically to FIGURE 29, it will be seen that the infrared heating lamps 540, 541 are attached to the terminal bars 542, 543 which are made of an electrically-nonconductive, structural material. The terminals 544 and 546 of lamp 540, and the terminals 545 and 547 of lamp 541 are connected in parallel to the electrical system of the apparatus, as will be described hereinafter.

The insulating terminal bars 542, 543 are attached to the heat reflector 548 by bolts to hold the lamps 540, 541 within the reflector. The protective screen 549 is located beneath the lamps and is attached to the edges of the reflector 548. The heat reflector 548 is within the double-walled, heat-insulating box 550. The double walls of the insulating box 550 are separated by an air space 551 through which cooling air is circulated by a blower unit, as will be described below with reference to FIGURE 20.

The alternative embodiment of this fuser illustrated by FIGURE 30, carries six infrared heating lamps 552, 552 positioned within a combination heat reflector and thermal-insulating shield 553, which has an inner heat-reflector wall 554 which carries a plurality of heat-dissipating fins 555. This shield 553 has an outer wall 556 spaced apart from the inner wall 554 and the edges of the fins which it carries, to provide an air space 557 through which cooling air is circulated.

In the operation of the fuser unit illustrated by FIGURE 29, or the alternative embodiment illustrated by FIGURE 30, it is desirable to provide a forced circulation of air through the air space of the heat-insulating box of the unit. This apparatus includes a blower which draws air through the air space of the fuser unit, and exhausts it outside the apparatus.

Referring specifically to FIGURE 20, it will be seen that the blower unit, designated generally by the numeral 560, is illustrated in broken outline. This unit consists of a chamber 561 opening into one end of the air space 551 of the fuser unit, the other end of which is open. The chamber 561 is connected by a flexible tube 562 to the chamber 563 which is, in turn, connected to the suction side of the blower 564, which is vented outside the cabinet 40 of the apparatus through tube 565. In operation, this blower draws air from the interior of the cabinet 40 through the air space 551, and exhausts it outside the cabinet.

The electric motor of the blower 564, the electric motor 390 which drives the second and third sections of the conveyor system, and the electric motor 399 which drives the delivery rolls, are operated continuously during the operation of the apparatus. As will be described hereinafter with reference to FIGURE 31, the electrical circuits to these motors must be closed to place them in operation before the fuser unit 300 can be turned on. This is a safety feature of the apparatus, in that it avoids the possibility of the fuser being in operation without a forced circulation of cooling air, or with the belt 386 of the third section of the conveyor system stationary.

It will be understood from the foregoing description, that the operation of both the first section of the conveyor system and the toner unit is intermittent, since the conveyor system comes to a stop to permit the grippers 309 and 310 to receive a copy sheet from the vacuum platen. The toner unit, as well as the first section of the conveyor system, is driven by the electric motor 313 and is stopped when the first section of the conveyor system is stopped.

FIGURES 31, 32, 33, 34 AND 35.—THE ELECTRICAL SUPPLY AND CONTROL SYSTEM

FIGURES 31, 32, 33 and 34 illustrate the electrical circuits which furnish the power and control the operation of the apparatus in accordance with this invention. These figures generally sub-divide the electrical circuits of the apparatus into four major components. FIGURES 31 and 32 show the electrical circuits which operate the process section of the apparatus and those of the Control Panels A and B, with the exception of the electrical circuits of the toner replenishment mechanism and those which supply the bias current to the toner unit. FIGURE 33 shows the electrical circuits of the A Box and of the associated limit switches in the process section, which provide the major part of the automatic control of the operation of the apparatus. FIGURE 34 shows the electrical components of the B Box which control the automatic replenishment of the toner and the automatic control of the bias current to the toner unit, the associated toner replenishment switches, and the associated bias control switches, adjacent one of the transport chains 301, 301 of the first section of the conveyor system of the apparatus. FIGURE 35 shows the electrical components of an alternative B Box, which differs from those illustrated by FIGURE 34 in the circuits of the toner replenishment mechanism.

Referring specifically to FIGURE 31, the electrical power supply of this apparatus is supplied to a suitable source of 220 volt A.C. current through the electrical lines 570A, 571 and 572A. The main power switch 52 of the apparatus, illustrated by FIGURE 5, provides a means for turning the power supply on and off by closing and opening the circuits to lines 570 and 572. The lines 571 and 572 are connected on the apparatus side of the switch 52 through the pilot light 53, also shown by FIGURE 5, which glows when the switch 52 is closed and the apparatus is being supplied with electric current.

The lines 570 and 571 are connected to the electrical circuits of A Box, illustrated by FIGURE 33, through the connector plugs 576 and 577 of A Box. Line 570 carries the electric fuse 76, shown by FIGURE 6.

The lines 570 and 572 are connected to the input terminals of the double-pole switch 66, illustrated by FIGURE 5, of the fuser assembly. The output terminal of switch 66, corresponding to its input terminal connected to line 572, is connected by line 578 to the input terminal of the single-pole switch 86, illustrated by FIGURE 6, the output terminal of which is connected by line 579 to the primary circuit of the autotransformer 580. The other pole of the primary circuit of the autotransformer 580 is connected to the line 571. The secondary circuit of the autotransformer 580 is connected through a fuse 581, through the line 582, to the terminal 544 of lamp 540 of the fuser unit, illustrated by FIGURE 29. The line 579 is connected through the pilot light 67, shown by FIGURE 6, to the line 571. As described hereinbefore, the terminal 546 of lamp 540, and the terminal 547 of lamp 541 are electrically connected together by the line 571 to place the lamps in parallel.

The closing of the switches 66 and 86 completes the electrical circuit to the fuser unit 300, and causes it to emit infrared heat at a rate determined by the voltage supplied to the unit by the setting of the autotransformer 580.

The output terminal of switch 66, corresponding to its input terminal connected to line 570, is connected to the fuse 72, illustrated by FIGURE 6, by the line 583 which is, in turn, connected by the line 574 to a terminal of each of the conveyor system drive motors 390, 399, and the motor 584 of the blower 564. The second terminal of each of the electric motors 390, 399 and 584 are connected to the line 571.

The closing of the switch 66 completes the electrical circuits to the motors 390, 399 and 584, provided that the fuse 72 is intact. Since the fuser is not placed in operation until both switch 66 and switch 86 are closed, the motors 390, 399 and 584 must be running at all times that the fuser unit 300 is in operation. This is an important safety feature of this apparatus, since a fire hazard could result from the fuser unit being run without its cooling blower 564 in operation and with the third section of the conveyor system at rest.

Still referring specifically to FIGURE 31, it will be seen that the lines 570, 571 and 572 are connected to the lamp converter 585 to furnish it with an input 220 volt A.C. current. This converter is connected on its output side by lines 586 and 587 to the lamps 128, 128 of the optical system of the apparatus, illustrated by FIGURE 13. The voltage of the current supplied by the converter 585 to the lamps 128, 128 is at two distinctly different levels, which are determined by the particular phase of the operation of the apparatus, as is fully explained below. The lamp converter 585 is also connected by lines 571 and 589 to the switch 630 in timer 68, illustrated by FIGURES 5 and 32.

The lamp converter 585 supplies a relatively-low voltage electric current to the lamps 128, 128 of the optical system of the apparatus, at all times that the main power switch 52 of the apparatus is closed. The purpose of this current is to keep the filaments of the lamps 128, 128 relatively hot, so that when they are supplied with the higher voltage required to bring them to the desired level of illumination to expose a photoelectrostatic copy sheet to an optical image, they will reach that level of illumination in an extremely brief interval of time.

The operation of the solenoid of the lens and shutter system 135 of the apparatus, by the electrical circuits illustrated by FIGURES 32 and 33, to open the shutter of the lens system, also activates the lamp converter 585, through the lines 571 and 589, to cause it to supply a higher voltage to the lamps 128, 128 which is pre-set to give the desired level of illumination for the exposure of the photoelectrostatic copy sheet. The closing of the shutter causes the lamp converter 585 to reduce the voltage of the current supplied to the lamps 128, 128, from that supplied for the exposure to the lower voltage supplied to keep the filaments of the lamps 128, 128 hot and merely glowing.

FIGURE 32 illustrates the electrical circuits of the process section and of the control panels 45 and 46 of the apparatus which are automatically controlled by the electrical components of A Box, which are illustrated by FIGURE 33. Referring specifically to FIGURE 32, it will be seen that this section of the electrical circuit of the apparatus is supplied with 110 volt A.C. current when the main power switch 52 of the apparatus, illustrated by FIGURE 31, is closed. The line 570 is connected to the terminal 595 of the continuous-operation switch 56, also shown by FIGURE 5. The terminal 596 of the switch 56 is connected by line 597 to one terminal of the pilot light 57, the other terminal of which is connected to the line 571, so that it glows when the switch 56 is closed. The terminals 598 and 599 of the switch 56 are connected by the lines 600 and 601 to the terminals 593 and 594 respectively, of the starting switch 54, and to the terminals of its pilot light 55, both shown by FIGURE 33. The line 570 is connected to fuse 71 which is, in turn, connected by line 602 to the connector plug 603 of A Box, and to connector plug 604 of B Box.

Still referring to FIGURE 32, the line 571 is connected to one terminal of the motor 605 of the vacuum pump 195, the other terminal of which is connected to fuse 73 by line 606 which, is in turn, connected by line 588 to connector plug 607 of A Box. The line 571 is connected to one terminal of the solenoid air valve 196, the other terminal of which is connected by the line 608 to the connector plug 609 of A Box. The line 571 is further connected to the transport motor 246 at one terminal, the other terminal of which is connected by line 701 to fuse 74 which is, in turn, connected to the connector plug 611 by the line 610. The line 571 is also connected to one terminal of the cam motor 260 of the transport system, the other side of which is connected by the line 612 to the terminal 751 of the limit switch 267.

The other side of the limit switch 267 has two terminals. One of these terminals, 613, is connected by line 614 to the connector plug 615 of A Box. The other terminal, 616, of the limit switch 267 is connected by line 617 to connector plug 618 of A Box.

Further, the line 571 is connected to a terminal of the autotransformer 620, the other terminal of which is connected by the line 622 to the fuse 77 which is, in turn, connected by the line 621 to the terminal of the switch 85, the other terminal of which is connected to the connector plug 623 of A Box by the line 267.

The variable terminal of the autotransformer 624 is connected to terminal 916 of the high-voltage supply 624. The line 622 is connected to terminal 917. Line 921 connects voltmeter 83 and the ammeter 84 to terminal 918. Line 625 connects the other side of the voltmeter 83 and the ammeter 84 to terminal 919 of the high-voltage supply 624. Line 281 connects the corona discharge wires 286, 286 of the corona discharge unit 270 to the high-voltage terminal 920. The grid 291 of the corona discharge unit 270 is biased by the line 626 connected to the resistor 627 which is, in turn, connected by the line 631 to ground. The base plate 271 of the corona discharge unit is connected directly to ground by the line 631.

One terminal of the solenoid of the shutter 628 of the shutter and lens system 135 is connected to line 571, while the other terminal of this solenoid is connected by line 589 to the lamp converter 585, illustrated by FIGURE 31. This terminal of the shutter solenoid is also attached by the line 589 to the switch 630 of the timer 68. The other terminal of switch 630 is connected to the line 602.

The switch 630 is mechanically tied to the clutch 632 of the timer 68. One terminal of the clutch 632 is connected by line 633 to the connector plug 634 of A Box, while the other terminal of the clutch 632 is connected by line 571 to one terminal of the motor 636 of the timer. The other terminal of the motor 636 is connected by line 637 to one terminal of the switch 638. The other terminal of the switch 638 is connected to line 633 and the connector plug 634 of A Box.

The switch 638 is mechanically connected to the motor 636 and to the switch 639. The switch 638 is in its closed position when the switch 639 is open, and vice-versa.

The motor 313, which drives the conveyor system and the toner unit of the apparatus, is connected to the line 571 at one of its terminals. The other terminal of the motor 313 is connected by line 640, through the fuse 75, to the line 614 which is, in turn, connected to the connector plug 615 of A Box. The line 614 is also connected through fuse 79 to the connector plug 641 of B Box. The gripper solenoid 347 has one terminal attached to line 571, and its other terminal connected by line 642 to connector plug 643 of A Box.

Referring specifically to FIGURE 33, which shows the elctrical components of A Box, it will be seen that this box contains a stepping switch, indicated generally by the numeral 650, which has three levels, 651, 652, 653, in the form of a triple-pancake structure. This stepping switch has a single shaft 654 which carries, for the levels 651, 652, 653 respectively, the sweep contact arms 655, 656 and 657. Each level of the stepping switch 650 carries a series of nine peripheral contacts through which electrical circuits are closed by the step-wise positioning of their respective sweep arms. The peripheral contacts of level 651 are designated by the numerals 660, 661, 662, 663, 664, 665, 666, 667, 668; those of level 652 are designated by the numerals 670, 671, 672, 673, 674, 675, 676, 677 and 678; and those of level 653 are designated by the numerals 680, 681, 682, 683, 684, 685, 686, 687 and 688.

The electrical lines 690 and 691 connect the connector plugs 576 and 577, respectively, to the rectifier 692, which converts the incoming 110 volt A.C. current to D.C. current, which is fed into the lines 693 and 694. The line 693 is connected to the shaft 654 of the stepping switch 650 and, in turn, to the sweep contact arms 655, 656 and 657. This line 693 is also connected to the connector plug 695 of Box A.

The shaft 654 of the stepping switch 650 is operated by the stepping coil 696, which is controlled by the interrupter switch 697.

Of the peripheral contacts of level 651 of the stepping switch 650, the contact point 660 is connected by line 698 to the connector plug 699 of Box A. The connector plug 699 is, in turn, connected by the line 700 to one terminal of the limit switch 212, the other terminal of which is attached by the line 600 to the terminal 593 of the starting switch 54. The terminal 594 of the starting switch 54 is connected by line 601 to the connector plug 703 of A Box which is, in turn, connected by line 704 to one terminal of the interrupter switch 697. The other terminal of the interrupter switch 697 is attached by line 705 to a terminal of the stepping coil 696. The other terminal of the stepping coil 696 is attached to line 694 which is, in turn, connected to the rectifier 692.

The peripheral contact 661 is connected by line 706 to the connector plug 707 which is, in turn, connected by line 708 to one terminal of the limit switch 200. The other terminal of the limit switch 200 is connected to line 601. The peripheral contact 662 is connected by line 709 to the connector plug 710 which is, in turn, connected by line 711 to one terminal of limit switch 210, the other terminal of which is connected to line 601. The peripheral contact 663 is connected by line 712 to the connector plug 713 which is, in turn, connected by line 714 to one terminal of the limit switch 258, the other terminal of which is connected to line 601.

The peripheral contact 664 is connected by line 715 to the connector plug 716 which is, in turn, connected by line 717 to one terminal of the switch 639 of the timer 68 on control panel 45. The other terminal of the switch 639 is connected to the line 601.

The peripheral contact 665 is connected by line 718 to the connector plug 719 which is, in turn, connected by line 720 to the terminal of limit switch 257. The other terminal of limit switch 257 is connected to line 601. The peripheral contact 666 is connected by line 721 to the terminal 722 of the time delay 723. The terminal 724 of the time delay 723 is connected by the line 704 to the connector plug 703.

The peripheral contact 667 is connected by line 726 to the relay 727 which is, in turn, connected by line 725 to connector 728 which, in turn, is connected by line 733 to a terminal of the limit switch 356. The other terminal of the limit switch 356 is connected to the line 601. The detector side of the control relay 727 is connected by one of its terminals to the line 591, while its other detector terminal is connected by line 635 to a terminal on the output side of control relay 729 which is, in turn, connected by the line 730 to the connector plug 731 of A Box. The connector plug is, in turn, connected ot one side of the limit switch 355 by the line 732. The other terminal of the limit switch 355 is connected to line 602. The peripheral contact 668 is connected to line 704, and through the connector plug 703 of A Box, to the line 601.

Still referring to FIGURE 33, it will be seen that the peripheral contact 670 of the level 652 of the stepping switch 650 is a dead terminal with no electrical connection other than with the contact arm 656. The peripheral terminals 671, 672, 673, 674, and 675 are connected in series by the electrical line 735 which is also connected to the detector side of the relay 736. The other terminal of the detector side of relay 736 is connected to line 694. The peripheral contacts 676, 677 and 678 are dead terminals with no electrical contact other than with the contact arm 656. One of the output terminals of the control relay 736 is connected to the line 737 which is, in turn, connected to the connector plug 603. The other output terminal of control relay 736 is connected by line 738 to the connector plug 607 of A Box which is, in turn, connected through line 588 and fuse 733 to the motor 605 of the vacuum pump.

The peripheral contact 680 of the level 653 of the stepping switch 650 is a dead terminal with no electrical contact other than that with contact arm 657. The peripheral contact 681 is connected by the line 739 to a terminal of the detector side of relay 740, the other terminal of which is connected to line 694. One output terminal of control relay 740 is connected to the line 737, while the other output terminal is connected by the line 741 to the connector plug 609 of the A Box. As described above, the connector plug 609 is, in turn, connected through the line 608 to the solenoid air valve 196. The peripheral contact 682 is a dead terminal with no electrical contact other than that with contact arm 657.

The peripheral contact 683 is connected by the line 742 to a terminal of the detector side of relay 743, the other terminal of which is connected to the line 694. One output terminal of the relay 743 is connected to the line 737, while the other output terminal is attached by the line 744 to the connector plug 611 which is, in turn, connected through the line 610 and the fuse 74 to the transport motor 246. Also, another output is connected by the line 745 to the connector plug 623 which is in turn, connected to a terminal of the switch 85. The other terminal of the switch 85 is connected to the primary winding 620 of the high-voltage corona discharge transformer.

The peripheral contact 684 is connected by line 746 to a terminal of the detector side of relay 747, the other terminal of which is connected to the line 694. One output terminal of relay 747 is connected to the line 737, while its other output terminal is connected by the line 748 to the connector plug 634. As noted above, the connector plug 634 is connected to the timer clutch 632 and the timer switch 638 by the line 633.

The peripheral contact 685 is connected by line 749 to a terminal of the detector side of relay 750, the other terminal of which is connected to the line 694. One output terminal of the relay 750 is connected to the line 737, while the other output terminal is connected to the line 744, which connects the relay 743 to the connector plug 611.

The peripheral contact 686 is connected by line 752 to a terminal of the detector side of relay 729, the other side of which is connected to line 694. As noted hereinbefore, the control relay, when in closed position, has an output terminal connected to the detector side of relay 727, and its other output terminal, when in closed position, connected by the line 730 to the connector plug 731 of A Box. It has also been noted, that one of the output terminals of control relay 727 is connected to peripheral contact 667 of the stepping switch 650. The other output terminal of the control relay 727 is connected to a terminal of the limit switch 356. The output terminals of this relay 727 are also, respectively, connected to the line 730 and to the line 737.

The peripheral contact 687 is connected by line 755 to the terminal of the detector side of relay 756, the other terminal of which is connected to line 694. One of the output terminals of control relay 756 is connected to the line 737. The other output terminal of this control relay 756 is connected to the connector plug 615 of A Box. Another contact of control relay 756 is connected to line 737 and to the connector plug 758 of A Box. As already noted the connector plug 615 is connected by line 614 to one terminal of the limit switch 267. The connector plug 758 is connected by line 759, through fuse 78, to connector plug 760 of B Box.

The peripheral terminal 688 is connected by line 761 to the connector plug 762 of Box A. The connector plug 762 of A Box is connected by line 837 to the connector plug 838, illustrated by FIGURE 34 which is described below.

As already noted, FIGURES 34 and 35 illustrate alternative embodiments of the electrical components and circuits of the B Box, and of related components of the Control Panel A of the apparatus. The B Box carries the circuits which operate the brake 314 on the motor 313, which drives the conveyor system of the apparatus and the toner unit 110. It carries the circuits which control and supply the bias current to the toner unit 110. It also carries the circuits which operate the toner replenishment mechanism.

The electrical circuits illustrated by FIGURES 34 and 35 differ only as to the circuits which operate the toner replenishment mechanism. The circuits illustrated by FIGURE 34 utilize a series of push-button type switches to control the rate at which toner is replenished in the toner unit 110. Such a series of switches is illustrated by the Control Panel A, shown by FIGURE 5. The circuits shown by FIGURE 35 utilizes a single-rotary, multi-contact type switch for this purpose.

Referring to both FIGURES 34 and 35, it will be seen that the electrical circuits which control the operation of the brake 314 on the motor of the conveyor system, include the connector plug 760 of Box B which is connected through fuse 78, by the line 759, to the connector plug 758 of Box A. Within Box B, the connector plug 760 is connected by the line 759 to the rectifier 772, which furnishes a D.C. current for the operation of the brake 314. The rectifier has its other A.C. terminal connected by the line 773 through connector plug 774 to the A.C. ground line 571. The D.C. terminal of the rectifier 772 is connected by the line 775 through the connector plug 776 and the line 777 to one terminal of the brake 314. The other terminal of the brake 314 is connected to the ground line 571.

As noted hereinbefore, the bias current which is supplied during the toning of the latent electrostatic image by the toner unit, is turned on by the operation of the limit switches 357 and 358 by lugs carried by one of the transport chains 301, 301, and turned off by the operation of the switches 359 and 360 by those lugs. The toner unit 110 is connected to a source of bias current at all times when the apparatus is in operation. The flow of the current is turned on by the limit switches 357 and 358 through electrical circuits which connect the bias shoes 530 and 531 to ground, and turned off by switches 359 and 360 through electrical circuits which break the connection of the bias shoes 530 and 531, leaving them electrically insulated.

In the electrical circuit which operates the ground connection of bias shoe 530, one terminal of the limit switch 357, which is normally in open position, is connected to the A.C. supply line 602. The other terminal of the switch 357 is connected by the line 778 to the connector plug 779 of Box B. Within Box B, the connector plug 779 is connected by the line 780 to a terminal of the detector side of the relay 781, the other terminal of which is connected to the line 773. A terminal of the cooperating limit switch 359, which is normally in closed position, is connected to the A.C. supply line 602, while its other terminal is connected by the line 784 to connector plug 764. Line 765 connects connector plug 764 with the relay 781. Another terminal of relay 781 is connected to ground by the line 785. The other output terminal of relay 781 is connected by the line 786 to the connector plug 787 of B Box. The connector plug 787 is, in turn, connected by the line 788 to the bias shoe 530.

The electrical circuit which operates the ground connection of the bias shoe 531 is identical to the electrical circuit described by the foregoing, which operates the ground connection to the bias shoe 530. In the circuit which operates the ground connection to the bias shoe 531, one terminal of the limit switch 358, which is normally in open position, is connected to the A.C. supply line 602. The other terminal of the limit switch 358 is connected by the line 789 to the connector plug 790 of B Box. The connector plug 790 is, in turn, connected within the B Box by the line 791 to one terminal of the detector side of the control relay 792. The other terminal of the detector side of the relay 792 is connected to the line 773. One terminal of the cooperating limit switch 360 is connected to the A.C. supply line 602, and its other terminal is connected by the line 794 to the connector plug 795 of B Box. The connector plug 795 is connected by line 754 within the B Box to one output terminal of the control relay 792, the other side of which is connected to line 791. The other output terminal of the relay 792 is connected to ground by line 797 and, by the line 798, to the connector plug 799. The connector plug 799 is, in turn, connected by the line 800 to the bias shoe 531.

In the description of FIGURE 32, it was pointed out that the line 614 is connected through the fuse 79 in Control Panel B, to the connector plug 641 of Box B. The line 614, the fuse 79, and the connector plug 641 are parts of the electrical circuits which supply a bias current to the toner unit 110. Referring again to FIGURES 34 and 35, it will be seen that the connector plug 641 is connected with B Box by the line 805 to a terminal of the bias supply unit 806, the other A.C. terminal of which is connected to the line 773.

The bias supply unit 806 is a combination of an isolation transformer and a rectifier to convert the A.C. current fed to the unit, to the D.C. current required for the bias current supplied to the toner unit 110. The D.C. terminals of the bias supply unit 806 are connected by the lines 807 and 808 to the connector plugs 809 and 810, respectively, of the B Box. The connector plugs 809 and 810 are, in turn, connected by lines 811 and 812, respectively, to the potentiometer 813 which is adjustable by the knob 80 to regulate the voltage of the bias current which is registered by the voltmeter 81. The knob 80 of the potentiometer 813 and the voltmeter 81 are both on Control Panel B, which has been described hereinbefore with reference to FIGURE 6. One of the output terminals of the potentiometer 813 is grounded, while the other output terminal is connected by the line 532 to the toner unit 110. Reference has been made hereinbefore to line 532 in the discussion of FIGURE 28. The terminal of the potentiometer 813 which is grounded, depends upon whether a negative or a positive bias current is to be supplied to the toner unit 110.

FIGURES 34 and 35 show the positive terminal of the potentiometer 813 connected to ground to supply a negative bias current to the toner unit 110. A negative bias current is ordinarily desirable in the toning of an electrostatic image on a photoelectrostatic coating of zinc oxide dispersed in a resinous binder. This negative bias current eliminates the undesirable effect of any residual negative charge, carried by the background and border areas of the latent electrostatic image, in giving the copy a dirty appearance. This negative bias voltage has the effect of cutting off the lower end of the curve for the dissipation of an electrostatic charge shown by FIGURE 1.

The electrical circuits which control the toner replenishment by the toner unit 110 illustrated, respectively, by FIGURES 34 and 35 include identical components and circuits, which will be described with reference to both figures before considering the components and electrical circuits which are different in the figures.

In the description of the Control Panel A, reference was made to the switches 64 and 65 which permitted the manual control of the addition of toner to the toner mix of the toner unit 110, by which the closing of the switch 64 started the addition of the toner while the closing of the switch 65 stopped the addition. These switches 64 and 65 are, for simplicity, shown as a single switch by both FIGURE 34 and FIGURE 35, and identified by the numerals 64–65. Referring specifically to those figures, it will be seen that one terminal of the switch 64–65 is connected to the A.C. line 602, while its other terminal is connected, by the line 815, to the winding of the solenoid 524 which operates the toner feed roll 510 of the toner unit 110. The other terminal of the solenoid is connected by line 571 to a terminal of the switch 529, which is closed when the core 523 of the solenoid 524 is moved to its retracted position, and opened when the core is in its extended position. A terminal of the switch 529 is connected by line 856 to connector 695. The other terminal of switch 529 is connected by line 857 to connector 858 at B Box. It will be noted that these components and circuits are outside the B Box.

The electrical circuits which control the toner replenishment by the toner unit 110 illustrated, respectively, by FIGURES 34 and 35, both include a stepping switch 770 which is within the B Box. The stepping switch 770 is of the type which is moved forward, from one peripheral contact to the next, by each incoming electrical pulse until its sweep arm reaches a peripheral terminal which is electrically connected, after which it returns to its initial off position. In this respect, it differs from the stepping switch of A Box, the sweep arm of which moves from one live contact to the next until it completes the series of contacts and, only then, returns to its initial contact point.

Still referring both to FIGURES 34 and 35, the stepping switch 770 has a sweep arm 817 which is connected by the line 818 to the connector plug 604 of B Box. The connector plug 604 is, in turn, connected outside the B Box to the A.C. line 602. The movable end of the sweep arm has an initial off position, and ten successive peripheral contacts 820, 821, 822, 823, 824, 825, 826, 827, 828 and 829. The forward movement of the sweep arm 817, from its initial off position to the successive peripheral contacts, is activated by the solenoid 831. The solenoid 832 returns the sweep arm 817 to its initial off position when the sweep arm contacts one of the peripheral contacts which is alive.

The circuits of both FIGURE 34 and FIGURE 35 include the control relay 830. One terminal of the detector side of the control relay 830 is connected to line 773, while the other terminal of its detector side is connected by line 833 to the connector plug 834. As will be described below, the connector plug 834 is connected to the switches of FIGURE 34, or the rotary switch of FIGURE 35, which control the periodicity with which an increasement of toner is fed to the toner mix. One of the output terminals of the relay 830 is connected by the line 835 to the connector plug 836 of Box B. The connector plug 836 is, in turn, connected by line 815 to the solenoid 524. The other output terminal of the relay 830 is connected by the line 818 to the terminal plug 604 of Box B. The relay 830 is normally open. When current is supplied to its detector side, by the action of the stepping switch 770, the circuit through lines 818 and 815 to the solenoid 524 is closed and the solenoid energized.

Referring specifically to FIGURE 34, it will be seen that the connector plug 695 of Box A is connected by line 856 to one terminal of the switch 529, the other terminal of which is connected by line 857 to the connector plug 858 of Box B. The connector plug 858 is connected inside the B Box by line 859 to one terminal of the solenoid 832 of the stepping switch 770. The other terminal of the solenoid 832 is connected to the line 773. The connector plug 762 of Box A is connected by the line 837 to the connector plug 838 of Box B. The connector plug 838 is, in turn, connected by the line 839 to the solenoid 831. The other terminal of the solenoid 831 is connected to the line 773.

Alternating peripheral contacts of the stepping switch 770 are connected to connecting plugs of Box B. Contact 821 is connected by line 840 to connector plug 841 which is, in turn, connected on the outside of Box B by line 842 to one terminal of switch 59. Contact 823 is connected by line 843 to connector plug 844 which is, in turn, connected by line 845 to one terminal of the switch 60. Contact 825 is connected by line 846 to connector plug 847 which is, in turn, connected by line 848 to one terminal of the switch 61. Contact 827 is connected by line 849 to the connector plug 850 which is, in turn, connected by line 851 to one terminal of the switch 62. Contact 829 is connected by line 852 to conector plug 853 which is, in turn, connected by line 854 to one terminal of the switch 63. The second terminal of each of the switches 59, 60, 61, 62, 63 are connected through the line 855 to the connector plug 834 of Box B. As pointed out hereinbefore with reference to FIGURE 5, the switches 59, 60, 61, 62, 63 are located on Control Panel A of the apparatus. The closing of any one of the switches 59, 60, 61, 62, 63 completes the electrical circuit from its respective contact 821, 823, 825, 827, 829, as the case may be, and the detector side of the relay 830.

Referring specifically to FIGURE 35, it will be seen that the connector plug 695 of Box A is connected by line 860 to the connector plug 861 of Box B. The connector plug 861 is connected within Box B by line 862 to a terminal of the time delay 863. The other terminal of the time delay 863 is connected by line 864 to a terminal of the solenoid 832. The time delay 863 functions to retard the return of the sweep arm 817 of the stepping switch 770, after it has reached a live peripheral contact. Such a time delay can be readily included in the electrical circuits illustrated by FIGURE 34, as can be readily seen from a comparison of FIGURES 34 and 35.

The connector plug 762 of Box A is connected by the line 865 to the level 866 of the two-level, multi-contact switch designated generally by the numeral 867. The two levels 866 and 868 of the switch 867 have sweep arms 869 and 870, respectively, which are carried by a shaft 871 which is provided with a knob for the convenient manual adjustment of the position of the sweep arms 869 and 870. Each of the levels of the switch 867 has an "off" position and a series of ten peripheral contacts on which the end of the sweep arm of that level may be positioned by manual adjustment of the position of the shaft 871. The sweep arms 869 and 870 move in synchronism, and are always in the same relative positions with respect to their peripheral contacts.

The peripheral contacts of the level 866 of the switch 867 are electrically connected in series, and to the line 865. The sweep arm 869 is connected by the line 872 to the connector plug 874 of B Box. The connector plug 874 is, in turn, connected by line 873 to the solenoid 831 of the stepping switch 770. Thus, the level 866 serves to open the circuit between lines 865 and 871 when its sweep arm 869, and the sweep arm 870 of level 868, are in the "off" position, and to close that circuit when its sweep arm 869 is in contact with any of its ten peripheral contacts.

The peripheral contacts of the stepping switch 770 are each connected to the corresponding contact of the level 868 of rotary switch 867, through a connector plug of Box B. Thus, contact 875 is connected by line 877 to connector plug 878 of Box B which is, in turn, connected by line 879 to contact 820 of the stepping switch 770. Contact 880 is connected by line 881 to connector plug 882 which is, in turn, connected by line 883 to contact 821. Contact 884 is connected by line 885 to connector plug 886 which is, in turn, connected by line 887 to contact 822. Contact 888 is connected by line 889 to connector plug 890 which is, in turn, connected by line 891 to contact 823. Contact 892 is connected by line 893 to connector plug 894 which is, in turn, connected by line 895 to contact 824. Contact 896 is connected by line 897 to connector plug 898 which is, in turn, connected by line 899 to contact 825. Contact 900 is connected by line 901 to connector plug 902 which is, in turn, connected by line 903 to contact 826. Contact 904 is connected by line 905 to connector plug 906 which is, in turn, connected by line 907 to contact 827. Contact 908 is connected by line 909 to connector plug 910 which is, in turn, connected by line 911 to contact 828. Contact 829 is connected by line 916 to connector plug 834.

Still referring to FIGURE 35, it will be seen from the foregoing that when the shaft 871 of the switch 867 is adjusted to place its sweep arm 870 on any one of the peripheral contacts of its level 868, and the sweep arm 869 on the corresponding contact of its level 866, the electrical circuit between the line 865 and the detector side of control relay 830 is broken only by the stepping switch 770. This circuit is closed when the sweep arm 817 of the stepping switch is brought to the peripheral contact which corresponds to that pre-set on the switch 867. For example, upon setting the sweep arm 870 of level 868 of switch 867, on its contact 912 the sweep arm 869 is set on the corresponding contact of level 866, leaving the stepping switch as the only break in the circuit from line 865 to the detector side of the relay 830. When the sweep arm 817 of the stepping switch reaches its contact 829, this circuit is closed.

In utilizing the embodiment of the electrical circuits of B Box illustrated by FIGURE 35, the rotary switch 867 is located on Control Panel A, replacing the switches 58, 59, 60, 61, 62, 63 illustrated by FIGURE 5, while making no other changes in the components of that panel as illustrated by the figure.

In the foregoing description of the electrical components and circuits of the apparatus in accordance with this invention, reference has been made to a plurality of connector plugs of A Box, and of each of the two forms of the B Box, as separate and distinct units. These plugs can be individual units. However, as a matter of convenience, it is desirable to combine the plugs of the A Box and of the B Box, respectively, into multiple-type plugs which permit the disconnection of all circuits of the particular box involved by merely separating the two elements of one multiple plug instead of disconnecting a number of single-type plugs.

As will be appreciated from the foregoing description of the electrical components and circuits of this apparatus, they provide important advantages of convenience in the routine operation of the apparatus, in the location of the source of any malfunction of the electrical components, and in their repair or replacement. All components which require manipulation or adjustment by the operator of the apparatus, are located in the Control Panels A and B of the apparatus. The fuses of the apparatus are located in Control Panel B. As noted hereinbefore, the Control Panels A and B are conveniently located on the top of the apparatus.

The A Box illustrated by FIGURE 33, and the B Box illustrated by FIGURES 34 and 35, are advantageous features of the electrical circuits of this apparatus. These boxes are self-contained units which carry the electrical components which control the automatic operation of the apparatus. The boxes are readily accessible behind doors 90 and 91 of the cabinet, and are connected to the remainder of the electrical circuit of the apparatus by multiple-prong connectors, which are readily disengaged to permit their removal from the apparatus. Either of these boxes can be removed from the apparatus in a matter of minutes and replaced with a duplicate unit. This is an advantageous feature of the apparatus, since the components carried by these boxes are inherently delicate and are essential to the operation of the apparatus.

THE OPERATION OF THE ELECTRICAL SUPPLY AND CONTROL SYSTEM ILLUSTRATED BY FIGURES 31, 32, 33, 34 AND 35

The first step in the operation of the apparatus in accordance with this invention is to turn on the main power switch 52, shown by FIGURE 31. This provides electrical power for the control, lighting and fusing circuits, as well as supplies power to the connector plugs 576, 577 of A Box and the connector plugs 604, 774 of B Box. The switches 66 and 86 are then turned on to start the motor 390 which drives the second and third sections of the conveyor system, the motor 399 which drives the delivery rolls, and motor 584 which drives the blower of the fuser unit 300. The closing of these switches starts the fuser unit and the circulation of its cooling air by the action of the blower 560. It also starts the second and third sections of the conveyor system. The closing of these switches also supplies 220 volt A.C. current to the lamp converter unit 585, to cause it to supply low-voltage current to the lamps 128, 128 of the optical system, to cause them to glow at a low level of illumination. These units of the apparatus are in continuous operation during the use of the apparatus. The corona discharge switch 85 is also closed to render the corona discharge unit 270 ready for automatic operation. The closing of the switches 52, 66, 85 and 86 readies the apparatus for automatic operation.

The pressing of the starting switch 54, shown by FIGURE 33, starts the automatic operation of this apparatus for a single cycle required to produce one completed copy, since this switch releases itself and opens its circuit as soon as pressure is released from its outer face. The pressing of the continuous operation switch 56, shown by FIGURE 32, on the other hand, causes the apparatus to start a continuous cycle of operations for the multiple production of copies, which is continued until the face of the switch is again pressed to cause it to open.

Referring specifically to FIGURES 33 and 32, the closing of the switch 54 or 56 causes the shaft 654 of the stepping switch 650 to rotate to cause the sweep arm 655 to move to contact point 661, to cause the sweep arm 656 to move to contact point 671, and to cause sweep arm 657 to move to contact point 681, provided that the limit switch 212 is maintained in a closed position, by the copy-receiving plate 99 of the copy sheet magazine being in its operable position. This movement of the shaft energizes the relays 736 and 740, provided that the control relay 736 starts the electric motor 605 of the vacuum pump 195, while the control relay 740 closes the solenoid air valve 196 to permit air to be supplied through tube 194 to the air cylinder 190, FIGURE 14. At the same time, vacuum is being pulled on the vacuum platen 165, saucing air to flow into the orifices in its lower surface. The air cylinder causes the carrier plate 101 to rise, placing a photoelectrostatic copy sheet against the vacuum platen 165.

The closing of the solenoid switch 200, by the vacuum created in the vacuum tube 199, causes the shaft 654 of the stepping switch 650 to rotate, causing the sweep arm 655 to move to contact point 662, to cause the sweep arm 656 to move to contact point 672, and to cause sweep arm 657 to move to contact point 682. The relay 736 continues to be energized, continuing the operation of the vacuum pump 195, while the relay 740 is de-energized, causing the solenoid valve 196 to return to its normally-open position. The opening of the solenoid valve 196 permits air to escape from the air cylinder 190, permitting the carrier plate 101 to drop under its own weight to its original position of rest. As the carrier plate 101 drops to its original position of rest, it closes the limit switch 210.

The closing of the limit switch 210 activates the stepping switch 650, causing the sweep arm 655 to move to contact point 663, and causing the sweep arm 656 to move to contact point 673, and causing the sweep arm 657 to move to contact point 683. The control relay 736 continues to be energized, continuing the operation of the vacuum pump 195, and control relay 743 is energized by this action of the stepping switch. Energizing control relay 743 starts the transport motor 246 to move the vacuum platen from its initial position of rest, to carry the photoelectrostatic copy sheet over the corona discharge unit 270 and into the optical image plane of the apparatus. Energizing control relay 743 also puts the corona discharge unit into operation when the switch 85 is closed, to charge the surface of the photoelectrostatic sheet as it passes over the unit.

Still referring both to FIGURES 33 and 32, the vacuum platen carrier plate 222 trips the limit switch 258 when it reaches the optical image plane of the apparatus, which activates the stepping switch 650, causing the sweep arm 655 to move to contact point 664, causing the sweep arm 656 to move to contact point 674, and causing the sweep arm 657 to move to contact point 684. The control relay continues to be energized, keeping the vacuum pump 195 in operation. The control relay 743 is de-energized, causing it to open and break the electrical supply to the corona discharge unit 270, thereby turning off the corona discharge. The control relay 747 is energized and activates the timer 68, causing it to close switch 630, which causes the lamp converter 585 to supply full voltage to the lamps 128, 128, and opens the shutter 628 of the lens system. These actions start the exposure of the photoelectrostatic sheet to an optical image. This exposure is continued for a period of time determined by the timer, as pre-set by the operator of the apparatus. The exposure is stopped by the action of the timer motor 636 opening the switch 638 of the timer and, simultaneously, closing the switch 639.

At the end of the pre-set period of time, the closing of the switch 639 completes the circuit to contact point 664, activating the stepping switch 650 to cause the sweep arm 655 to move to contact point 665, to cause the sweep arm 656 to move to contact point 675, and to cause sweep arm 657 to move to contact point 685. The control relay 736 continues to be energized, keeping the vacuum pump 195 in operation, and the control relay 750 is energized. The control relay 750 resumes the operation of the transport motor 246 to return the vacuum platen 165 to its backwardly position and, at the same time, starts the cam motor 260 to cause the shift arm 264 to move outwardly to bear on the shift roller 265, forcing the vacuum platen 165 to move to its laterally-shifted position as it is moved backwardly by the transport motor 246. The cam motor 260 continues in operation until the shift arm 264 reaches its extended position and the limit switch 267 is tripped by the cam 266, stopping the operation of the cam motor 260, leaving the shift arm 264 in its extended position. This tripping of the switch 267 causes it to complete the circuit from the cam motor to the output terminal of the control relay 756.

Upon reaching its backwardly position, the vacuum platen is shifted laterally by the action of the shift arm 264, and closes the limit switch 257 by contact with the vacuum platen carrier plate 222. The closing of the limit switch 257 activates the stepping switch 650 and causes the sweep arm 655 to move to contact point 666, the sweep arm 656 to move to contact point 676, and the sweep arm 657 to move to contact point 686. This action by the stepping switch 650 de-energizes the relay 736, stopping the vacuum pump motor 605. The relay 750 is de-energized, stopping the transport motor 246. The relay 729 is energized, causing it to close and, thereby, to operate the solenoid 347 which releases the gripper and starts the time delay 723.

The closing of the contacts of the time delay also activates the stepping switch 650 and causes the sweep arm 655 to move to contact point 667, the sweep arm 656 to move to contact point 677, and the sweep arm 657 to move to contact point 687. This action by the stepping switch 650 de-energizes control relay 729 and energizes control relay 756. De-energizing control relay 729 de-energizes the solenoid 347, with the gripper cam arms 348, 348 in their uncocked position, ready to be cocked by contact with the other gripper of the first section of the conveyor system. This relay 756 is normally closed and, when closed, applies a D.C. voltage to the brake 314 of the electric motor 313, from the brake unit 772 shown by FIGURES 34 and 35. When the relay 756 is energized, this voltage is shut off and the electric motor 313 is started to operate the first section of the conveyor system of the apparatus. This relay 756 starts the cam motor 260 to cause it to permit the shift arm 264 to return to its retracted position. The retraction of the shift arm 264 which has been holding the vacuum platen 165 in its laterally-displaced position, permits the platen to be returned to its initial operating position, by the action of the spring 244 on its axle 220 illustrated by FIGURE 16.

Referring to FIGURES 32, 34 and 35, it will be seen that the opening of the control relay 756 also closes the circuit to the bias supply unit 806, and readies that unit to supply a bias current to the toner unit 110 at any time that the bias shoe 530 or bias shoe 531, or both, are grounded by the operation of their associated limit switches, to which reference has been made in the description of FIGURE 20 hereinbefore.

Referring to FIGURE 20 and, more particularly, to FIGURES 34 and 35, it will be seen that the closing of the normally-open limit switch 357 by contact with one of the two lugs carried by a chain 301 of the first section of the conveyor system, causes the normally-open control relay to close momentarily, completing circuit of the bias shoe 530 to ground. This bias shoe 530 remains grounded with bias current flowing from the adjacent toner roll 423 to the shoe, until the same lug on the transport chain 301 contacts the normally-closed limit switch 359 which has kept the relay 781 closed, causing it to open, thereby, de-energizing the relay 781 and opening the circuit between the bias shoe 530 and ground.

The tripping arm of the switch 357 and the two lugs on the transport chain 301, are precisely positioned with respect to each other and with respect to the positions of the grippers 309 and 310, one end of each of which is carried by the chain 301 carrying the lugs, to cause the bias shoe 530 to become grounded at the moment that the leading edge of the electrostatic image on a photoelectrostatic copy sheet is brought under the bias shoe. The tripping arm of switch 359 and the two lugs on the transport chain 301, are precisely positioned with respect to the positions of the grippers 309 and 310, to cause the bias shoe 530 to be disconnected from ground at the moment that the trailing edge of the copy sheet passes from under the bias shoe.

The ground connection of the bias shoe 531 is established by the contact of a lug on the transport chain 301 with the limit switch 358, through the operation of the relay 792 in exactly the same manner described above in connection with the bias shoe 530, the switch 357 and the relay 781. Further, the ground connection of the bias shoe 531 is broken by the action of the switch 360 and of the relay 792, in exactly the same manner as described above in connection with the bias shoe 530, the switch 359 and the relay 781.

The positions of the switches 358 and 360, the positions of the lugs on chain 301, and the positions of the grippers 309 and 310 on chain 301 relative to the position of the bias shoe 531, are exactly the same as those of the switches 357 and 359 relative to the position of the bias shoe 530, the lugs on the chain 301, and those of the grippers 309 and 310 on the chain 301 which have been described in the foregoing.

As can best be seen by reference to FIGURE 28, the bias shoes 530 and 531 are spaced apart along the line of travel of the grippers 309 and 310. The switches 357 and 358, and the switches 359 and 360 are, respectively, spaced apart along the line of travel of the chain 301 by the same distance as the bias shoes 530 and 531 are spaced apart. The spacing between switches 357, 359 and between switches 358, 360, respectively, are identical. This spacing is the same as the length of the latent electrostatic image which is toned by the toner unit 110, in the direction of its forward travel along the conveyor system of the apparatus.

Referring again to FIGURE 33, the closing of the limit switch 356 by the movement of the chain 301 of the first section of the conveyor system, activates the stepping switch 650 and causes the sweep arm 655 to move to contact point 668 and back to the initial contact 660. The sweep arm 656 moves to contact point 678 and back to contact point 670. The sweep arm 657 moves to contact point 688 and back to contact point 680. This places the stepping switch in its initial position. If the circuit to contact point 660 has been left closed by an initial closing of the switch 56, the stepping switch repeats the foregoing sequence of steps. On the other hand, if this circuit has only been momentarily closed by pressing the switch 54, the operation of the stepping switch 650 stops until the circuit to its contact point 660 is again closed.

It is to be noted that in this last of the sequence of movements of the stepping switch 650, that the sweep arm 657 contacts point 688 which is connected by line 763 to the connector plug 762 of A Box. When the switches of B Box are closed for the automatic replenishment of toner to the toner mix of unit 110, an electrical pulse is transmitted to the connector plug 762 by the closing of the circuit with contact point 688. This pulse is transmitted to the stepping switch 770 of B Box, illustrated by FIGURES 34 and 35. Each pulse so transmitted to the stepping switch 770 is at the end of one complete cycle of operation of the apparatus by which a photoelectrostatic copy is produced.

Referring specifically to FIGURES 34 and 35, each electrical pulse transmitted from the connector plug 762 of A Box to the stepping switch 770 of B Box causes its solenoid 831 to move its sweep arm forwardly from one of the peripheral contacts to the next, until it has contacted a peripheral contact which is electrically alive, at which point the sweep arm is returned to its initial "off" position by the action of its solenoid 832. The next electrical pulse received by the switch moves its sweep arm to contact 820, starting the cycle over again.

Referring specifically to FIGURE 34, the automatic replenishment of toner by the electrical circuits illustrated by that figure, is started by the closing of the switch 58 and one of the switches 59, 60, 61, 62 or 63 on Control Panel A illustrated by FIGURE 5. As already noted, the closing of switch 59 causes the addition of an increasement of toner after the production of each fourth successive copy; the switch 60 causes the addition of an increasement of toner after the production of each eighth copy; the switch 61 causes the addition of an increasement of toner after the production of each twelfth copy; the switch 62 causes the addition of an increasement of toner after the production of each sixteenth copy, and the closing of switch 63 causes the addition of an increasement of toner after the production of each twentieth copy.

When the sweep arm 817 of the stepping switch reaches its peripheral terminal which is connected to the particular one of the switches 59, 60, 61, 62 or 63 which has been closed, the electrical circuit is completed to the control relay 830 which activates the solenoid 524, causing it to make one forwardly movement of the toner replenishment roll 426 of the toner unit 110. Two such forwardly movements of the toner replenishment roll 426 are required for it to feed one increasement of toner to the toner mix, so it is necessary for the stepping switch 770 to complete two cycles before an increasement of toner is fed.

Still referring to FIGURE 34, toner may be replenished on a non-automatic basis by the manual closing and opening of the switch 64–65, i.e. the alternative operation of the switches 64 and 65 of Control Panel A, as illustrated by FIGURE 5. In such manual operation of the toner replenishment mechanism, the switch 58 is left open, as are all of the switches 59, 60, 61, 62 and 63.

The operation of the circuits illustrated by FIGURE 35 for manual replenishment of toner by the operation of the switch 64–65, is identical with that described in connection with FIGURE 35. The operation of the rotary switch 867 is basically similar to that of the multiple switches 59, 60, 61, 62 and 63 described with reference to FIGURE 34.

The automatic replenishment of toner by the operation of the electrical circuit illustrated by FIGURE 35 is started by the rotation of the shaft 871 of the switch 867 to contact the sweep arm 870, with the peripheral terminal of level 868 which corresponds to the desired rate of toner replenishment. The terminal 875 causes the addition of an increasement of toner after the production of every second copy; the terminal 880 causes the addition of toner after the production of every fourth copy; the terminal 884 causes the addition of toner after the production of every sixth copy; the terminal 888 causes the addition of toner after the production of every eighth copy; the terminal 892 causes the addition of toner after the production of every tenth copy; the terminal 896 causes the addition of toner after the production of every twelfth copy; the terminal 900 causes the addition of toner after the production of every fourteenth copy; the terminal 904 causes the addition of toner after the production of every eighteenth copy, and the terminal 912 causes the addition of toner after the production of every twentieth copy. As in the case of the circuits illustrated by FIGURE 34, the stepping switch 770 must reach its corresponding terminal twice to feed an increasement of toner, since the solenoid 524 must be energized twice to feed one increasement of toner.

Referring specifically to FIGURE 35, it will be seen that when the sweep arm 870 is set on the terminal which corresponds to the desired rate of toner replenishment, that the sweep arm 869 closes the electrical circuit from the connector plug 762 of A Box to the stepping switch 770 of B Box. When the stepping switch 770 has received the number of electrical pulses from A Box which corresponds to the setting of the sweep arm 870 of switch 867, the electrical circuit to the relay 830 is completed. The relay 830 energizes the solenoid 524 of the toner unit 110, which causes the toner feed roll to move through a small arc. Two such movements transfer an increasement of toner from the compartment 111 to the compartment 421 of the toner unit 110. The time delay 836 then causes the solenoid 832 of the stepping switch 770 to return its sweep arm 817 to its initial "off" position, placing it in readiness to resume its cycle of operation.

ALTERNATIVE EMBODIMENTS OF THE APPARATUS

The capability of the embodiments of this apparatus described in detail in the foregoing for the production of copies which are either reduced or enlarged from the size of the original, makes the apparatus quite versatile in use. Such versatility is advantageous for general-purpose use. However, for some purposes such versatility is unnecessary. For example, in many engineering operations drawings are made on sheets of a standardized size for convenience in filing. Sheets measuring twenty-four inches by thirty-six inches, or twenty-two inches by thirty-four inches in size are widely used for this purpose. Such relatively-large sheets are inconvenient to use and it is desirable to reduce the size of the copies of the drawing by a standardized reduction. Thus, a drawing measuring twenty-four inches by thirty-six inches in size usually can be reduced to the convenient size of twelve inches by eighteen inches and still be entirely legible.

Embodiments of this apparatus which produce copies which have a fixed reduction or enlargement from the size of the original, or which produce copies the same size as the original, are simpler than the more versatile embodiments described hereinbefore and, hence, are cheaper to manufacture.

Referring again to FIGURE 13, such embodiments of this apparatus do not require the hand-wheel 48 and the associated mechanism for raising and lowering the copyboard 125. This eliminates the hand-wheel 48, the shaft 153, the beveled gears 152 and 149, the shaft 147, the sprocket 148, the chain 150, the sprockets 151, 145, 146 and the fourth sprocket on the supporting shaft which cannot be seen in the drawing. Fixed supports can be substituted for the screws 136, 137, 138 and the fourth screw which cannot be seen in the drawing.

Further, the embodiments for the fixed reduction or enlargement of the size of the copy do not require the hand-wheel 49 and the associated mechanism for raising and lowering the lens plate 156. This eliminates the requirement for the hand-wheel 49, the shaft 166, the beveled gears 166 and 168, the shaft 169, the chain 171, the sprockets 161, 170, 172, 173 and makes possible the use of a fixed support for the lens plate 156.

Again, these embodiments of the invention do not require a visual indicator for the position of of the copyboard and for the position of the lens, such as the indicator 50 and the indicator 51 illustrated by FIGURE 5, nor the alternative form of indicators illustrated by FIGURES 10 and 11, consisting of the scales 121 and 123 and the pointers 122 and 124.

In another alternative embodiment of this apparatus intended for the production of copies which are either reduced or enlarged, a liquid toning system may be employed instead of a powdered, solid toning system. Liquid toners for the development of electrostatic images comprise a dispersion of a pigment and a binder in a volatile liquid having a high-dielectric strength. The dispersed particles may carry either a positive or a negative electrical charge, depending upon their chemical compositions. The high dielectric strength of the volatile liquid of the liquid toner preserves the electrostatic image and permits the deposition of the dispersed particles thereon to form a permanent, visible image. Liquid toners are described and exemplified by U.S. Patent No. 2,907,674, issued October 6, 1959 to Metcalfe and Wright. As in the case of the powdered, solid toners, the development of the electrostatic image may be either positive or negative.

In such an alternative embodiment of this apparatus, a toner unit adapted for liquid toning is substituted for the toner unit 110, illustrated by FIGURES 20, 26 and 27. Several forms of such units known to the art are suitable for this purpose. The bias shoes 530 and 531 and the vibrator 331 are eliminated from the apparatus. The application of bias current during the liquid toning is desirable. A toner unit which applies a bias voltage and which is preferred for use in this embodiment of the apparatus is described and claimed by U.S. patent application Serial No. 225,476, filed September 24, 1962 by Johan F. Dirks et al.

In this alternative embodiment of the apparatus, the fuser unit illustrated by FIGURES 20 and 29 and its associated electrical circuits are also eliminated, since the fusing step is not used in liquid toning. This eliminates the fuser unit 300 illustrated by FIGURES 20 and 29, as well as the fuser switch 56 and its associated pilot light 57 illustrated by FIGURE 5.

In still another alternative embodiment of this apparatus intended for a fixed reduction, a fixed enlargement or which produces copies the same size as the original, and which utilizes liquid toning instead of dry toning with a powdered, solid toner, eliminate from the form of the apparatus described in detail in the foregoing all of the parts which are utilized in changing the ratio of the size of the reproduced copy to the size of the original, mentioned in the foregoing description of such alternative embodiments which utilize dry toning. In addition, they involve the substitution of a toner unit adapted for liquid toning for the toner unit 110, and the elimination of the fuser unit 300 and its associated electrical equipment as described by the foregoing.

The embodiment of this invention which has been described in detail in this specification, is designed to reproduce images carried on opaque backgrounds by the use of light reflected from the image-bearing surface. An alternative form of the apparatus is designed to reproduce images carried by trasparent, or translucent sheets by the use of transmitted light. In this form of the apparatus, the electric lamps 128, 128 are located above the transparent sheet 126 of the copyboard 125 and, as in the case of the embodiment of the invention utilizing reflected light, the lamps are arranged to provide illumination at the surface of the transparent sheet 126, which increases in intensity from a point directly above the optical axis of the lens system 135 to the periphery of the copy-receiving surface provided by sheet 126 which, upon transmission to the vertical image plane of the apparatus, uniformly illuminates the entire image plane. This alternative embodiment of the apparatus may, like that specifically described hereinbefore, have an adjustable copyboard and lens system to permit changes in the ratio of the size of the reproduced copy to that of the original, or it may have the copyboard and the lens system in fixed position to give a fixed ratio of size of the reproduced copy to that of the original. Again, this alternative embodiment of the apparatus may include a liquid toning unit instead of the dry toning unit 110, with the elimination of the fuser unit 300.

In still another alternative form of this apparatus, the copyboard 125 and its associated parts, and the lens system 135 of the apparatus may be eliminated and replaced with a microfilm enlargement head. In this alternative form of the apparatus, an enlargement head provided with an electrically-operated shutter is used, and its shutter connected into the electrical system of the apparatus in the same manner as the shutter 628. In this embodiment of the apparatus, the positions of the microfilm carrier and the optical system of the microfilm head, may be fixed to produce a fixed enlargement of the frames of the microfilm. For example, these positions may be fixed to utilize a copy sheet eight and one-half inches by eleven inches. Again, these positions may be adjustable to permit the production of copies of the microfilm frames of different sizes. In addition to this adjustability, the microfilm head may be provided with an interchangeable lens to give greater latitude in the size of the reproduced copy of the microfilm frame.

Still another variant of this apparatus may be provided with a copyboard 125 which is hinged to permit it to be swung from its normal position above the lens system 135, the lens system 135 made readily removable and replaceable, and its electrical connection provided with a suitable switch or connector plug; and the apparatus provided with a microfilm head which can be readily fixed in operating position when the copyboard 125 is swung out of its normal operating position, and which has a suitable connecting plug or switch to connect and disconnect its electrically-operated shutter into the electrical system of the apparatus. This variant of the apparatus is capable of reproducing copy in the same manner as the embodiments of the apparatus which have been described in detail with reference to the drawings and, in addition, making enlarged reproductions of microfilm frames.

In this specification, many details and specific illustrations have been given and numerous alternative embodiments of the apparatus described. It will be readily apparent to those skilled in the art, that many variations can be made in the details of the apparatus without departing from the spirit of the invention or the scope of the claims which follow.

We claim:

1. Apparatus adapted for the reproduction of images on electrically-conductive sheets carrying a photoelectrostatic coating which comprises in combination;

a horizontal, transparent, original copy-receiving surface;

an optical system which transmits an image of an original copy, positioned face downwardly on the said copy-receiving surface, to a vertical image plane, at a level below the said original copy-receiving surface, and includes an electrically-operated shutter;

a plurality of light sources which illuminate the said copy-receiving surface from beneath without obstructing the light path of the optical system, from the said original copy-receiving surface to the vertical image plane;

a corona discharge unit adapted to provide a corona discharge in an upwardly direction;

a source of high-potential voltage for the said corona discharge unit;

a vacuum platen;

a source of vacuum connected to the said vacuum platen by a conduit;

a magazine adapted to hold a stack of photoelectrostatic copy sheets and to deliver individual sheets to the said vacuum platen;

a transport means adapted to move the said vacuum platen from the position above the said magazine in which it receives a sheet from the said magazine, along a horizontal path which passes above the said corona discharge unit while the lower surface of the said platen is in a horizontal plane, and into a vertical plane which places the surface of a sheet carried thereby in the said vertical image plane, to return the said platen to a laterally-displaced position above the said magazine and, finally, to its original position above the said magazine;

a magnetic toning unit;

a fuser unit;

a delivery station adjacent the said original copy-receiving surface;

a conveyor system which has an upwardly-curved path of travel which is at right angles to the horizontal path of travel of the first transport means, which carries at least one means for taking a sheet from the said vacuum platen while it is in its displaced position, and is adapted to carry the sheet to bring its surface into contact with the said toning means, then adjacent the said fusing unit and, finally, delivering the sheet to the said delivery station;

and an electrical system which operates the said magazine, the transport means, the corona discharge unit, the light sources which illuminate the copy-receiving surface, the shutter of the lens system, the conveyor system, the magnetic toning unit and the fuser unit.

2. Apparatus adapted for the reproduction of images on electrically-conductive sheets carrying a photoelectrostatic coating, which is adjustable to make reproduced copies the same size as the original copy, smaller than the original copy, or larger than the original copy, which comprises in combination;

a horizontal, transparent, copy-receiving surface which is adjustable as to its position along a vertical axis;

an optical system which transmits an image of an original copy, positioned face downwardly on the said copy-receiving surface, to a vertical image plane, at a level below the said original copy-receiving surface, which includes a lens having its optical axis positioned vertically, an electrically-operated shutter, a mirror located below the lens and positioned at an angle of forty-five degrees to the vertical axis of the lens, and a means for adjusting the position of the lens along a vertical axis;

a plurality of light sources which illuminate the said copy-receiving surface from beneath, without obstructing the light path of the optical system from the said original copy-receiving surface to the vertical image plane, and which are attached to the said copy-receiving surface to bear a fixed relationship to that surface in any position to which it can be adjusted;

a corona discharge unit adapted to provide a corona discharge in an upwardly direction;

a source of high-potential voltage for the said corona discharge unit;

a vacuum platen;

a source of vacuum connected to the said vacuum platen by a conduit;

a magazine adapted to hold a stack of photoelectrostatic copy sheets and to deliver individual sheets to the said vacuum platen;

a transport means adapted to move the said vacuum platen from the position above the said magazine in which it receives a sheet from the said magazine, along a horizontal path which passes above the said corona discharge unit while the lower surface of the said platen is in a horizontal plane, and into a vertical plane which places the surface of a sheet carried thereby in the said vertical image plane, to return the said platen to a laterally-displaced position above the said magazine and, finally, to its original position above the said magazine;

a magnetic toning unit;

a fuser unit;

a delivery station adjacent the said original copy-receiving surface;

a conveyor system which has an upwardly-curved path of travel which is at right angles to the horizontal path of travel of the first transport means, which carries at least one means for taking a sheet from the said vacuum platen while it is in its displaced position, and is adapted to carry the sheet to bring its surface into contact with the said toning means, then adjacent the said fusing unit and, finally, delivering the sheet to the said delivery station;

and an electrical system which operates the said magazine, the transport means, the corona discharge unit, the light sources which illuminate the copy-receiving surface, the shutter of the lens system, the conveyor system, the magnetic toning unit and the fuser unit.

3. Apparatus adapted for the reproduction of images on electrically-conductive sheets carrying a photoelectrostatic coating, which makes reproduced copies of original copy of a size having a relationship to the size of the original copy fixed by the characteristics of the apparatus, which comprises in combination;

a horizontal, transparent, copy-receiving surface which is fixed as to its position along a vertical axis;

an optical system which transmits an image of an original copy, positioned face downwardly on the said copy-receiving surface, to a vertical image plane, which includes a lens having its optical axis positioned vertically, an electrically-operated shutter, and a mirror located below the lens and positioned at an angle of forty-five degrees to the vertical axis of the lens, the said lens being located in a fixed position on a vertical axis betwen the said copyboard and the said mirror, which causes the optical system to transmit a clear optical image to the optical image plane of the apparatus;

a plurality of light sources which illuminate the said copy-receiving surface from beneath, without obstructing the light path of the optical system from the said original copy-receiving surface to the vertical image plane, and which are supported to bear a fixed relationship to that surface;

a corona discharge unit adapted to provide a corona discharge in an upwardly direction;

a source of high-potential voltage for the said corona discharge unit;

a vacuum platen;

a source of vacuum connected to the said vacuum platen by a conduit;

a magazine adapted to hold a stack of photoelectrostatic copy sheets and to deliver individual sheets to the said vacuum platen;

a transport means adapted to move the said vacuum platen from the position above the said magazine in which it receives a sheet from the said magazine, along a horizontal path which passes above the said corona discharge unit while the lower surface of the said platen is in a horizontal plane, and into a vertical plane which places the surface of a sheet carried thereby in the said vertical image plane, to return the said platen to a laterally-disposed position above the said magazine and, finally, to its original position above the said magazine;

a magnetic toning unit;

a fuser unit;

a delivery station adjacent the said original copy-receiving surface;

a conveyor system which has an upwardly-curved path of travel which is at right angles to the horizontal path of travel of the first transport means, which carries at least one means for taking a sheet from the said vacuum platen while it is in its displaced position, and is adapted to carry the sheet to bring its surface into contact with the said toning means, then adjacent the said fuser unit and, finally, delivering the sheet to the said delivery station;

and an electrical system which operates the said magazine, the transport means, the corona discharge unit, the light sources which illuminate the copy-receiving surface, the shutter of the lens system, the conveyor system, the magnetic toning unit and the fuser unit.

4. Apparatus adapted for the reproduction of images on electrically-conductive sheets carrying a photoelectrostatic coating, in a self-contained unit within a laterally-elongated cabinet which comprises in combination;

a horizontal, rectangular, transparent, original copy-receiving surface which forms a part of the upper surface of the said cabinet;

an optical system which transmits an image of an original copy, positioned face downwardly on the said copy-receiving surface, to a vertical image plane, at a level below and laterally of the said original copy-receiving surface;

a plurality of light sources which illuminate the copy-receiving surface, without obstructing the light path of the optical system from the said original copy-receiving surface to the vertical image plane;

a corona discharge unit adapted to provide a corona discharge in an upwardly direction, positioned in a horizontal plane across the longest dimension of the cabinet and near the said vertical image plane;

a source of high-potential voltage for the said corona discharge unit;

a vacuum platen;

a source of vacuum connected to the said vacuum platen by a conduit;

a magazine adapted to hold a stack of photoelectrostatic sheets and to deliver individual sheets to the said vacuum platen, positioned at a low level adjacent one end of the said cabinet and below the level of the vertical image plane, and spaced away therefrom within the said cabinet;

a transport means adapted to move the said vacuum platen from the position above the said magazine in which it receives a sheet from the said magazine, along a horizontal path paralleling the length of the said cabinet toward the center of the said cabinet, which passes above the said corona discharge unit while the surface of the said platen is in a horizontal plane, and into a vertical plane which places the surface of a sheet carrier thereby in the said vertical image plane, to return the said platen to a laterally-displaced position above the said magazine and, finally, to its original position above the said magazine;

a magnetic toning unit positioned longitudinally of the said cabinet and adjacent the said magazine;

a fuser unit positioned longitudinally and near the top of the said cabinet and adjacent the said original copy-receiving surface;

a conveyor system which has an upwardly-curved path of travel laterally of the said cabinet which is at right angles to the path of travel of the first transport means, and carries a means for taking a sheet from the said vacuum platen while it is in its displaced position, and is adapted to carry the sheet to bring its surface into contact with the said toning means, then adjacent the said fuser unit and, finally, delivering the sheet to the said delivery station on the top of the said cabinet;

and an electrical system which operates the said magazine, the transport means, the corona discharge unit, the light sources which illuminate the copy-receiving surface, the conveyor system, the magnetic toning unit and the fuser unit, positioned adjacent the end of the said cabinet opposite that adjacent the said magazine.

5. Apparatus adapted for the reproduction of images on electrically-conductive sheets carrying a photoelectrostatic coating, which is adjustable to make reproduced copies the same size as the original copy, smaller than the original copy, or larger than the original copy, which comprises in combination;

a horizontal, transparent, copy-receiving surface which is adjustable as to its position along a vertical axis;

an optical system which transmits an image of an original copy, positioned face downwardly on the said copy-receiving surface, to a vertical image plane, at a level below the said original copy-receiving surface, which includes a lens having its optical axis positioned vertically, an electrically-operated shutter, a mirror located below the lens and positioned at an angle of forty-five degrees to the vertical axis of the lens, and means for adjusting the position of the lens along a vertical axis;

a plurality of light sources which illuminate the said copy-receiving surface from beneath, without obstructing the light path of the optical system from the said original copy-receiving surface to the vertical image plane, and which are attached to the said copy-receiving surface to bear a fixed relationship to that surface in any position to which it can be adjusted;

a corona discharge unit adapted to provide a corona discharge in an upwardly direction, positioned in a horizontal plane across the longest dimension of the cabinet and near the said vertical image plane;

a source of high-potential voltage for the said corona discharge unit;

a vacuum platen;

a source of vacuum connected to the said vacuum platen by a conduit;

a magazine adapted to hold a stack of photoelectrostatic sheets and to deliver individual sheets to the said vacuum platen, positioned at a low level adjacent one end of the said cabinet and below the level of the vertical image plane, and spaced away therefrom within the said cabinet;

a transport means adapted to move the said vacuum platen from the position above the said magazine in which it receives a sheet from the said magazine, along a horizontal path paralleling the length of the said cabinet toward the center of the said cabinet, which passes above the said corona discharge unit while the surface of the said platen is in a horizontal plane, and into a vertical plane which places the surface of a sheet carried thereby in the said vertical image plane, to return the said platen to a laterally-displaced position above the said magazine and, finally, to its original position above the said magazine;

a magnetic toning unit positioned longitudinally of the said cabinet and adjacent the said magazine;

a fuser unit positioned longitudinally and near the top of the said cabinet;

a delivery station on the top of the said cabinet and adjacent the said original copy-receiving surface;

a conveyor system which has an upwardly-curved path of travel laterally of the said cabinet which is at right angles to the path of travel of the said transport means, and carries a means for taking a sheet from the said vacuum platen while it is in its displaced position, and is adapted to carry the sheet to bring its surface into contact with the said toning means, then adjacent the said fuser unit and, finally, delivering the sheet to the said delivery station on the top of the said cabinet;

and an electrical system which operates the said magazine, the transport means, the corona discharge unit, the light sources which illuminate the copy-receiving surface, the conveyor system, the magnetic toning unit and the fuser unit, positioned adjacent the end of the said cabinet opposite that adjacent the said magazine.

6. Apparatus adapted for the reproduction of images on electrically-conductive sheets carrying a photoelectrostatic coating, which makes reproduced copies of original copy of a size having a relationship to the size of the original copy fixed by the characteristics of the apparatus, which comprises in combination;

a horizontal, transparent, copy-receiving surface which is fixed as to its position along a vertical axis;

an optical system which transmits an image of an original copy, positioned face downwardly on the said copy-receiving surface, to a vertical image plane, which includes a lens having its optical axis positioned vertically, an electrically-operated shutter, and a mirror located below the lens and positioned at an angle of forty-five degrees to the vertical axis of the lens, the said lens being located in a fixed position on a vertical axis between the said copyboard and the said mirror, which causes the optical system to transmit a clear optical image to the optical image plane of the apparatus;

a plurality of light sources which illuminate the said copy-receiving surface from beneath, without obstructing the light path of the optical system from the said original copy-receiving surface to the vertical image plane, and which are supported to bear a fixed relationship to that surface;

a corona discharge unit adapted to provide a corona discharge in an upwardly direction, positioned in a horizontal plane across the longest dimension of the cabinet and near the said vertical image plane;

a source of high-potential voltage for the said corona discharge unit;

a vacuum platen;

a source of vacuum connected to the said vacuum platen by a conduit;

a magazine adapted to hold a stack of photoelectrostatic sheets and to deliver individual sheets to the said vacuum platen, positioned at a low level adjacent one end of the said cabinet and below the level of the vertical image plane, and spaced away therefrom within the said cabinet;

a transport means adapted to move the said vacuum platen from the position above the said magazine in which it receives a sheet from the said magazine, along a horizontal path paralleling the length of the said cabinet toward the center of the said cabinet, which passes above the said corona discharge unit while the surface of the said platen is in a horizontal plane, and into a vertical plane which places the surface of a sheet carried thereby in the said vertical image plane, to return the said platen to a laterally-displaced position above the said magazine and, finally, to its original position above the said magazine;

a magnetic toning unit positioned longitudinally of the said cabinet and adjacent the said magazine;

a fuser unit positioned longtiudinally and near the top of the said cabinet;

a delivery station on the top of the said cabinet and adjacent the said original copy-receiving surface;

a conveyor system which has an upwardly-curved path of travel laterally of the said cabinet which is at right angles to the path of travel of the transport means, and carries a means for taking a sheet from the said vacuum platen while it is in its displaced position, and is adapted to carry the sheet to bring its surface into contact with the said toning means, than adjacent the said fuser unit and, finally, delivering the sheet to the said delivery station on the top of the said cabinet;

and an electrical system which operates the said magazine, the transport means, the corona discharge unit, the light sources which illuminate the copy-receiving surface, the conveyor system, the magnetic toning unit and the fuser unit, positioned adjacent the end of the said cabinet opposite that adjacent the said magazine.

7. Apparatus adapted for the reproduction of images on electrically-conductive sheets carrying a photoelectrostatic coating, in a self-contained unit within a laterally-elongated cabinet which comprises in combination;

a horizontal, rectangular, transparent, original copy-receiving surface which forms an upper surface of the said cabinet;

an optical system which transmits an image of an original copy, positioned face downwardly on the said copy-receiving surface, to a vertical image plane, at a level below and laterally of the said original copy-receiving surface;

a plurality of light sources which illuminate the copy-receiving surface, without obstructing the light path of the optical system from the said original copy-receiving surface to the vertical image plane;

a corona discharge unit adapted to provide a corona discharge in an upwardly direction, positioned in a horizontal plane across the longest dimension of the cabinet and near the said vertical image plane;

a source of high-potential voltage for the said corona discharge unit;

a vacuum platen;

a source of vacuum connected to the said vacuum platen by a conduit;

a magazine adapted to hold a stack of photoelectrostatic sheets and to deliver individual sheets to the said vacuum platen, positioned at a low level adjacent one end of the said cabinet and below the level of the vertical image plane, and spaced away therefrom within the said cabinet;

a transport means adapted to move the said vacuum platen from the position above the said magazine in which it receives a sheet from the said magazine, along a horizontal path paralleling the length of the said cabinet toward the center of the said cabinet, which passes above the said corona discharge unit while the surface of the said platen is in a horizontal plane, and into a vertical plane which places the surface of a sheet carried thereby in the said vertical image plane, to return the said platen to a laterally-displaced position above the said magazine and, finally, to its original position above the said magazine;

a magnetic toning unit positioned longitudinally of the said cabinet and adjacent the said magazine;

a fuser unit positioned longitudinally and near the top of the said cabinet;

a delivery station on the top of the said cabinet and adjacent the said original copy-receiving surface;

a conveyor system which consists of three sections, the first section of which is comprised of two parallel, endless chains which carry two grippers, each of which are adapted to grasp a copy sheet from the vacuum platen when the vacuum platen is in a laterally-displaced position, and to carry the sheet over and in contact with at least one magnetic toning brush, and then on an upwardly-curved path of travel, the second section of which is comprised of a plurality of endless belts which travel in a path somewhat inclined from the horizontal, which are adapted to receive a copy sheet from the first section of the system and carry it through the copy-inspection station, and the third section of which is comprised of an endless belt which is adapted to receive a copy sheet from the second section of the system, to carry it beneath the fuser unit, and to deliver the sheet to the said delivery station;

and an electrical system which operates the said magazine, the transport means, the corona discharge unit, the light sources which illuminate the copy-receiving surface, the shutter, the conveyor system, the magnetic toning unit and the fuser unit, positioned adjacent the end of the said cabinet opposite that adjacent the said magazine.

8. Apparatus adapted for the reproduction of images on electrically-conductive sheets carrying a photoelectrostatic coating, which is adjustable to make reproduced copies the same size as the original copy, smaller than the original copy, or larger than the original copy, which comprises in combination;

a horizontal, transparent, copy-receiving surface which is adjustable as to its position along a vertical axis;

an optical system which transmits an image of an original copy, positioned face downwardly on the said copy-receiving surface, to a vertical image plane, at a level below the said original copy-receiving surface, which includes a lens having its optical axis positioned vertically, an electrically-operated shutter, a mirror located below the lens and positioned at an angle of forty-five degrees to the vertical axis of the lens, and a means for adjusting the position of the lens along a vertical axis;

a plurality of light sources which illuminate the said copy-receiving surface from beneath, without obstructing the light path of the optical system from the said original copy- receiving surface to the vertical image plane, and which are attached to the said copy-receiving surface to bear a fixed relationship to that surface in any position to which it can be adjusted;

a corona discharge unit adapted to provide a corona discharge in an upwardly direction, positioned in a horizontal plane across the longest dimension of the cabinet and near the said vertical image plane;

a source of high-potential voltage for the said corona discharge unit;

a vacuum platen;

a source of vacuum connected to the said vacuum platen by a conduit;

a magazine adapted to hold a stack of photoelectrostatic sheets and to deliver individual sheets to the said vacuum platen, positioned at a low level adjacent one end of the said cabinet and below the level of the vertical image plane, and spaced away therefrom within the said cabinet;

a transport means adapted to move the said vacuum platen from the position above the said magazine in which it receives a sheet from the said magazine, along a horizontal path paralleling the length of the said cabinet toward the center of the said cabinet, which passes above the said corona discharge unit while the surface of the said platen is in a horizontal plane, and into a vertical plane which places the surface of a sheet carried thereby in the said vertical image plane, to return the said platen to a laterally-displaced position above the said magazine and, finally, to its original position above the said magazine;

a magnetic toning unit positioned longitudinally of the said cabinet and adjacent the said magazine;

a fuser unit positioned longitudinally and near the top of the said cabinet;

a delivery station on the top of the said cabinet and adjacent the said original copy-receiving surface;

a conveyor system which consists of three sections, the first section of which is comprised of two parallel, endless chains which carry two grippers, each of which are adapted to grasp a copy sheet from the vacuum platen when the vacuum platen is in a laterally-displaced position, and to carry the sheet over and in contact with at least one magnetic toning brush, and then on an upwardly-curved path of travel, the second section of which is comprised of a plurality of endless belts which travel in a path somewhat inclined from the horizontal, which is adapted to receive a copy sheet from the first section of the system and carry it through the copy-inspection station, and the third section of which is comprised of an endless belt which is adapted to receive a copy sheet from the second section of the system, to carry it beneath the fuser unit, and to deliver the sheet to the said delivery station;

and an electrical system which operates the said magazine, the transport means, the corona discharge unit, the light sources which illuminate the copy-receiving surface, the shutter, the conveyor system, the magnetic toning unit and the fuser unit, positioned adjacent the end of the said cabinet opposite that adjacent the said magazine.

9. Apparatus adapted for the reproduction of images on electrically-conductive sheets carrying a photoelectrostatic coating, which makes reproduced copies of original copy of a size having a relationship to the size of the original copy fixed by the characteristics of the apparatus, which comprises in combination;

a horizontal, transparent, copy-receiving surface which is fixed as to its position along a vertical axis;

an optical system which transmits an image of an original copy, positioned face downwardly on the said copy-receiving surface to a vertical image plane, which includes a lens having its optical axis positioned vertically, an electrically-operated shutter, and a mirror located below the lens and positioned at an angle of forty-five degrees to the vertical axis of the lens, the said lens being located in a fixed position on a vertical axis between the said copyboard and the said mirror, which causes the optical system to transmit a clear optical image to the optical image plane of the apparatus;

a plurality of light sources which illuminate the said copy-receiving surface from beneath, without obstructing the light path of the optical system from the said original copy-receiving surface to the vertical image plane, and which are supported to bear a fixed relationship to that surface;

a corona discharge unit adapted to provide a corona discharge in an upwardly direction, positioned in a horizontal plane across the longest dimension of the cabinet and near the said vertical image plane;

a source of high-potential voltage for the said corona discharge unit;

a vacuum platen;

a source of vacuum connected to the said vacuum platen by a conduit;

a magazine adapted to hold a stack of photoelectrostatic sheets and to deliver individual sheets to the said vacuum platen, positioned at a low level adjacent one end of the said cabinet and below the level of the vertical image plane, and spaced away therefrom within the said cabinet;

a transport means adapted to move the said vacuum platen from the position above the said magazine in which it receives a sheet from the said magazine, along a horizontal path paralleling the length of the said cabinet toward the center of the said cabinet, which passes above the said corona discharge unit while the surface of the said platen is in a horizontal plane, and into a vertical plane which places the surface of a sheet carried thereby in the said vertical image plane, to return the said platen to a laterally-displaced position above the said magazine and, finally, to its original position above the said magazine;

a magnetic toning unit positioned longitudinally of the said cabinet and adjacent the said magazine;

a fuser unit positioned longitudinally and near the top of the said cabinet;

a delivery station on the top of the said cabinet and adjacent the said original copy-receiving surface;

a conveyor system which consists of three sections, the first section of which is comprised of two parallel, endless chains which carry two grippers, each of which are adapted to grasp a copy sheet from the vacuum platen when the vacuum platen is in a laterally-displaced position, and to carry the sheet over and in contact with at least one magnetic toning brush, and then on an upwardly-curved path of travel, the second section of which is comprised of a plurality of endless belts which travel in a path somewhat inclined from the horizontal, which is adapted to receive a copy sheet from the first section of the system and carry it through the copy-inspection station, and the third section of which is comprised of an endless belt which is adapted to receive a copy sheet from the second section of the system and carry it beneath the fuser unit, and to deliver the sheet to the said delivery station;

and an electrical system which operates the said magazine, the transport means, the corona discharge unit, the light sources which illuminate the copy-receiving surface, the shutter, the conveyor system, the magnetic toning unit and the fuser unit, positioned adjacent the end of the said cabinet opposite that adjacent the said magazine.

10. Apparatus adapted for the reproduction of images on electrically-conductive sheets carrying a photoelectrostatic coating, in a self-contained unit within a laterally-elongated cabinet which comprises in combination;

a horizontal, transparent, original copy-receiving surface;

a cover for the said copy-receiving surface which is adapted to hold a sheet of original copy on said transparent surface and which, in a closed position, forms an upper surface of the said cabinet;

an optical system which transmits an image of an original copy, positioned face downwardly on the said copy-receiving surface, to a vertical image plane at a level below and laterally of the said copy-receiving surface, which includes an electrically operated shutter, a lens system which has its optical axis positioned vertically, and a mirror positioned below the lens system at an angle of forty-five degrees to the horizontal;

an electrical timer, electrically connected to operate the shutter of the optical system;

a plurality of electric lamps which non-uniformly illuminate the copy-receiving surface from beneath, with an intensity of the illumination which increases outwardly from the point on the copyboard directly above the axis of the lens system, to the periphery of the copyboard, in a proportion which gives uniform illumination reflected from a white surface on the copy-receiving surface at the vertical optical image plane of the apparatus;

a source of electric current connected to the said lamps, to the said shutter, and to the said timer, which supplies an electric current of relatively-low voltage to the lamps at all times that the apparatus is in operation, to keep the said lamps glowing at a low level of illumination and which, when the shutter is opened by the action of the said timer, raises the voltage of the electric lamps to bring them to a full level of illumination and opens the said shutter and, after an elapsed time measured by the timer, closes the shutter and reduces the voltage of the current supplied to the lamps to its original value;

a corona discharge unit adapted to supply a corona discharge in an upwardly direction, positioned in a horizontal plane across the longest dimension of the cabinet;

a source of high-potential current for the said corona discharge unit;

a vacuum platen having an interior chamber, and a plurality of orifices in its lower surface member through which air can be drawn into its interior chamber;

a copy sheet supply magazine adapted to hold a stack of photoelectrostatic sheets, which comprises an air cylinder, four toggle arms mechanically connected to the piston of the air cylinder, and a plate for holding a stack of photoelectrostatic copy sheets, which cooperate to raise the stack of copy sheets to bring the upper sheet of the said stack into contact with the lower surface of the said vacuum platen, when compressed air is supplied to the said cylinder;

a vacuum pump, a flexible tube connecting the vacuum side of the said pump to the interior chamber of the vacuum platen, and a tube connecting the pressure side of the said vacuum pump to the air cylinder of the said copy sheet supply magazine;

a transport means adapted to move the vacuum platen from a position above the copy sheet supply magazine, along a horizontal path paralleling the length of the said cabinet toward its center, which passes over the said corona discharge unit and then into a vertical plane, which places the surface of a sheet carried thereby in the vertical optical image plane, to return the said platen to a laterally-displaced position above the copy sheet supply magazine and, finally, to its original position;

an electrical motive system for the said transport means, and an associated electrical control system for the operation of the said motive system and the said corona discharge unit, which automatically and, successively, starts the movement of the vacuum platen as soon as the orifices in its lower surface are closed by the presence of a copy sheet thereon, turns on the high-potential current to the corona discharge unit, turns off the current to the corona discharge unit after the vacuum platen has passed over it, stops the motive system as soon as the vacuum platen has been turned into the vertical plane, opens the shutter and turns the full voltage on the lights of the optical system when the vacuum platen has been turned into the optical image plane, closes the shutter and turns down the voltage of the said lights after a period of time dictated by the said timer, resumes the operation of the motive system to return the vacuum platen along a rearwardly line of travel, causes the lateral displacement of the position of the vacuum platen and, finally, causes the return of the vacuum platen to its original position over the copy sheet supply magazine;

a magnetic toning unit positioned longitudinally of the said cabinet and adjacent the said magazine, which comprises a chamber carrying a powdered, solid, toner mixture, at least one toner brush unit comprising a cylindrical, stationary core of a non-magnetic material, a plurality of strip magnets longitudinally positioned at circumferentially-spaced intervals in the surface of the said core, and a rotatable outer shell of a non-magnetic material around the cylindrical core;

a fuser unit positioned longitudinally near the top of the said cabinet, comprising at least one longitudinally-positioned infrared heating lamp, a hollow, insulating shell above and on the sides thereof, and a blower unit for causing air to circulate through the cavity of the insulating shell;

a conveyor system which consists of three sections, the first section of which is comprised of two parallel, endless chains which carry two grippers, each of which are adapted to grasp a copy sheet from the vacuum platen when the vacuum platen is in a laterally-displaced position, and to carry the sheet over and in contact with at least one magnetic toning brush, and then on an upwardly-curved path of travel, the second section of which is comprised of a plurality of endless belts which travel in a path somewhat inclined from the horizontal, which are adapted to receive a copy sheet from the first section of the system and carry it through the copy-inspection station, and the third section of which is comprised of an endless belt which is adapted to receive a copy sheet from the second section of the system and to carry it beneath the fuser unit, and to deliver the sheet to the said delivery station;

an electrical system which operates the first section of the said conveyor system on an intermittent basis, and which stops its operation at the precise position in which a gripper is in position to receive the edge of a copy sheet from the vacuum platen, when it is in its laterally-displaced position;

an electrical system which keeps the fuser unit, its blower, and the second and third sections of the conveyor system in continuous operation at all times during the operation of the apparatus, and prevents the operation of the fuser unit without its blower and the second and third sections of the conveyor system being in operation;

and an automatic electrical control system which coordinates the sequence of operations of the said copy supply magazine, the transport means, the corona discharge unit, the shutter, and the first section of the conveyor system, to carry out, in the order named, the operations of electrostatically charging the surface of a photoelectrostatic copy sheet, exposing the charged surface to an optical image, toning the resulting electrostatic image, fusing the toned image, and delivering the completed copy to the copy-receiving station of the apparatus, in a continuous repetition of the said cycle of operations.

11. Apparatus adapted for the reproduction of images on electrically-conductive sheets carrying a photoelectrostatic coating, which is adjustable to make reproduced copies the same size as the original copy, smaller than the original copy, or larger than the original copy, which is a self-contained unit within a laterally-elongated cabinet, and which is capable of automatically carrying out the sequence of steps required for the production of a single photoelectrostatic copy, and of automatically carrying out repeated cycles of those steps, which comprises in combination:

a horizontal, transparent, copy-receiving surface which is adjustable as to its position along a vertical axis;

an optical system which transmits an image of an original copy, positioned face downwardly on the said copy-receiving surface, to a vertical image plane, at a level below the said original copy-receiving surface, which includes a lens having its optical axis positioned vertically, an electrically-operated shutter, a mirror located below the lens and positioned at an angle of forty-five degrees to the vertical axis of the lens, and a means for adjusting the position of the lens along a vertical axis;

an electric timer, electrically connected to operate the said shutter of the optical system;

a plurality of electric lamps which non-uniformly illuminate the copy-receiving surface from beneath, with an intensity of illumination which increases outwardly from the point on the copyboard directly above the axis of the lens system, to the periphery of the copyboard, in a proportion which gives uniform illumination reflected from a white surface on the copy-receiving surface at the optical image plane of the apparatus, and which are attached to the said copy-receiving surface to bear a fixed relationship to that surface in any position to which it can be adjusted;

a source of electric current connected to the said lamps, to the said shutter, and to the said timer, which supplies an electric current of relatively-low voltage to the lamps at all times that the apparatus is in operation, to keep the said lamps glowing at a low level of illumination and which, when the shutter is opened by the action of the said timer, raises the voltage of the electric lamps to bring them to a full level of illumination and opens the said shutter and, after an elapsed time measured by the timer, closes the shutter and reduces the voltage of the current supplied to the lamps to its original value;

a corona discharge unit adapted to supply a corona discharge in an upwardly direction, positioned in a horizontal plane across the longest dimension of the cabinet;

a source of high-potential current for the said corona discharge unit;

a vacuum platen having an interior chamber, and a plurality of orifices in its lower surface member through which air can be drawn into its interior chamber;

a copy sheet supply magazine adapted to hold a stack of photoelectrostatic sheets, which comprises an air cylinder, four toggle arms mechanically connected to the piston of the air cylinder, and a plate for holding a stack of photoelectrostatic copy sheets, which cooperate to raise the stack of copy sheets to bring the upper sheet of the said stack into contact with the lower surface of the said vacuum platen, when compressed air is supplied to the said cylinder;

a vacuum pump, a flexible tube connecting the vacuum side of the said pump to the interior chamber of the vacuum platen, and a tube connecting the pressure side of the said vacuum pump to the air cylinder of the said copy sheet supply magazine;

a transport means adapted to move the vacuum platen from a position above the copy sheet supply magazine, along a horizontal path paralleling the length of the said cabinet toward its center, which passes over the said corona discharge unit and then into a vertical plane, which places the surface of a sheet carried thereby in the vertical optical image plane, to return the said platen to a laterally-displaced position above the copy sheet supply magazine and, finally, to its original position;

an electrical motive system for the said transport means, and an associated electrical control system for the operation of the said motive system and the said corona discharge unit, which automatically and, successively, starts the movement of the vacuum platen as soon as the orifices in its lower surface are closed by the presence of a copy sheet thereon, turns on the high-potential current to the corona discharge unit, turns off the current to the corona discharge unit after the vacuum platen has passed over it, stops the motive system as soon as the vacuum platen has been turned into the vertical plane, opens the shutter and turns the full voltage on the lights of the optical system when the vacuum platen has been turned into the optical image plane, closes the shutter and turns down the voltage of the said lights after a period of time dictated by the said timer, resumes the operation of the motive system to return the vacuum platen along a rearwardly line of travel, causes the lateral displacement of the position of the vacuum platen and, finally, causes the return of the vacuum platen to its original position over the copy sheet supply magazine;

a magnetic toning unit positioned longitudinally of the said cabinet and adjacent the said magazine, which comprises a chamber carrying a powdered, solid, toner mixture, at least one toner brush unit comprising a cylindrical, stationary core of a non-magnetic material, a plurality of strip magnets longitudinally positioned at circumferentially-spaced intervals in the surface of said core, and a rotatable outer shell of a non-magnetic material around the cylindrical core;

a fuser unit positioned longitudinally near the top of the said cabinet, comprising at least one longitudinally-positioned, infrared heating lamp, a hollow insulating shell above and on the sides thereof, and a blower unit for causing air to circulate through the cavity of the insulating shell;

a conveyor system which consists of three sections, the first section of which is comprised of two parallel, endless chains which carry two grippers, each of which are adapted to grasp a copy sheet from the vacuum platen when the vacuum platen is in a laterally-displaced position, and to carry the sheet over and in contact with at least one magnetic toning brush, and then on an upwardly-curved path of travel, the second section of which is comprised of a plurality of endless belts which travel in a path somewhat inclined from the horizontal, which are adapted to receive a copy sheet from the first section of the system and carry it through the copy-inspection station, and the third section of which is comprised of an endless belt which is adapted to receive a copy sheet from the second section of the system, to carry it beneath the fuser unit, and to deliver the sheet to the said delivery station;

an electrical system which operates the first section of the said conveyor system on an intermittent basis, and which stops its operation at the precise position in which a gripper is in position to receive the edge of a copy sheet from the vacuum platen, when it is in its laterally-displaced position;

an electrical system which keeps the fuser unit, its blower, and the second and third sections of the conveyor system in continuous operation at all times during the operation of the apparatus, and prevents the operation of the fuser unit without its blower and the second and third sections of the conveyor system being in operation;

and an automatic electrical control system which coordinates the sequence of operations of the said copy supply magazine, the transport means, the corona discharge unit, the shutter, and the first section of the conveyor system to carry out, in the order named, the operations of electrostatically charging the surface of a photoelectrostatic copy sheet, exposing the charged surface to an optical image, toning the resulting electrostatic image, fusing the toned image, and delivering the completed copy to the copy-receiving station of the apparatus, in a continuous repetition of the cycle of operations.

12. Apparatus adapted for the reproduction of images on electrically-conductive sheets carrying a photoelectrostatic coating, which makes reproduced copies of original copy of a size having a relationship to the size of the original copy fixed by the characteristics of the apparatus, which comprises in combination;

a horizontal, transparent, copy-receiving surface which is fixed as to its position along a vertical axis;

an optical system which transmits an image of an original copy, positioned face downwardly on the said copy-receiving surface, to a vertical image plane, which includes a lens having its optical axis positioned vertically, an electrically-operated shutter, and a mirror located below the lens and positioned at an angle of forty-five degrees to the vertical axis of the lens, the said lens being located in a fixed position on a vertical axis between the said copyboard and the said mirror, which causes the optical system to transmit a clear optical image to the optical image plane of the apparatus;

an electric timer, electrically connected to operate the said shutter of the optical system;

a plurality of electric lamps which non-uniformly illuminate the copy-receiving surface from beneath, with an intensity of illumination which increases outwardly from the point on the copyboard directly above the axis of the lens system, to the periphery of the keyboard, in a proportion which gives uniform illumination reflected from a white surface on the copy-receiving surface at the optical image plane of the apparatus, and which bear a fixed relationship to that surface;

a source of electric current connected to the said lamps, to the said shutter, and to the said timer, which supplies an electric current of relatively-low voltage to the lamps at all times that the apparatus is in operation, to keep the said lamps glowing at a low level of illumination and which, when the shutter is opened by the action of the said timer, raises the voltage of the electric lamps to bring them to a full level of illumination and opens the said shutter and, after an elapsed time measured by the timer, closes the shutter and reduces the voltage of the current supplied to the lamps to its original value;

a corona discharge unit adapted to supply a corona discharge in an upwardly direction, positioned in a horizontal plane across the longest dimension of the cabinet;

a source of high-potential current for the said corona discharge unit;

a vacuum platen having an interior chamber, and a plurality of orifices in its lower surface member through which air can be drawn into its interior chamber;

a copy sheet supplying magazine adapted to hold a stack of photoelectrostatic sheets, which comprises an air cylinder, four toggle arms mechanically connected to the piston of the air cylinder, and a plate for holding a stack of photoelectrostatic copy sheets, which cooperate to raise the stack of copy sheets to bring the upper sheet of the said stack into contact with the lower surface of the said vacuum platen, when compressed air is supplied to the said cylinder;

a vacuum pump, a flexible tube connecting the vacuum side of the said pump to the interior chamber of the vacuum platen, and a tube connecting the pressure side of the said vacuum pump to the air cylinder of the said copy sheet supply magazine;

a transport means adapted to move the vacuum platen from a position above the copy sheet supply magazine, along a horizontal path paralleling the length of the said cabinet toward its center, which passes over the said corona discharge unit and then into a vertical plane, which places the surface of a sheet carried thereby in the vertical optical image plane, to return the said platen to a laterally-displaced position above the copy sheet supply magazine and, finally, to its original position;

an electrical motive system for the said transport means, and an associated electrical control system for the operation of the said motive system and the said corona discharge unit, which automatically and, successively, starts the movement of the vacuum platen as soon as the orifices in its lower surface are closed by the presence of a copy sheet thereon, turns on the high-potential current to the corona discharge unit, turns off the current to the corona discharge unit after the vacuum platen has passed over it, stops the motive system as soon as the vacuum platen has been turned into the vertical plane, opens the shutter and turns the full voltage on the lights of the optical system when the vacuum platen has been turned into the optical image plane, closes the shutter and turns down the voltage of the said lights after a period of time dictated by the said timer, resumes the operation of the motive system to return the vacuum platen along a rearwardly line of travel, causes the lateral displacement of the position of the vacuum platen and, finally, causes the return of the vacuum platen to its original position over the copy sheet supply magazine;

a magnetic toning unit positioned longitudinally of the said cabinet and adjacent the said magazine, which comprises a chamber carrying a powdered, solid, toner mixture, at least one toner brush unit comprising a cylindrical, stationary core of a non-magnetic material, a plurality of strip magnets longitudinally positioned at circumferentially-spaced intervals in the surface of the said core, and a rotatable outer shell of a non-magnetic material around the cylindrical core;

a fuser unit positioned longitudinally near the top of the said cabinet, comprising at least one longitudinally-positioned, infrared heating lamp, a hollow insulating shell above and on the sides thereof, and a blower unit for causing air to circulate through the cavity of the insulating shell;

a conveyor system which consists of three sections, the first section of which is comprised of two parallel, endless chains which carry two grippers, each of which are adapted to grasp a copy sheet from the vacuum platen when the vacuum platen is in a laterally-displaced position, and to carry the sheet over and in contact with at least one magnetic toning brush, and then on an upwardly-curved path of travel, the second section of which is comprised of a plurality of endless belts which travel in a path somewhat inclined from the horizontal, which are adapted to receive a copy sheet from the first section of the system and carry it through the copy-inspection station, and the third section of which is comprised of an endless belt which is adapted to receive a copy sheet from the second section of the system, to carry it beneath the fuser unit, and to deliver the sheet to the said delivery station;

an electrical system which operates the first section of the said conveyor system on an intermittent basis, and which stops its operation at the precise position in which a gripper is in position to receive the edge of a copy sheet from the vacuum platen, when it is in its laterally-displaced position;

an electrical system which keeps the fuser unit, its blower, and the second and third sections of the conveyor system in continuous operation at all times during the operation of the apparatus, and prevents the operation of the fuser unit without its blower and the second and third sections of the conveyor system being in operation;

and an automatic electrical control system which coordinates the sequence of operations of the said copy supply magazine, the transport means, the corona discharge unit, the shutter, and the first section of the conveyor system to carry out, in the order named, the operations of electrostatically charging the surface of a photoelectrostatic copy sheet, exposing the charged surface to an optical image, toning the resulting electrostatic image, fusing the toned image, and delivering the completed copy to the copy-receiving station of the apparatus, in a continuous repetition of the cycle of operations.

(References on following page)

References Cited by the Examiner

UNITED STATES PATENTS

| | | | |
|---|---|---|---|
| 1,133,352 | 3/15 | Wood | 271—7 |
| 1,517,255 | 12/24 | Scholin | 271—30 |
| 2,851,099 | 9/58 | Snoddy | 307—41 |
| 2,870,312 | 1/59 | Westervelt | 219—19 |
| 2,902,278 | 9/59 | Bradshaw | 271—30 |
| 2,909,971 | 10/59 | Barber | 95—1.7 |
| 2,979,026 | 4/61 | Reuter | 118—637 |
| 3,005,389 | 10/61 | Limberger | 95—1.7 |
| 3,032,009 | 5/62 | Magnusson | 118—637 |
| 3,049,968 | 8/62 | Johanson | 88—24 |
| 3,051,041 | 8/62 | Lehmann | 88—24 |
| 3,062,956 | 11/62 | Codichini | 250—49.5 |
| 3,071,370 | 1/63 | Hunt et al. | 271—7 |
| 3,076,092 | 1/63 | Mott | 250—49.5 |
| 3,076,099 | 1/63 | Cohen | 307—41 |

EVON C. BLUNK, *Primary Examiner.*